(12) United States Patent
Saraniecki et al.

(10) Patent No.: US 12,299,679 B2
(45) Date of Patent: May 13, 2025

(54) DATA STORAGE SEGREGATION FOR MAINTAINING DATA PRIVACY IN MULTI-NODE OPERATIONS

(71) Applicant: Digital Asset (Switzerland) GmbH, Zurich (CH)

(72) Inventors: Walter Eric Saraniecki, New York, NY (US); Kelly Anne Mathieson, New York, NY (US); Ratko Goran Veprek, Zurich (CH); Johan Sjodin, Zurich (CH); Charng-Ching Yeh, New York, NY (US)

(73) Assignee: Digital Asset (Switzerland) GmbH, Zurich (CH)

( * ) Notice: Subject to any disclaimer, the term of this patent is extended or adjusted under 35 U.S.C. 154(b) by 207 days.

(21) Appl. No.: 17/972,110

(22) Filed: Oct. 24, 2022

(65) Prior Publication Data

US 2024/0135023 A1 Apr. 25, 2024
US 2024/0232873 A9 Jul. 11, 2024

Related U.S. Application Data

(63) Continuation of application No. 16/762,367, filed as application No. PCT/US2018/060132 on Nov. 9, 2018, now abandoned.
(Continued)

(51) Int. Cl.
*G06Q 20/38* (2012.01)
*G06F 9/52* (2006.01)
(Continued)

(52) U.S. Cl.
CPC ........... *G06Q 20/3829* (2013.01); *G06F 9/52* (2013.01); *G06F 16/2343* (2019.01);
(Continued)

(58) Field of Classification Search
CPC ............ G06Q 20/3829; G06Q 20/223; G06Q 20/3674; G06F 16/2343; G06F 16/2365;
(Continued)

(56) References Cited

U.S. PATENT DOCUMENTS 9,672,499 B2 * 6/2017 Yang .................. G06Q 20/3825
10,269,009 B1 * 4/2019 Winklevoss ......... G06Q 20/105
(Continued)

FOREIGN PATENT DOCUMENTS

CN 105573828 A 5/2016
CN 107085810 A * 8/2017
(Continued)

OTHER PUBLICATIONS

Andreas M. Antonopoulos, Mastering Bitcoin, Dec. 2014, O'Reilly Media, Inc. (Year: 2014).*
(Continued)

*Primary Examiner* — Nilesh B Khatri
(74) *Attorney, Agent, or Firm* — Foley & Lardner LLP

(57) ABSTRACT

The present disclosure relates to methods and systems to settle a transaction involving a plurality of digital assets, comprising receiving a notification of a proposed transaction comprising a plurality of proposed component atomic transactions that atomically transfer at least a portion of the plurality of digital assets from one or more transferring nodes to one or more receiving nodes. The method further comprises at least in part determining or verifying that each transferring and receiving computer node is cryptographically authorized to receive and/or transfer at least some of the plurality of digital assets, and that each transferring and receiving computer node has a sufficient amount of the plurality of digital assets. The method further comprises sending an authorization notification to at least one execution node to transfer the plurality of digital assets from the
(Continued)

transferring computer nodes to the receiving computer nodes to settle the proposed transaction.

22 Claims, 30 Drawing Sheets

Related U.S. Application Data

(60) Provisional application No. 62/584,227, filed on Nov. 10, 2017.

(51) Int. Cl.
| | |
|---|---|
| *G06F 16/23* | (2019.01) |
| *G06F 21/62* | (2013.01) |
| *G06Q 20/22* | (2012.01) |
| *G06Q 20/36* | (2012.01) |
| *H04L 9/06* | (2006.01) |
| *H04L 9/00* | (2022.01) |

(52) U.S. Cl.
CPC ...... *G06F 16/2365* (2019.01); *G06F 21/6227* (2013.01); *G06Q 20/223* (2013.01); *G06Q 20/3674* (2013.01); *H04L 9/0637* (2013.01); *H04L 9/0643* (2013.01); *H04L 9/50* (2022.05); *H04L 2209/56* (2013.01)

(58) Field of Classification Search
CPC ..... G06F 9/52; G06F 21/6227; H04L 9/0637; H04L 9/0643; H04L 9/50; H04L 2209/56
See application file for complete search history.

(56) References Cited

U.S. PATENT DOCUMENTS

| | | | |
|---|---|---|---|
| 10,346,428 B2* | 7/2019 | Madhavan | G06F 16/273 |
| 11,017,381 B1* | 5/2021 | Winklevoss | G06Q 20/3674 |
| 11,164,164 B2* | 11/2021 | Minor | G06Q 20/3678 |
| 11,216,820 B2* | 1/2022 | Zhang | H04L 9/0637 |
| 11,276,059 B2* | 3/2022 | Mendhi | H04L 9/3247 |
| 11,501,370 B1* | 11/2022 | Paya | G06Q 20/3676 |
| 2015/0026072 A1 | 1/2015 | Zhou et al. | |
| 2015/0287026 A1 | 10/2015 | Yang et al. | |
| 2016/0085955 A1* | 3/2016 | Lerner | H04L 9/0869 726/20 |
| 2016/0292680 A1* | 10/2016 | Wilson, Jr. | H04L 9/30 |
| 2016/0321751 A1* | 11/2016 | Creighton, IV | G06Q 40/04 |
| 2017/0116693 A1 | 4/2017 | Rae et al. | |
| 2021/0035092 A1* | 2/2021 | Pierce | G06Q 20/02 |
| 2023/0063172 A1* | 3/2023 | Liberman | G06Q 20/0655 |

FOREIGN PATENT DOCUMENTS

| | | | |
|---|---|---|---|
| CN | 105573828 B | * | 4/2019 |
| WO | 2017187394 A1 | | 11/2017 |
| WO | 2017189027 A1 | | 11/2017 |
| WO | 2018013124 A1 | | 1/2018 |
| WO | 2018013934 A1 | | 1/2018 |
| WO | 2019028068 A1 | | 2/2019 |
| WO | 2019082142 A1 | | 5/2019 |

OTHER PUBLICATIONS

Tong Wu, et al., Exploration and Practice of Inter-Bank Application Based on Blockchain, Oct. 30, 2017, IEEE, pp. 219-224 (Year: 2017).*

International Search Report for PCT/US2018/060132 mailed Mar. 11, 2019; 7 pages.

Extended European Search Report for Application No. EP 18876657. 0, dated Jun. 4, 2021, 9 pages.

* cited by examiner

```
template LockableAsset
    with
        owner: Party
        obligor: Party
        amount: Integer
        --further parameters describing the asset
        locked: Bool
        lockedUntil: Time
        lockContext: Text
    where
        signatory obligor
        controller owner can
            Transfer with newOwner: Party
                returning ContractId LockableAsset
                to do
                    assert (not locked)
                    create this with owner=newOwner:
            --further choices relevant for Assets
            Lock with newLockContext: Text
                returning ContractId LockableAsset
                to do
                    assert (not locked)
                    create this with locked=True; lockContext=newLockContext
            Unlock with keyToken: ContractId TwoPartyKey
                returning ContractId LockableAsset
                to do
                    assert locked
                    keyR <- fetch keyToken
                    assert (keyR.owner == owner)
                    assert (keyR.obligor == obligor)
                    assert (keyR.lockContext == lockContext)
                    create this with locked=False; lockContext=" "
            Clawback
                returning ContractId LockableAsset
                to do
                    t <- getTime
                    assert (t > lockedUntil)
                    create this with locked=False; lockContext=" "
```

Fig. 3

DATA STORAGE SEGREGATION FOR MAINTAINING DATA PRIVACY IN MULTI-NODE OPERATIONS

CROSS-REFERENCE TO RELATED APPLICATION

The present application is a continuation of U.S. patent application Ser. No. 16/762,367, filed on May 7, 2020, which is a national phase entry under 35 U.S.C. § 371 of International Application No. PCT/US2018/060132 filed Nov. 9, 2018, published in English, which claims priority from U.S. Provisional Patent Application No. 62/584,227, filed on Nov. 10, 2017, all of which are incorporated herein by reference.

TECHNICAL FIELD

The present disclosure relates to the field of distributed ledgers. In some examples, the disclosure relates to a system and method to perform an atomic transaction of a plurality of digital assets using a distributed ledger.

BACKGROUND

In some current distributed ledger implementations, a node due to receive a token or digital asset may have an associated technical problem in that the node may bear a risk of non-performance of a node transferring the token or digital asset. In other words, the risk may be a risk that the node obligated to deliver such token or digital asset may, for whatever reason, fail to deliver such token or digital asset to a receiving node. Such failure may be due to a host of factors, ranging from unintentional (such as system or computer failures, electrical outages, communications disruptions, or human/operator error) to intentional (bankruptcy stays or a decision to renege on the delivery).

The associated technical problem may be exacerbated when the transfer of a token or digital asset occurs along a chain of nodes from a first node (the originator of the token or digital asset) to a last node (ultimate designated receiver of the token or digital asset). Each node, and the communication systems between each node, may become a potential point of failure. Moreover, each node in that chain bears the risk of non-performance by every other node in the chain. Any failure, whether a technical computer outage or an intentional halt to the transfer, at any node in the chain, may prevent the last node from receiving the token or digital asset.

The associated technical problem is exacerbated when there is an exchange of two tokens or digital assets over a chain of intermediary nodes, with two or more ultimate originators of the tokens or digital assets and two or more ultimate receiver of the tokens or digital assets, with the transaction of the exchange spread over one or more intermediary nodes, where the intermediary node would only be part of the exchange by passing tokens or digital assets onwards.

Unfortunately, should intermediary nodes be required to facilitate the transaction between/among the nodes ultimately providing and/or receiving the tokens, these intermediary nodes create additional points of failure to the system.

Throughout the present specification, the word "comprise" or variations such as "comprises" or "comprising", shall be understood to imply the inclusion of a stated element, integer or step, or group of elements, integers or steps, but not the exclusion of any other element, integer or step, or group of elements, integers or steps.

Any discussion of documents, acts, materials, devices, articles or the like, which has been included in the present specification is not to be taken as an admission that any or all of these matters form part of the prior art base or were common general knowledge in the field relevant to the present disclosure as it existed before the priority date of each of the appended claims.

SUMMARY

There is provided a computer system to settle a transaction that transfers a plurality of digital assets comprising: a computational node including a processor and memory, the computational node configured to: receive a notification of a proposed transaction, wherein the proposed transaction transfers the plurality of digital assets from one or more transferring computer nodes to one or more receiving computer nodes, each of the transferring computer nodes and receiving computer nodes belonging to a network of nodes that maintain a distributed ledger, the proposed transaction comprising a plurality of proposed component atomic transactions that atomically transfer at least a portion of the plurality of digital assets from the one or more transferring nodes to the one or more receiving nodes; determine at least one digital lock associated with the proposed transaction, wherein when activated the digital lock prevents transfer of any of the plurality of digital assets to any transferring or receiving computer node that is not a participant designated to receive or transfer at least some of the plurality of digital assets for purposes of the proposed transaction; at least in part determine or verify that: each transferring and receiving computer node is cryptographically authorized to receive and/or transfer at least some of the plurality of digital assets, and that the digital lock is activated; and each transferring and receiving computer node involved in the proposed transaction has a sufficient amount of the plurality of digital assets to fulfill all of the transferring or receiving computer node's obligations under each proposed component atomic transaction involving such node; and based on the verification, send an authorization notification to at least one execution node to cryptographically unlock the activated digital lock and transfer the plurality of digital assets from the transferring computer nodes to the receiving computer nodes to settle the proposed transaction.

In the computer system, the computational node may be further configured to determine the plurality of proposed component atomic transactions.

In the computer system, each of the plurality of proposed component atomic transactions may be associated with one or more digital locks. In the computer system, at least a first of the digital locks may be associated with the plurality of proposed component atomic transactions that, when activated, may be operable to prevent transfer of a first subset of the plurality of digital assets in multiple proposed component atomic transactions.

In the computer system, each of the proposed component atomic transactions, when executed, may be configured for recordation in the distributed ledger at the same time.

In the computer system, each of the proposed component atomic transactions, when recorded to the distributed ledger, may have a common time stamp.

In the computer system the computational node or the execution node may be further configured to: schedule the cryptographic unlocking of the activated digital lock to prevent the transfer of any of the plurality of digital assets for purposes other the proposed transaction.

In the computer system, the distributed ledger may be blockchain and the proposed component atomic transactions may be recorded on a same block of the blockchain.

The computer system may further comprise at least one execution node to: cryptographically unlock the activated digital lock; and transfer the plurality of digital assets from the transferring computer nodes to the receiving computer nodes to settle the proposed transaction, wherein the transfer comprises atomically executing all of the proposed component atomic transactions.

In the computer system, the computational node and the execution node may share at least one common processor.

There is also provided a computer-implemented method to facilitate settlement of a transaction involving a plurality of digital assets, the method comprising: receiving a notification of a proposed transaction, wherein the proposed transaction transfers the plurality of digital assets from one or more transferring computer nodes to one or more receiving computer nodes, each of the transferring computer nodes and receiving computer nodes belonging to a network of nodes that maintain a distributed ledger, the proposed transaction comprising a plurality of proposed component atomic transactions that atomically transfer at least a portion of the plurality of digital assets from the one or more transferring nodes to the one or more receiving nodes; at least in part determining or verifying that: each transferring and receiving computer node is cryptographically authorized to receive and/or transfer at least some of the plurality of digital assets; and each transferring and receiving computer node involved in the proposed transaction has a sufficient amount of the plurality of digital assets to fulfill all of the transferring or receiving computer node's obligations under each proposed component atomic transaction involving such node; and based on the verification, sending an authorization notification to at least one execution node to transfer the plurality of digital assets from the transferring computer nodes to the receiving computer nodes to settle the proposed transaction.

The method may further comprise the steps of: determining at least one digital lock associated with the proposed transaction, wherein when activated the digital lock prevents transfer of any of the plurality of digital assets to any transferring or receiving computer node that is not a participant designated to receive or transfer at least some of the plurality of digital assets for purposes of the proposed transaction.

In the method, the computational node may be further configured to: determine the plurality of proposed component atomic transactions.

In the method, the computational node may determine the plurality of proposed component atomic transactions by: mapping a route for the transfer of the plurality of digital assets from the one or more transferring computer nodes to the one or more receiving computer nodes, wherein each transfer of each of the plurality of digital assets from any transferring computer node to any receiving computer node in the network comprises a proposed component atomic transaction.

In the method, the computational node may determine the route by: testing connections between transferring computer nodes and receiving computer nodes in the network to determine which nodes support the transfer of the plurality of digital assets.

In the method, to at least in part determine or verify that each transferring and receiving computer node has a sufficient amount of the plurality of digital assets may comprise: for a given transferring or receiving computer node that is participant to the proposed transaction: determining a sum of inbound digital assets that the given node is a participant designated to receive or transfer; determining a sum of outbound digital assets that the given node is a participant designated to receive or transfer; and determining a result by subtracting the sum of outbound digital assets from the sum of inbound digital assets.

In the method, the result may be determined by subtracting the sum of outbound digital assets from the sum of inbound digital assets for digital assets of a same type.

In the method, when the result is positive or neutral, the computational node may determine that the given node has a sufficient amount of the plurality of digital assets.

In the method, determining or verifying that each transferring and receiving computer node has a sufficient amount of the plurality of digital assets may further comprise the steps of: determining an initial transferring node of the inbound digital assets to the given node; and determining whether the initial transferring node has a sufficient amount of the inbound digital assets available for transfer to the given node.

In the method, determining or verifying that each transferring and receiving computer node has a sufficient amount of the plurality of digital assets further comprises the steps of: determining one or more initial transferring nodes that have the plurality of digital assets for the proposed transaction; and determining whether the one or more initial transferring node(s) have the respective plurality of digital assets available for transfer to the given node.

There is also provided a computer-implemented method to facilitate settlement of a transaction involving a plurality of digital assets, wherein the transaction is based on a proposed transaction comprising a plurality of proposed component atomic transactions that each atomically transfer at least some of the plurality of digital assets from one or more transferring computer nodes to one or more receiving computer nodes, wherein each of the transferring computer nodes and receiving computer nodes belong to a network of nodes that maintain a distributed ledger, the method comprising: receiving an authorization notification to transfer the plurality of digital assets from the transferring computer nodes to the receiving computer nodes to settle a proposed transaction, wherein the authorization notification is based on a verification that: each transferring and receiving computer node is cryptographically authorized to receive and/or transfer at least some of the plurality of digital assets; and each transferring and receiving computer node involved in the proposed transaction has a sufficient amount of the plurality of digital assets to fulfil all of the transferring or receiving computer node's obligations under each proposed component atomic transaction involving such node; determining an authorization to transfer the plurality of digital assets from the transferring computer nodes to the receiving computer nodes; and based on the authorization, atomically transferring the plurality of digital assets from the transferring computer nodes to the receiving computer nodes to settle the proposed transaction.

There is also provided a non-transitory computer-readable medium comprising program instructions that, when executed, cause a computer to perform the method as described above.

BRIEF DESCRIPTION OF DRAWINGS

Examples of the present disclosure will be described with reference to the figures below:

FIG. 3 illustrates an example of a lock contract composed in DAML;

DESCRIPTION OF EMBODIMENTS

Figure 1:
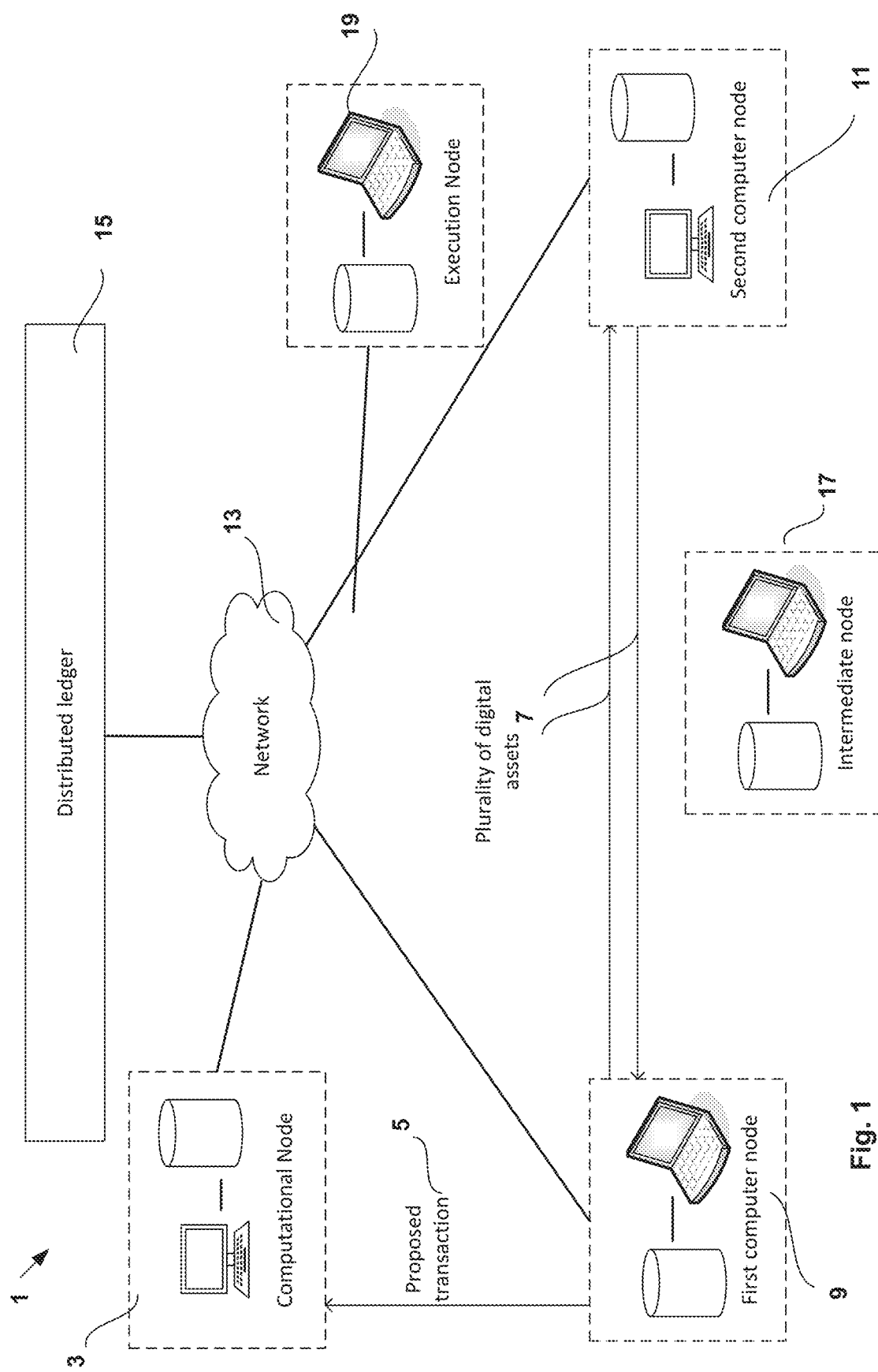
FIG. 1 illustrates an example system to settle a transaction that transfers a plurality of digital assets consistent with embodiments of the present disclosure.

The present disclosure relates to a distributed ledger implementation for performing an atomic transaction of a digital asset. Below, the disclosure first provides exemplary distributed ledger implementations that may be utilized with the aforementioned atomic transaction, and subsequently a system and method for performing such an atomic transaction along with the distributed ledger implementations.

A distributed ledger is a record of transactions or other data, which exists across multiple distinct entities in a network. The ledger may be wholly replicated across participants, or segments may be partially replicated across a subset of participants. In either case, the integrity of the data is ensured in order to allow each entity to rely on its veracity and to know that data they are entitled to view is consistent with that viewed by others entitled to view the same data. This makes the distributed ledger a common, authoritative prime record—a single source of truth—to which multiple entities may refer and with which they may securely interact.

Distributed ledger technologies ("DLT") have expanded beyond mere transaction registries to include other forms of data and encoded business logic, sometimes referred to as "smart contracts". This means that not only does the technology synchronize the record of who owns what, but also provides an automated common workflow for processing that data, ensuring that the results of agreements are processed in the same, mutually agreed manner.

Several examples of DLT, which may be utilized with the presently-disclosed embodiments, are described below. The first example is an implementation that has a platform architecture, which includes a distributed ledger having a global synchronization log (GSL) and private contract store (PCS). The ledger may operate in conjunction with encoded business logic (e.g., smart contracts), e.g., with a modelling language referred to as the Digital Asset Modelling Language ("DAML"). Certain aspects of DAML are described in more detail in WO 2017/189027 and WO 2017/187394, while certain aspects of a distributed ledger as described above may be found in WO 2018/013124 and WO 2018/013934, the disclosures of which are hereby incorporated herein in their entireties. The second example is an alternative implementation of DLT that may be used with the presently-disclosed embodiments. The leger may additionally have features that enable the locking of tokens and other digital assets to a specified purpose ("Locking"). Certain aspects of Locking are described in more detail in PCT/US2018/044682, the disclosure of which are incorporated herein in their entirety.

Distributed Ledger Architecture

A first example of a distributed ledger that may be used along with the presently-disclosed embodiments maintains confidentiality while allowing for the same data integrity assurances of typical blockchain solutions. This may be achieved by the parties involved physically segregating and storing locally confidential contractual information, and sharing a globally replicated log of only fingerprints, or "hashes", of sensitive data and execution commitments. These hashes are one-way cryptographic functions which may be proven to accurately match a party's data, but do not contain any information about the confidential data itself nor the parties involved.

Figure 24:
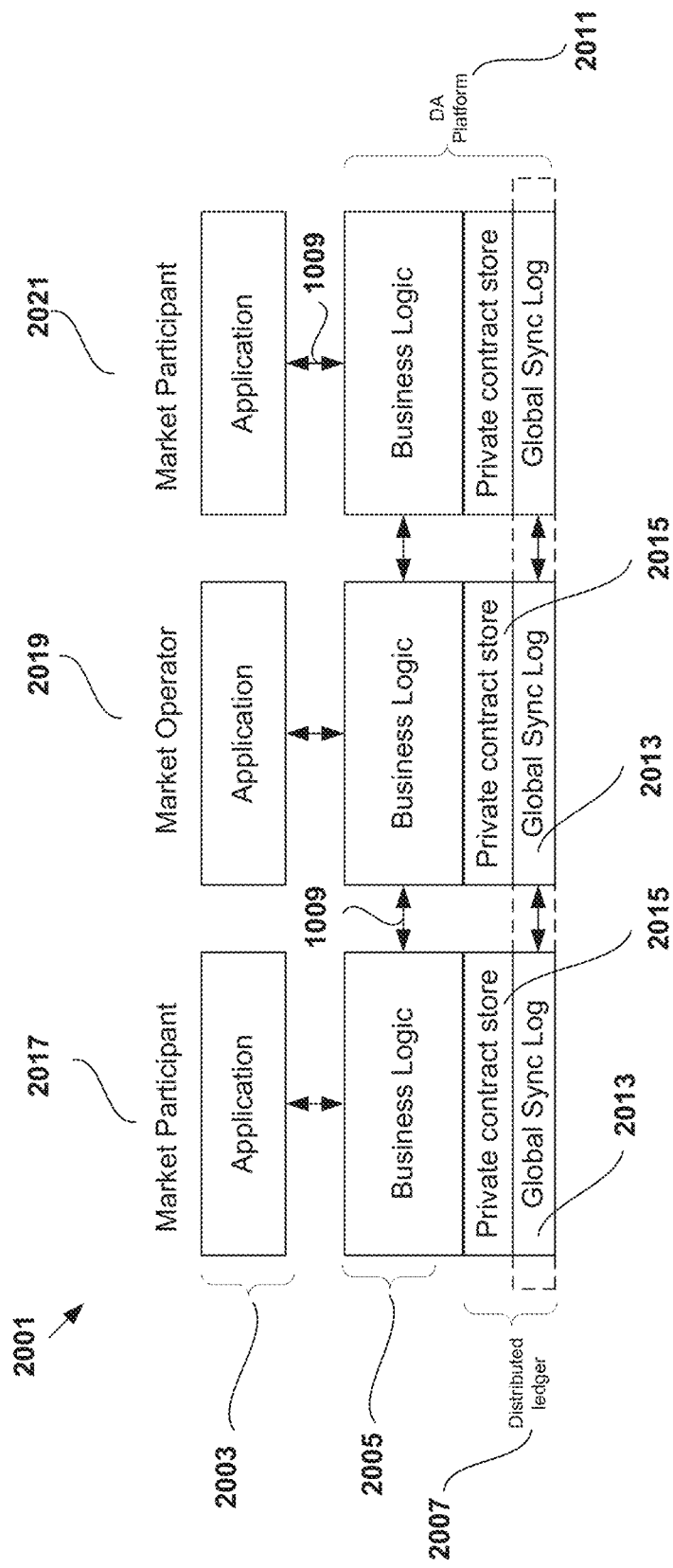
FIG. 24 illustrates a schematic of several nodes in a distributed computer network.
Figure 25:
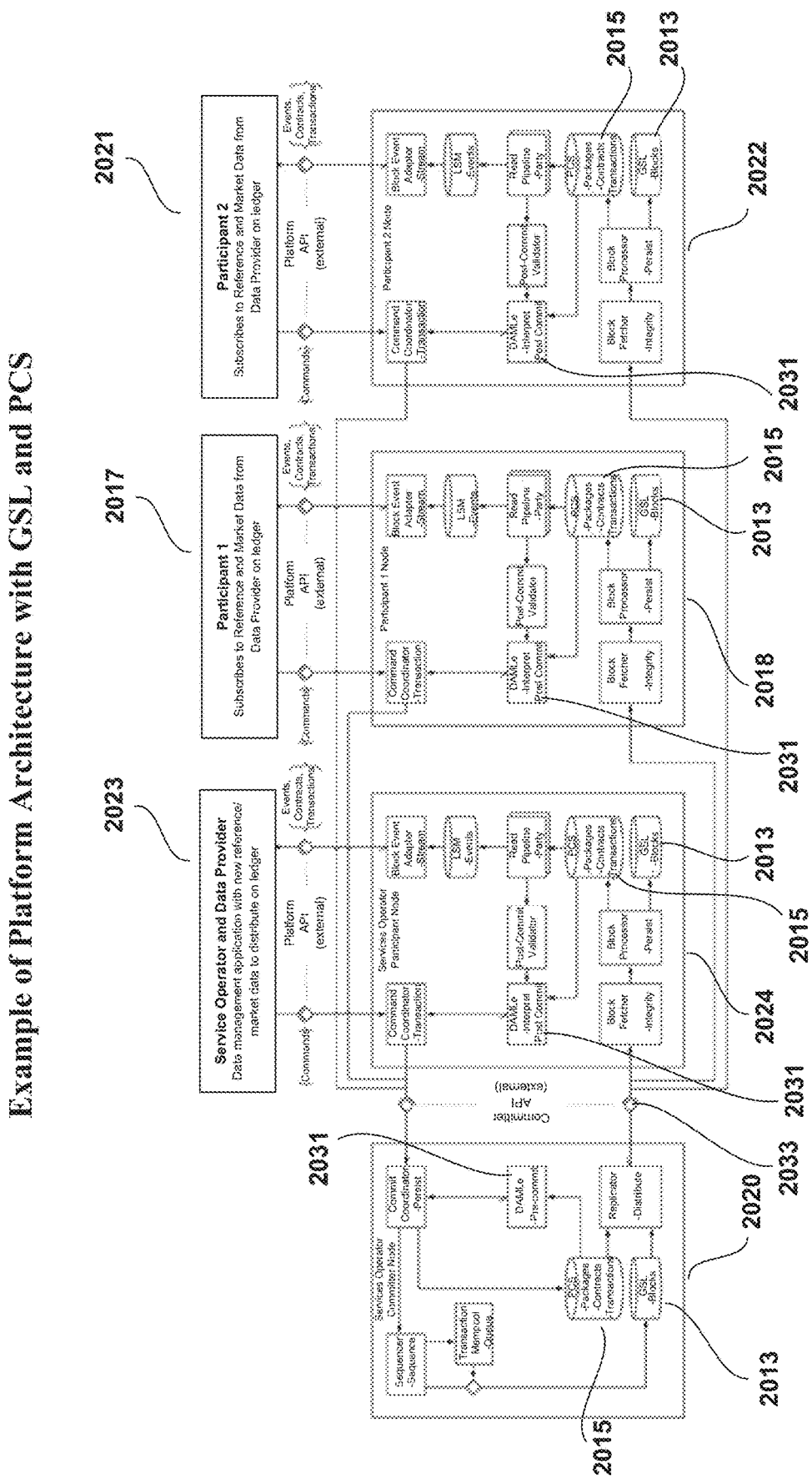
FIG. 25 illustrates a further schematic of the nodes in the distributed computer network of FIG. 23, with messaging, APIs, and additional internal node architecture illustrated in more detail.

The distributed ledger may be implemented by way of a system 2001 as shown, for example, in FIGS. 24 and 25. The system 2001 may include multiple layers, such as an Application layer 2003, a Business Logic Layer 2005, and a distributed ledger 2007 layer as illustrated in FIG. 24. Each layer may have its own communication channels 2009. The distributed ledger 2007 may be a permissioned ledger, meaning it is a ledger accessible (for reading or for writing) only by known and pre-approved parties. This differs from a permissionless ledger, where anyone is permitted to read or write to the blockchain. The distributed ledger 2007 may include multiple subcomponents, including a Global Synchronization Log ("GSL") 2013 and a Private Contract Store ("PCS") 2015. The PCS 2015 can, for example, be a private data store that is segregated from the GSL 2013. As used herein, "segregated" means that data included in the PCS 2015 is not recorded in the GSL 2013, but rather is kept in a separate, private data store. As explained in more detail below, the use of a PCS 2015 may serve to enhance privacy of the distributed ledger for participants in the network.
The Distributed Ledger 2007, GSL 2013 and PCS 2015

The system 2001 may maintain privacy for participants by concealing private data from other participants in the PCS 2015 while providing a GSL 2013 with public data which may be used to verify information and the integrity of information. Accordingly, the distributed ledger technology of FIG. 24 may provide technical improvements over extant distributed ledgers with regards to accuracy of the information stored thereon. Moreover, the distributed ledger technology of FIG. 24 may provide improved user experience over extant distributed ledgers with regards to privacy.

Unlike a network of segregated ledgers that lacks a global arbiter of truth where the system cannot guarantee network participants integrity of the complete set of relevant data, the present disclosure may utilize a GSL 2013, which may maintain confidentiality of the physically segregated ledgers (such as each party's individual PCS 2015) while also serving as a global arbiter of each PCS 2015.

For example, the GSL 2013 may be a shared and globally replicated log that allows for private data stored in one or more PCSs 2015 to be synchronized. Accordingly, the GSL 2013 may provide a mechanism by which PCSs 2015 may maintain accurate and up to date data. In some embodiments, the GSL 2013 does not cause an update of data stored in the PCS 2015 to occur (although it may in some examples). Instead, G S L 2013 may allow a PCS 2015 to be made to be consistent with the public data on the GSL 2013, as well as the private data of other participants (e.g., stored in another PCS 2015). For example, if a node (or participant in communication with a node) determines there is private data that needs to be updated, then the node may request such data. In some embodiments, synchronization does not mean that a PCS 2015 must store the same data as another PCS 2015 (such as that of another node), although such synchronization may occur. As used herein, "synchronization" includes any arrangement in which private data stored in the PCS 2015 is provably consistent with the public data in the GSL 2013 and that inconsistencies with the public data may serve as notice to the nodes and/or participants that private data should be updated.

Although system 2001 may be used for synchronization of any kinds of private data, in the context of the present disclosure it is generally used as a synchronized system for locking digital assets for settling transactions involving those digital assets. The details concerning locking of digital assets for purposes of committed settlement of transactions is discussed in more detail below.
Nodes and Participants in the System 2001

In the present disclosure, reference is made to a node in a number of contexts. As used herein, a "node" may refer to a computer or system that interacts with a computer and interfaces with the distributed ledger. Nodes may be operable in different modes including but not limited to: Reader Mode, Writer Mode and Auditor Mode. Each of these modes may give a different level of access to the GSL 2013 and associated PCS 2015 of the distributed ledger 2007.

As illustrated in FIG. 25, a node, e.g., nodes 2018, 2020, and 2024, may comprise, or be connected to, one or more participants, e.g., participants 2017, 2019, 2021, and 2023. There may be several types of participants in the system 2001.

A network participant, e.g., participant 2017, 2021, or 2023, may be a participant in the system that operates a node, e.g., node 2018, 2022, or 2024. A participant may be considered a direct participant when it has direct access to read or write to the GSL 2013. In the example of a financial market, market operators 2019, 2023 may operate nodes 2020, 2024 and may also be responsible for maintaining the rules of the market. Market operators 2019, 2023 may further govern access to the GSL 2013. This globally replicated log may be a permissioned ledger, meaning it is a ledger accessible (for reading or for writing) only by known and pre-approved nodes with associated participants.

Another type of participant may be an indirect participant. The indirect participants may not operate a node and therefore may connect to the network through interfaces operated by others. Indirect participants may delegate actions on the GSL 2013 to a third party who interacts with the GSL 2013 on their behalf.

Private data may be data that is private and confidential to a participant and, where the node associated with the participant, maintains privacy for the participant. Private data of a participant may be stored in confidence, with the authority of the participant, by other nodes. The private data may be stored in a respective PCS 2015 of a node to maintain confidentiality of the data.

Each network participant, e.g., participant 2017, 2021, or 2023, may have its own PCS, which contains all validated contracts to which the participant is a party. In this context, the term "contracts" refers to business logic, including transaction parameters, rights and obligations, reflecting the encoded terms of legal agreements by which participants are bound. Business logic may be composed using DAML, and thus may include program instructions that are representative of legal or other agreements between participants to the network. Accordingly, program instructions that may be executed by the node may be stored in the node's PCS 2015. The PCS 2015 may be stored locally and only contain those contractual agreements that the participant is entitled to store and view. The PCS 2015 may be a durable store of the codified contractual relations between parties. It may not process the executable business logic itself, which instead may be performed at the Business Logic Layer 2005. Therefore, the Business Logic Layer 2005 may execute the program instructions constituting the contractual relations between the parties rather than such execution happening in a node's PCS 2015. The PCS 2015 may contain a historical record of all executable contracts (both active and inactive) pertaining to a participant, but this segment of the distributed ledger, in some examples, cannot be constructed from the contents of the PCS 2015 alone. To construct the historical record, in certain examples, contracts stored within the PCS 2015 may be paired with corresponding active evidences stored in the GSL 2013.

When a node, e.g., node 2018, 2020, 2022, or 2024, is operable in a reader mode, referred to herein as a reader node, the reader node may become a network node that acts on behalf of participants that might be involved in some contracts or for supervising authorities. The reader node may monitor for notifications on behalf of its served participants on the GSL 2013, and may aggregate a partial database of private data. In some embodiments, some network participants only have reader mode permissions—for example participant 2017 and corresponding node 2018 may only read the GSL 2013 to verify private data.

When a node, e.g., node 2020 or 2024, is operable in a writer mode, referred to herein as a writer node, the writer node may record evidence into GSL 2013. The writer node may also guarantee the contradiction-less recording of evidence and, as a consequence, may have full access into private data that it records as public data. The role of the writer node may be shared by several nodes, such that a write to the GSL 2013 requires joint authorization, at least in certain scenarios. In some examples, this joint authorization may be arrived at using a consensus protocol, as detailed below. In other examples, a participant who is an operator (e.g., participant 2019 or 2023) may run a node (e.g., node 2020 or 2024) that is both a writer node and a reader node in order to be able to submit data on its own. Alternatively, a participant who is an operator may operate multiple separate nodes: one of which may be a writer node, the other of which may be a reader node.

A third mode is that of an "auditor" node. An auditor node may be a node authorized to run in auditor mode, which may have access to private data for the purposes of determining the integrity of at least part of the data in the system 2001. An auditor may have partial access to private data to ensure the integrity of the GSL 2013 is maintained. An auditor node may be associated with an auditor participant (such as an official auditor) who utilizes the auditor node to perform integrity checks on the data in the system. The "auditor" node may be associated with participants that have an interest in ensuring the integrity of the data such as a regulatory authority, market operator, or other authorized person.

DAML Contract and Data Propagation

The process of a node committing a DAML contract to the distributed ledger 2007, or updating data stored in a DAML contract or updating the DAML contract itself, is described below with reference to FIGS. 26 and 27. The process described below may be utilized to deploy initial DAML lock contracts, as described herein, and/or update data in DAML lock contracts or the DAML lock contract itself. Updating a DAML contract itself refers to deploying a new, updated version of the DAML contract to the network in place of a prior DAML contract that has been archived, as described herein.

Figure 26:
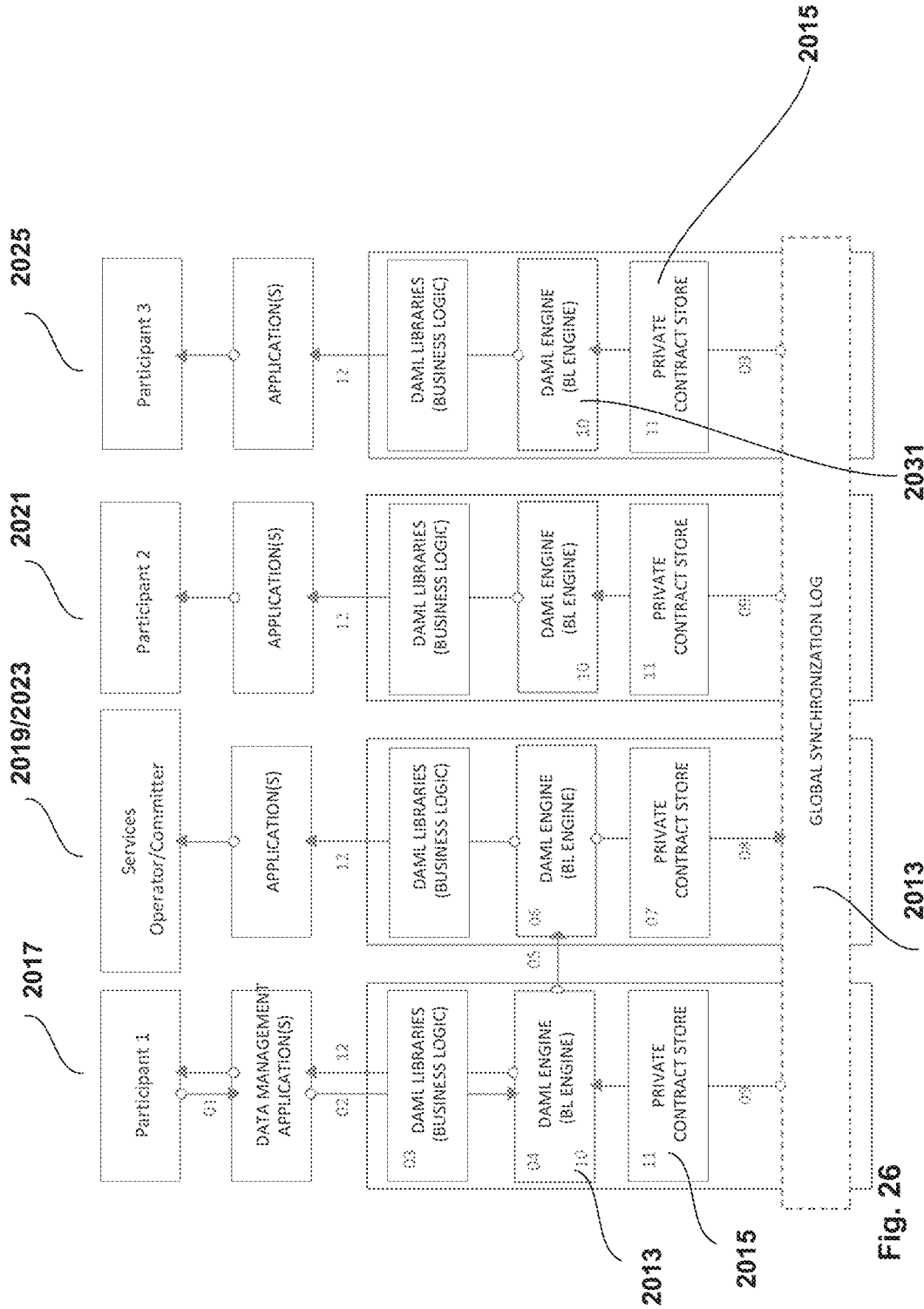
FIG. 26 illustrates an exemplary process for deploying or updating program instructions (e.g., a DAML contract) to a distributed ledger.

When data is available, a node(s) of the respective participants 2017, 2019, 2021, 2023, 2025 may send a DAML Command via the Platform API of FIG. 25 to its DAML Execution Engine ("DAMLe") 2031, which is interpreted by DAMLe 2031 and translated into a transaction(s), as depicted in Steps 01-04 of FIG. 26. A DAML Command may constitute an API request (e.g., to the Platform API of FIG. 25) to execute certain DAML program instructions or code. In that sense, a DAML Command may constitute an API request that contains a data payload instructing a node(s) to execute certain DAML code and cause an update to the GSL 2013 and/or PCS s 2015 of affected parties. In some cases, this may take the form of updating data in a DAML contract, archiving and replacing a DAML contract with a new version of such contract, or more generally executing code in a DAML contract or series of related DAML contracts that causes state updates to occur to the ledger 2007. The DAMLe 2031 may constitute a runtime environment for execution of DAML code.

The DAML Command and the transaction(s) may be sent to a writer node(s) 2020, 2024, for instance using the committer API 2033 of FIG. 25, as depicted in Step 05 of FIG. 26. The transaction(s) may be a message to the writer node(s) 2020 to exercise a choice (e.g., execute a certain code segment) on a contract that has been previously deployed, which defines the rights and obligations of parties in the network. For instance, the message may be to execute a certain code segment in a DAML contract that modifies some data set forth in the DAML contract, executes a transaction (e.g., trade), deploys another DAML contract, or another function capable of being modelled in DAML. The message sent to the committer node(s) 2020 may contain an event that archives an original instance of the DAML contract, and creates a new instance of the DAML contract with new data, or creates an entirely different DAML contract or series of contracts representing the parties' agreement.

The writer node(s) 2020, 2024 may interpret the DAML command (as depicted in Step 06) to confirm that the transaction it received in Step 05 is valid. For instance, the writer node(s) 2024 may validate, by running the DAML Command received by the node(s) 2018, 2022 in its own DAMLe, among other things, that the message sender has the right to see the original DAML contract, the sender has a right to execute the relevant code segment that forms part of the DAML contract, any new transaction(s) signatories may be bound/placed into an obligable position, the DAML was correctly interpreted, and the most-recent version of DAML was used. The writer node(s) 2020 may also ensure the original DAML contract has not already been archived by a prior transaction, and determine who should be notified of the transaction, once it has been recorded to the distributed ledger 2007 (e.g., GSL 2013 and/or PCS s 2015 of relevant parties).

Figure 29:
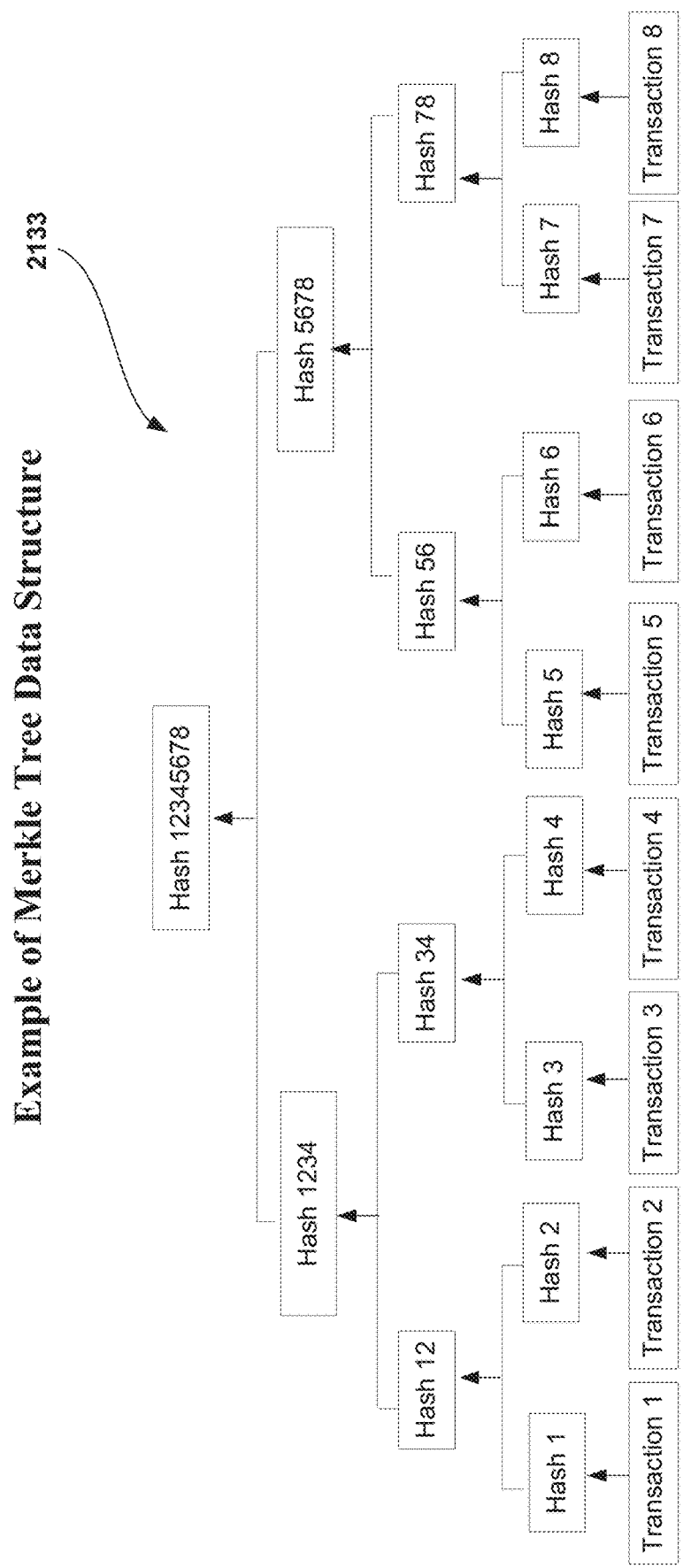
FIG. 29 illustrates an exemplary Merkle Tree data structure.

Once validation is complete, the writer node(s) 2020 may store the new DAML contract in its PCS 2015 (as depicted in Step 07 of FIG. 26) and add the aforementioned transaction to its transaction buffer (e.g., Transaction Mempool of FIG. 25) for eventual commitment to the GSL 2013. The transaction may be added to the Transaction Mempool along with other transactions, which ultimately may be combined in a block of the GSL 2013. As detailed above, the transaction may include a cryptographic representation (e.g., a hash) of events caused by execution of a code segment of a DAML contract. These events may include the creation of new DAML contracts or the archival of outdated contracts. The hash of the transaction may be combined with other transaction hashes, which may be hashed once more in a repeating cycle to form a Merkle tree (e.g., similar to the example shown in FIG. 29). Either the passage of a set amount of time or exceeding a maximum transaction limit in the Mempool may trigger the writer node(s) 2020 to produce a new block on the GSL and notify relevant participants. The new GSL block may contain a Merkle root (i.e., root of a Merkle hash tree, for instance as shown in FIG. 29) of all the transactions in the current Transaction Mempool, including the transaction created above. The block may also contain a sorted Merkle root of all notifications that must be sent to all relevant parties and/or all notifications that may be sent to one or more relevant parties.

An event may be broadcast on the GSL 2013 (as depicted in Step 08 of FIG. 26) and a private notification, cryptographic proof and transaction details sent by the writer node(s) 2020 to appropriate Network Participant node(s) 2018, 2022 (as depicted in Step 09 of FIG. 26). Whether or not a participant/node in the network receives the aforementioned private notification (as depicted in Step 09 of FIG. 26) may depend on whether the participant/node is a stakeholder on the new DAML contract. A stakeholder may include (1) obligable parties (e.g., signatories/owners of the contract or parties being bound by the execution of a code segment of the DAML contract), (2) parties having rights (e.g., parties having an ability to execute a code segment of the DAML contract), and/or (3) parties having observer (e.g., read-only) privileges to the contract. If the participant/node is a stakeholder, it may receive the private notification described above. If not, the participant/node may simply receive the GSL block. The private notification may be a message sent, via a private, optionally encrypted secure channel (e.g., through the Replicator and Block Fetcher of FIG. 25), to stakeholders of a contract that provides:

1. The new GSL block,
2. An archival event of the original DAML contract,
3. The data of the newly created DAML contract,
4. Merkle proofs of the create and archive events, and/or
5. Merkle proofs of the notification of the create and archive events.

As shown in Steps 10-12 of FIG. 26, each stakeholder's DAMLe 2013 may validate the results (e.g., using a validation process described above in ¶ [83]), store the new DAML contract in its PCS 2015, and send a DAML event to any connected applications and/or send a notification message to the stakeholder. The DAML event may be sent to any connected applications through an API so that the stakeholder or any of its applications listening for contract changes are notified of a change to the relevant DAML contract.

Using the above mechanism, only actual stakeholders to a DAML contract may be notified of a modification to the contract (e.g., any of the data therein, execution of a code segment in the DAML contract, etc.), and any resulting smart contract may be stored in the PCS 2015 of only stakeholders to the DAML contract. As such, using the private notification mechanism provided above, data pertaining to DAML contracts may be kept confidential in ledger 2007.

As detailed more fully below, the system 2001 and ledger 2007 may be utilized with DAML lock contracts (disclosed below) to affect transactions that provide for committed settlement of digital assets. The various DAML lock contracts may also be updated and kept confidential using the mechanisms described above.

Alternative Distributed Ledger Technology Platform

Although the example of a distributed ledger that may be used with DAML contracts (including DAML lock contracts) described above may be used in embodiments of the present disclosure, a different distributed ledger may be utilized with the present embodiments to affect committed settlement of digital assets utilizing a distributed ledger. An example of such an alternative distributed ledger is disclosed below.

Figure 27:
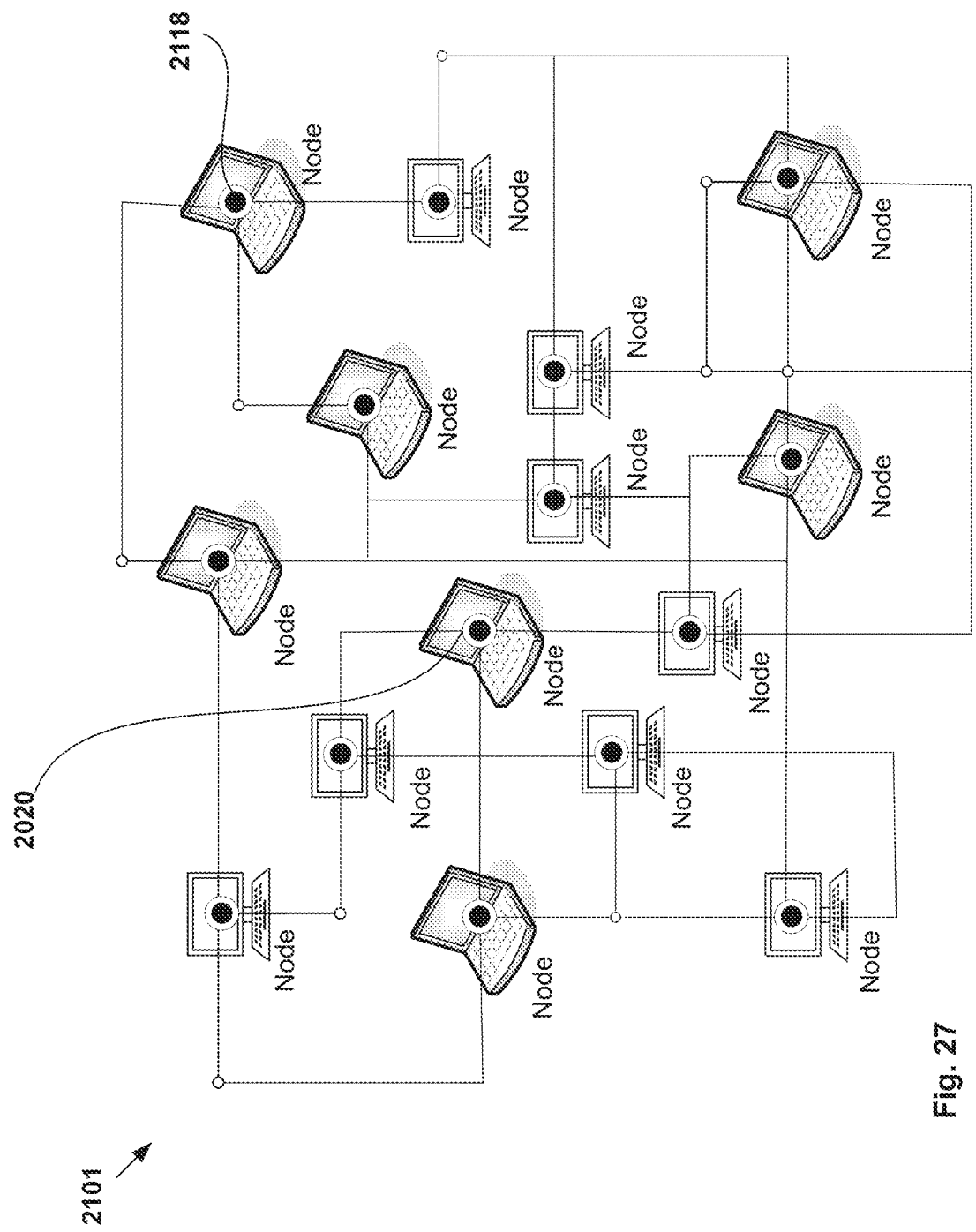
FIG. 27 illustrates an exemplary distributed ledger network with a plurality of nodes.
Figure 28:
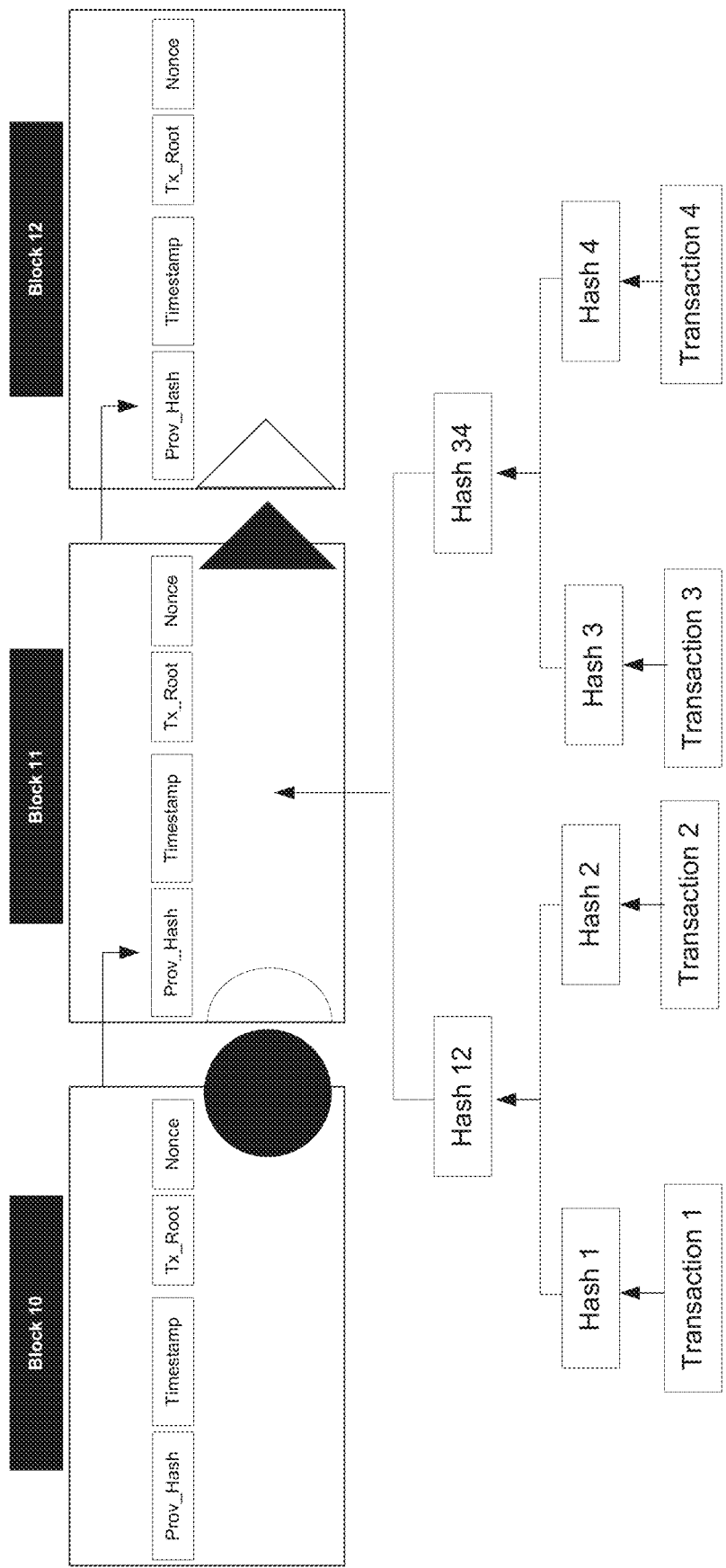
FIG. 28 illustrates a structure of a blockchain.

A DLT network 2101 that may be employed with the present embodiments may typically include a plurality of nodes, as shown in FIG. 27. The nodes may include "full" or "committer" nodes 2120, which are nodes capable of reading and writing transactions to the distributed ledger or blockchain 2107 (FIG. 28). The nodes may also include "participant" or read-only nodes 2118 that may read, but not write, to the distributed ledger 2107 or blockchain. In one example, the network of nodes may be permissioned to control which nodes have the ability to enter the network, in addition to which nodes are read-only or are read/write nodes. A permissioned network may include a network where the ability to run a node, whether read-only or read/write, is subject to approval/permission. A permissioned network may help to provide scalability (e.g., more transactions/sec), achieve privacy, and/or improve security of a distributed ledger, such as ledger 2107. In another example, the network of nodes may be permissionless or a hybrid permissioned/permissionless network. In a permissionless network, anyone has the ability to run a node, whether read-only or read/write, without requiring permission by some entity in partial or full control of the network.

For both permissioned, permissionless or hybrid networks, the network 2101 may utilize a consensus protocol. Examples of consensus protocols that may be used include byzantine-fault tolerant (BFT) consensus algorithms such as, for example, Paxos, Tendermint, Raft, or others, a Proof-of-Work (POW) consensus algorithm (e.g., as used in Bitcoin), a Proof-of-Stake (POS) algorithm, Practical Byzantine Fault Tolerant (PBFT) algorithms, and even other consensus algorithms. A consensus protocol may operate to keep all nodes on the network 2101 synchronized with each other, in terms of the state of the ledger or blockchain 2107. In other words, the consensus protocol may be a protocol where nodes come to an agreement on data that may be written to the ledger or blockchain 2107, so that all nodes in the network 2101 agree on the data—or state—comprising the ledger or blockchain 2107. In certain examples, a consensus protocol may use a peer-to-peer messaging protocol (e.g., over HTTP, RPC, or another messaging protocol) to transmit messages and data between nodes and arrive at consensus. As explained further below, where a consensus protocol is used, it may assist with determining what data should be written to the ledger by all nodes in the network.

A consensus protocol may also be utilized with the system 2001 and ledger 2007 detailed previously for the same purpose—e.g., to arrive at consensus as to updates to the state of the ledger 2007.

The network 2101 may also include a runtime environment/execution-engine (e.g., such as DAMLe described above, a virtual machine, etc.) that permits execution of program instructions or (e.g., a smart contract written in DAML) on the network 2101.

Figure 30:
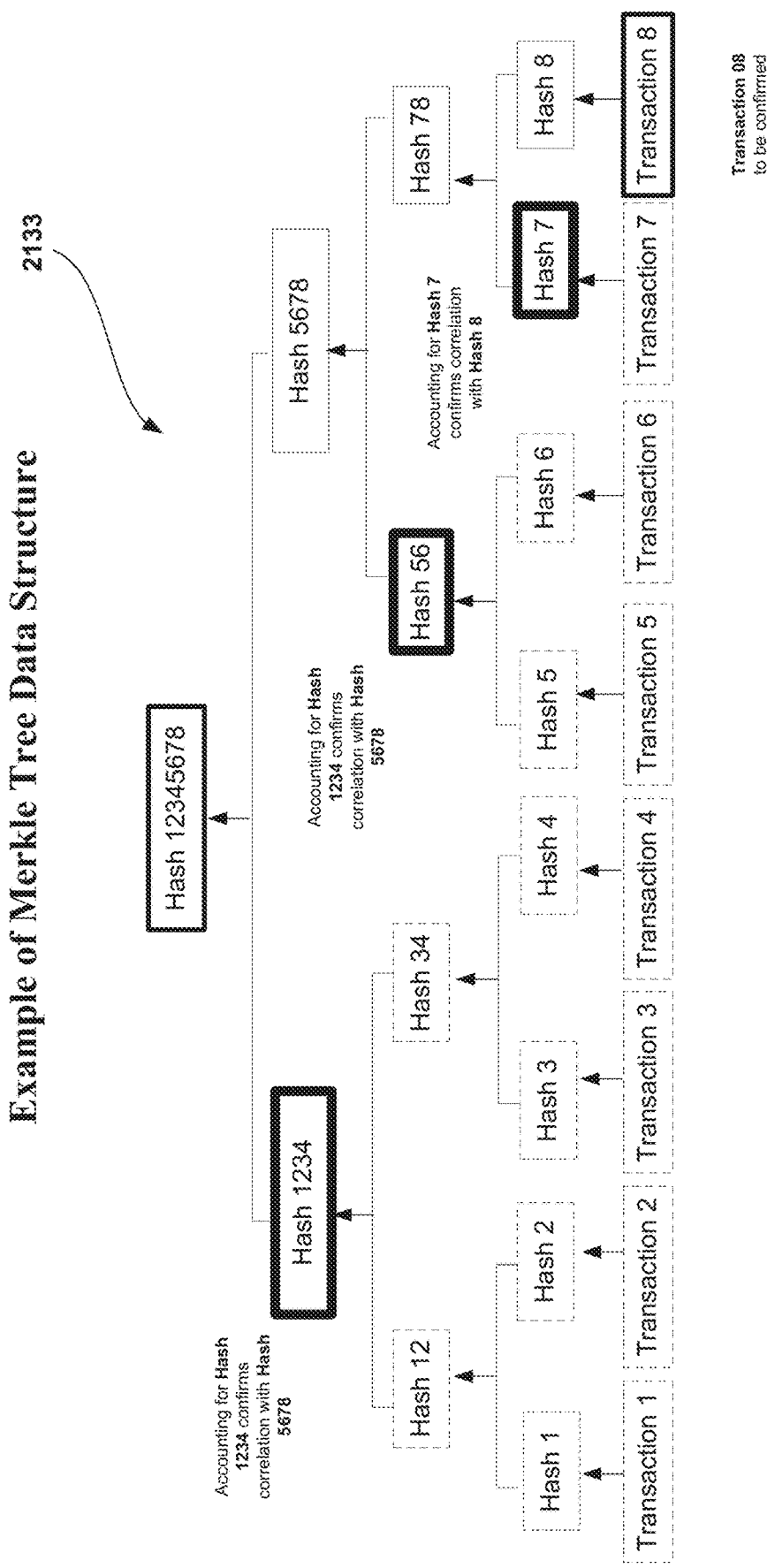
FIG. 30 illustrates an exemplary efficient lookup of data in a Merkle Tree.

In one example, the data structure of the ledger may be a blockchain 2107, as shown in FIG. 28. A blockchain 2107 may comprise a series of blocks that reference each other to form a "chain". As shown in FIG. 28, each block that is part of the chain references its prior block by a hash of the prior block (Prev_Hash), and the block may include a Timestamp, a Nonce, and a Tx_Root, which may be the root of a Merkle tree 2133 as shown in FIG. 29. In cryptography and computer science, a hash tree or Merkle tree 2133 is a tree in which every leaf node is labelled with the hash of a data block and every non-leaf node is labelled with the cryptographic hash of the labels of its child nodes. Hash trees generally allow for efficient and secure verification of the contents of large data structures. Merely as an example, a detailed Merkle tree is shown in FIG. 29, and an efficient lookup 2135 of data in a Merkle tree is shown in FIG. 30. Hash trees are a generalization of hash lists and hash chains.

Alternatively, the data structure of the ledger 2107 may constitute a distributed ledger with a different data structure.

An exemplary process of writing data to the ledger is now disclosed. It should be understood that the data-writing process may be used with, or interfaced with, DAML applications to update data in DAML contracts, submit transactions, or the like.

If a particular node has data to write to the ledger, in the form of an update to a DAML contract, executing a code segment of a DAML contract, deploying a new DAML contract, conducting a transaction in DAML, or the like, the node (e.g., node 2018 or 2022) may transmit the data to a read/write node for recording on the ledger 2007. Alternatively, if the node (e.g., node 2020 or 2024) is a read/write node, it may bypass the transmission to another node. In one example, the data may be cryptographically signed using a digital signature before it is transmitted to provide data integrity. Once received by the read/write node, the data (e.g., a "transaction") may be, in certain instances, hashed and combined with other hashed transactions in an efficient data structure, such as the Merkle tree of FIGS. 29 and 30. Incoming transactions/data may be assembled in a "transaction memory pool" of the read/write node and, in certain examples, logically ordered according to timestamp. In other cases, the transactions might not be ordered according to time. The transaction memory pool may be a buffer or another data-storage mechanism for pooling transaction data prior to recording such data to the ledger 2107.

If a blockchain data structure is used for the ledger, as shown in FIG. 28, the Merkle root (Tx_Root) may be supplied in a block along with a hash of the prior block (Prev_Hash), a block timestamp, and a nonce. A consensus algorithm may then be used by the read/write node to communicate peer-to-peer with other nodes participating in consensus to propose the block for entry into the ledger or blockchain 2107. For instance, the consensus algorithm might rely on a voting process amongst a set of nodes referred to as "validators". A block may be said to be committed by the network when a two-thirds (⅔) majority of validator nodes have cryptographically signed and broadcast commits for a particular block. When enough votes for a block are received, it may be committed to the ledger 2107 along with all the block's transactions. As one of ordinary skill will recognize, other consensus mechanisms (described above) may be used to determine whether to commit a block to the ledger 2107.

In a permissioned distributed ledger, particular nodes may be granted permission to commit blocks to the distributed ledger 2107.

In certain examples, privacy-preserving features may also be used with the distributed ledger or blockchain 2107. For instance, as in the system 2101 and ledger 2007 detailed above, data stores that are accessible only to a specific node (e.g., PCSs 2015) may be segregated/kept private from the public-facing portion of the distributed ledger or blockchain 2007 (e.g., GSL 2013) and/or other nodes. The public-facing portion of the distributed ledger or blockchain 2007 (e.g., GSL 2013) may then be used to ensure that the private data stores (e.g., PCSs 2015) of logically-related nodes (e.g., those who have engaged in a DAML contract) are consistent, with respect to DAML contracts that relate specifically to the parties.

Other privacy-preserving techniques may include encrypting data on-chain or in the ledger, such that the encrypted data is only readable by those with the required keys. Additionally or alternatively, advanced cryptographic techniques such as Zero-Knowledge Proofs (e.g., zkSNARKs, zkSTARKs, Buletproofs, etc.), ring signatures, or other mechanisms may be used to provide confidentiality to transactions as a whole or certain portions of transactions (e.g., a transaction amount).

Overview of System 1

An example of a system 1 to settle a transaction to transfer a plurality of digital assets 7 is illustrated in FIG. 1. The system 1 may comprise a Computational Node 3, one or more transferring computer nodes and one or more receiving computer nodes such as a first computer node 9, second computer node 11 and at least one intermediate node 17. The system 1 may also comprise at least one Execution Node 19.

Although not shown in FIG. 1, system 1 may include all the components, nodes, etc. of system 2001 and/or 2101 detailed previously.

The Computational Node 3 may include a processor and memory. The Computational Node 3 may be configured to receive a notification of a proposed transaction 5. The proposed transaction may relate to the plurality of digital assets 7 to be transferred from a first computer node 9 to the one or more receiving computer nodes in a network 13. In one example, the network 13 may be a network 2101 as described above. The proposed transaction 5 may comprise a plurality of proposed component atomic transactions that atomically transfers at least a portion of the plurality of digital assets 7 from the one or more transferring computer nodes to the one or more receiving computer nodes.

The Computational Node 3 may further be configured to determine at least one digital lock associated with the proposed transaction. The digital lock, when activated, will prevent transfer of any one of the plurality of digital assets 7 to any transferring or receiving computer node that is not a participant designated to receive or transfer at least some of the plurality of digital assets for purposes of the proposed transaction 5.

The Computational Node 3 may further be configured to at least in part determine or verify that each transferring computer node and each receiving computer node is cryptographically authorized to receive and/or transfer at least some of the plurality of digital assets defined in the proposed transaction. The Computational Node 3 may further be configured to at least in part determine or verify that the digital lock is in an activated state to prevent transfer of any one of the plurality of the digital assets 7. Based on the verification, the Computational Node 3 may send an authorization notification to at least one Execution Node 19 to digitally unlock the activated digital lock and transfer the plurality of digital assets 7 from the transferring computer nodes to the receiving computer nodes, which may include one or more intermediate nodes 17 to settle the proposed transaction 5.

The Computational Node 3 and Execution Node 19 may reside on a distributed ledger system as described above. The transferring computer nodes, receiving computer nodes, and any intermediary computer nodes may also reside on a distributed ledger system as described above.

In some examples a first computer node 9 is a node of the transferring computer nodes and a second computer node 11 is a node of the receiving computer nodes. An intermediary node 17 may be an example of either a transferring computer node or a receiving computer node.

Computational Node 3 Receives a Proposed Transaction 5

As described above, the Computational Node 3 may receive a proposed transaction 5. The Computational Node 3 may be associated with the Business Logic Engine of a node in the network 13, such as a transferring computer node like the first computer node 9. In other examples the Computational Node 3 may be associated with another node in the network 13, such as a central node or central committer node 2020 as described above.

In one example the Computational Node 3 may receive the proposed transaction 5 from the first computer node 9. In this example, along with or prior to sending, the first computer node 9 may store the proposed transaction 5 in a private data store of the first computer node 3. The private data store may be the PCS of the first computer node 9 as described above. Similarly, the Computational Node 3, upon receipt of the proposed transaction 5, may be configured to store the proposed transaction 5 in a private data store of the Computational Node 3. The private data store of the Computational Node 3 may be the PCS of the Computational Node 3. In another example, nodes 3, 9 may not store the proposed transaction 5 in a private data store and may instead use other privacy-preserving mechanisms detailed herein to keep the details of the proposed transaction 5 private to the nodes.

In other examples the Computational Node 3 receives the proposed transaction 5 from another node in the network 13, such as a receiving computer node like the second computer node 11. In other examples the Computational Node 3 receives the proposed transaction from a central node or central committer node 2020.

The proposed transaction 5 may relate to a transaction between one or more transferring computer nodes to one or more receiving computer nodes, such as, e.g., first computer node 9 and second computer node 11. This may involve transferring the plurality of digital assets 7 from the first computer node 9 to the second computer node 11. In one example the proposed transaction involves transferring the plurality of digital assets 7 indirectly between the first computer node 9 and the second computer node 11 via the one or more intermediate nodes 17. In this way, the intermediate node 17 may act as a transferring computer node and receiving computer node.

Plurality of Proposed Component Atomic Transactions

As described above the proposed transaction 5 may comprise a plurality of proposed component atomic transactions that atomically transfers at least a portion of the plurality of digital assets 7 from the one or more transferring computer nodes to the one or more receiving computer nodes. This may comprise atomically transferring at least a portion of the plurality of digital assets 7 from the first computer node 9 to the second computer node 11 via the one or more intermediate nodes 17.

The Computational Node 3 may determine the proposed component atomic transactions by dividing the proposed transaction 5 into one or more proposed component atomic transactions. In one example, the Computational Node 3 may determine the proposed component transactions based on the transferring and receiving computer nodes, such as the first computer node 9, second computer node 11 and the one or more intermediate nodes 17. This may involve the Computational Node 3 determining or "mapping" the transfer of the plurality of digital assets 7 from the first computer node 9 to the second computer node 11 via the intermediate nodes 17. In this way, each individual movement of the plurality of digital assets 7 between the nodes 3, 9, 17 may be associated with a proposed component atomic transaction.

In one example the Computational Node 3 may map the transfer of the plurality of digital assets from the first computer node 9 to the second computer node 11 via the system 1 by tracing the potential routes that connect the first computer node 9 to the second computer node 11 via the intermediate nodes (17 and others not pictured in FIG. 1) that are capable of supporting the transfer of tokens necessary to affect the proposed transaction 5.

In some examples, the Computational Node 3 can determine the proposed component atomic transactions based on data included in the proposed transaction 5. In other examples, the Computational Node 3 can determine the proposed component atomic transactions based on additional data available to the Computational Node 3 not otherwise included in the proposed transaction 5.

In some examples, the route for transfer of the plurality of digital assets 7 may be predetermined at the time that the Computational Node receives the notification of the proposed transaction 5. For example, systems with a central token "registry" node and a hierarchy of supporting intermediary nodes that feed into the central token registry node may have a predetermined route. In this way, the node ultimately providing the token can connect with nodes above it in the hierarchy, up each tier of the hierarchy until it connects with the central token registry node, and then down each tier of the hierarchy until it connects with the ultimate receiver node.

For example, a system with one level of hierarchy may have the first computer node 9 representing the ultimate provider node (such as an initial transferring node that provides an initial digital asset to be transferred), the second computer node 11 representing the ultimate receiver node, and the intermediate computer node 17 representing the central token registry node. For examples without such predetermined routes, the Computational Node 3 may test the connections between nodes in the network 13 that would support the transfer of the tokens/plurality of digital assets involved in the proposed exchange, such that the token is able to transfer between the first computer node 9, as the ultimate provider node, and the second computer node 11, as the ultimate receiver node. For example, the Computational Node 3 may determine the intermediate computer node 17 as a suitable route from the first node 9 to the second node 11. Alternatively in such a system without a predetermined path, the Computational Node 3 can also run a simulation of the transaction from the ultimate provider node to the ultimate receiver node to ensure that the correct path has been chosen. Such a simulation may utilize the connections between the ultimate receiver node to the ultimate provider node previously tested by the Computational node, a test of the communication route between to ultimate receiver node to the ultimate provider node to confirm whether such route can also support the transfer of tokens and/or digital assets necessary for the transaction, or to test some other connection determined by the Computational Node 3.

Once the mapping is complete, the Computational Node 3 may determine the proposed component atomic transactions that comprise the overall proposed transaction 5. Utilizing the map/route, the Computational Node 3 can consider each binary pair of computer nodes, i.e. transferring or receiving computer nodes, that comprise the route linking the ultimate provider node to the ultimate receiver node. Each transfer of one or more tokens or digital assets of the same type from one node to another node can comprise a component atomic transaction. In a further example, the Computational Node 3 may consider the transfer of the plurality of tokens or digital assets from one node to the next node as a component atomic transaction. For the avoidance of doubt, each component atomic transaction, in an example, can comprise tokens or digital assets moving in the same direction from one computer node to another. If the pair of computer nodes are exchanging tokens with each other, and even if the tokens are the same tokens, such exchange can be treated as separate proposed component atomic transactions.

The Computational Node 3 can continue determining each of the proposed component atomic transactions until the entire transaction, as mapped out over each intermediary node connecting the ultimate provider nodes and the ultimate receiver nodes has been broken into discrete component atomic transactions, that when added together, comprise the entire transaction. Alternatively, the Computational Node 3 may simulate all of the component atomic transactions to confirm that effectuating the sum of all component atomic transactions will achieve the same results of the overall transaction.

In determining the component atomic transactions, the Computational Node 3 may examine the program instructions (e.g., the smart contract written in DAML or other language) for the overall transaction, and write program instructions/smart contracts for each of component atomic transactions that it will execute in lieu of the program instructions for the overall transaction. In an alternative scenario, the Computational Node 3 may additionally run a simulation utilizing the program instructions/smart contracts for each component atomic transaction to ensure that executing the totality of program instructions/smart contracts for all of the component atomic transactions will produce the same result as executing the program instructions/smart contracts for the overall transaction.

As described below, the Computational Node 3 may utilize such program instructions/smart contracts in analyzing the node and/or running the described simulations. Alternatively, the Computational Node 3 may use other calculations in its analysis.

Alternatively, the Computational Node 3 may perform the step of writing program instructions/smart contracts for each of the component atomic transactions after successfully determining that each node involved in the transaction as sufficient tokens or other digital assets to perform all of its obligations under all of the component atomic applicable to it, as described below. Delaying the this step until after the analysis of each node may save system processing time by eliminating the need for the Computational Node 3 to write such program instructions/smart contracts for transactions that fail the test. If such step is delayed until after the analysis, the Computational Node 3 may conduct the analysis based upon its calculations in lieu of the rewritten program instructions/smart contracts.

The Computational Node 3 can then determine whether each node involved in the overall transaction has sufficient tokens or other digital assets to perform all of its obligations under all of the component atomic transactions. This may be performed by first identifying all component atomic transactions involving the node in question. The Computational Node 3 can then examine all of the component atomic transactions where the node in question is due to receive tokens and digital assets, and then aggregating all of the inbound tokens and digital assets. The Computational Node 3 can also examine all of the component atomic transactions where the node in question is due to transfer/send tokens and digital assets, aggregating all of the outbound tokens and digital assets. The Computational Node 3 can then subtract the aggregated outbound tokens and digital assets from the aggregated inbound token and digital assets. In performing this calculation, the Computational Node 3 can, in one example, only subtract tokens and digital assets of the same type. If the result is positive or neutral for each token and digital asset subtracted, the Computational Node 3 can consider the node in question to have sufficient tokens and digital assets to complete the transaction and mark the node a success. Alternatively, the Computational Node 3 may query all nodes as described in the following paragraph, regardless of a positive, neutral, or negative calculation. If the result is negative for any token or digital asset subtracted, the Computational Node 3 may examine whether the node has such token or digital asset available in the amount to cover the negative calculation.

In an alternative scenario, to prevent nodes from entering into fully netted transactions without having the necessary tokens, the Computational Node 3 may query the ultimate provider node to ascertain that such node has the tokens that originate from it. In this query of the ultimate provider node, the Computational Node will not take into account tokens that such ultimate provider node may receive during or upon the completion of the transaction.

To check whether the node has the required token or digital assets in the amount necessary to cover the negative calculation, the Computational Node 3 may query the PCS of the node. Alternatively, the Computational Node 3 may query the PCS of the central Execution Node or another node such as a central Committer Node. Alternatively, the Computational Node 3 may query its PCS.

If the Computational Node 3 determines that the node has sufficient tokens or digital assets to cover the negative calculation, the Computational Node 3 can consider the node in question to have sufficient tokens and digital assets to complete the transaction and mark the node a success. The Computational Node 3 can include tokens and digital assets previously Locked to the transaction in question as available to cover the negative calculation. The Computational Node 3 can exclude any tokens and digital assets previously locked to any other transaction as unavailable. In this example, the Computational Node 3 can mark the tokens or digital assets necessary to complete the transaction, and either Lock them to the transaction or otherwise reserve them to prevent them from being used for any other transaction. If the Computational Node 3 determines that such node does not have sufficient tokens or digital assets to cover the negative calculation, the Computational Node 3 can consider the node in question to have insufficient tokens and digital assets to complete the transaction and mark the node a failure.

In one example the overall proposed transaction can only be performed if all nodes involved can successfully perform all component atomic transactions. If any one node cannot perform any one component atomic transaction, the entire transaction may fail. In a further example, the Computational Node may fail the transaction by sending a notification to all nodes in the transaction, i.e. all transferring computer nodes and all receiving computer nodes, that a component atomic transaction(s) was determined not to succeed.

Examples with Central Nodes

In examples with a central Computational Node 3 and either a central Committer Node or a central Execution Node 19 (where the central Committer Node may be an Execution Node 19), the central Computational Node 3 can notify the central Execution Node 19 of the potential transaction and the tokens and digital assets being queried in each node involved in the transaction. The central Execution Node can prevent the transfer of any tokens and digital assets necessary for any node that was marked successful. Such tokens or digital assets at a particular node might either be Locked or reserved for the overall transaction during the time the Computational Node 3 queries such node for success or failure of its ability to meet the obligations of the component atomic transactions applicable to such node. Should the Computational Node 3 pass the entire transaction for settlement, the Lock can remain on such tokens or digital assets until the time of settlement. Thus, in the event all component atomic transactions and all applicable nodes are marked successful by the Computational Node 3, then the tokens or digital assets Locked or reserved can be used to complete the transaction 5. In the event any component atomic transaction or any applicable node is marked a failure, the entire transaction can be marked a failure, and the digital lock or the reservation of the tokens or digital assets can be released by the Computational Node 3.

The mapping of the transaction, the determination of the nodes involved in the transaction, the determination of the component atomic transactions that comprise the overall transaction, and the queries of each node for sufficient available assets to cover such node's obligations in each of the component atomic transactions involving such node is hereby referred to collectively as the "Settlement Logic."

In this way, once the Computational Node 3 has determined that each component atomic transaction and each applicable node has passed the tests described above, then the Computational Node 3 can submit the entire transaction, comprised of each component atomic transaction, for processing to the Execution Node 19. The central Execution Node can ensure that all component atomic transactions are executed as a whole together. Alternatively, the central Execution Node can ensure that all component atomic transactions are written to the same block on the distributed ledger 15 and/or that such component atomic transactions share a common time stamp. That is, the Execution Node 19 may ensure that all component atomic transactions are recorded to the distributed ledger 15 with the same timestamp applicable to all transactions and other data ledgered on that block. In an alternate scenario, the Execution Node 19 can do this by either querying the remaining data capacity of any block prior to writing all of the necessary data of all component atomic transactions to the block. Alternatively, the Execution Node may also wait until the beginning of the next block to ensure that all component atomic transactions of the relevant transaction are recorded together, bearing the same timestamp of the block.

Decentralized Distributed Ledger Systems

In examples without a centralized Computational Node 3 and without a centralized Execution Node 19, each computer node in the network may contain its own components bearing the same functionalities that would have been performed by a Computational Node and an Execution Node. As these components are limited to the computer node containing it, however, the functionalities may only be applicable to the node containing the component. Thus, the Computational Component may only query the node containing that Computational Component, and the committer and the Execution component may only commit and transfer tokens and digital assets held by the node containing the respective components.

In this example, mapping of the proposed transaction 5 from the ultimate provider nodes and the ultimate receiver nodes may be accomplished in several different ways. The map/route may be predetermined as described in paragraph above. Alternatively, there may be a node with a map of all nodes which may be queried to determine such a map in a similar manner to a system with a centralized node.

Alternatively, in a truly decentralized system, once the ultimate receiver nodes and the ultimate provider nodes agree upon a proposed transaction 5, each node may utilize the node network which transmitted the messaging of the agreement. Alternatively, if the messaging network does not also support the transfers of the plurality of the tokens or digital assets, each ultimate receiver node and ultimate provider node can submit test queries to adjacent intermediary nodes who then pass on these queries until these queries reach the desired ultimate receiver nodes and/or ultimate provider nodes, as applicable, that are parties to the transaction. In such an event, the path of the successful query can constitute the map/route of the proposed transaction 5.

Once the map/route of the transaction 5 in a decentralized system is complete, each node can transmit the entire map/route and the transaction to all nodes involved in the transaction, including any intermediate nodes. The Computational Component of a node may then utilize the map to determine the proposed component atomic transactions comprising the entire transaction and broadcast its determination to all nodes involved in such component atomic transactions. Such calculations can be in the same manner as described above, with each unidirectional movement of tokens or digital assets between a binary pair of nodes constituting a single component atomic transaction.

Alternatively, the Computational Component of each node can then utilize that route to calculate the component atomic transactions comprising the entire transaction. Such calculation maybe in the same manner as described above. Each node may optionally transmit such calculation of the component atomic transactions to ensure that all Computational Components of the different nodes involved in the transaction 5 agree with each other's calculations. The Computational Components of the different nodes can then work to reconcile any differences, if any, by utilizing a set algorithm of determining consensus, first ensuring that each node had the same map, then by ensuring that each node utilized the same calculation method, and finally, if there is still is no unanimous calculation of the component atomic transactions, by some other method, such as majority rule. Alternatively, as the calculation of component atomic transactions is unlikely to result in differences, especially in systems with predetermined routes, the nodes may not necessarily confirm that the Computational Components of the other nodes reached the same calculations.

Once the component atomic transactions are determined, the Computational Component of each node can query the node to determine whether that node has sufficient tokens or digital assets necessary to fulfil all component atomic transactions involving it. As described in paragraph above, the Computational Component can subtract the aggregated outbound tokens and digital assets from the aggregated inbound token and digital assets, only subtracting tokens and digital assets of the same type. If the result is positive or neutral for each token and digital asset subtracted, the Computational Component can consider its node to have sufficient tokens and digital assets to complete the transaction and mark its node a success. If the result is negative for any token or digital asset subtracted, the Computational Component can look to examine whether its node has such token or digital asset available in the amount to cover the negative calculation. If the Computational Component determines that its node has sufficient tokens or digital assets to cover the negative calculation, the Computational Component can consider its node to have sufficient tokens and digital assets to complete the transaction and mark the node a success. In such event, the Computational Component can mark the tokens or digital assets necessary to complete the transaction, and either Lock them to the transaction or otherwise reserve them to prevent them from being used for any other transaction. If the Computational Component determines that its node does not have sufficient tokens or digital assets to cover the negative calculation, the Computational Component can consider its node to have insufficient tokens and digital assets to complete the transaction and mark its node a failure.

When the Computational Component marks its node as a success, it can also Lock or otherwise reserve the tokens or digital assets necessary to cover any negative calculation and thus necessary to process the component atomic transactions due to be processed from its node. These tokens or digital assets can be Locked or reserved until either the node receives a message from another node that such other node failed the query and did not have sufficient tokens or digital assets to meet its obligations or until the settlement of the entire transaction.

After completing the queries of their own nodes, the Computational Components of each of the nodes involved in the transaction may then message each of the other nodes to inform them of their success or failure. If any one node messages failure or fails to message, then the entire transaction is deemed a failure and cancelled. If all nodes message success, then, and only then, will the transaction be cleared for settlement.

In a decentralized system as described in this example, once the transaction has been cleared for settlement, each of the nodes involved in the settlement of that transaction can coordinate with the others to effect the settlement of the overall transaction by acting upon each of the component atomic transactions simultaneously. The transaction itself may contain a time for its execution, as agreed upon by the participants to the transaction. In this way, the nodes can execute their component atomic transactions at the agreed time, each writing its portions of the component atomic transactions to the block at the agreed/pre-designated time. Alternatively, a "lead" node may be designated to select the block upon which all component atomic transactions will be written. Such a lead node can ensure that it will wait until the beginning of a block or it may generate a separate block, in either case, to ensure that all component atomic transactions are written on the same block, such that all component atomic transactions, and thus the entire transaction, bears the same time stamp. Alternatively, each node may message the other as to the moment that the component atomic transactions should be written to a block, again ensuring that all component atomic transactions are written on the same block, bearing the same timestamp.

In yet another scenario, an Execution Node can be designated to aggregate all component atomic transactions from all nodes involved in the proposed transaction, and submit all component transactions aggregated into a single transaction. The Execution Node can then broadcast the proposed transaction to the network of nodes maintaining the distributed ledger, which can record the proposed transaction to the distributed ledger if it satisfies network parameters. If not, the proposed transaction, and all its component atomic transactions, can be failed and nothing recorded to the distributed ledger. In this way, the Execution Node can serve as a coordinator and proxy for submitting all component atomic transactions at the same time, as part of a single proposed transaction.

Figure 2:
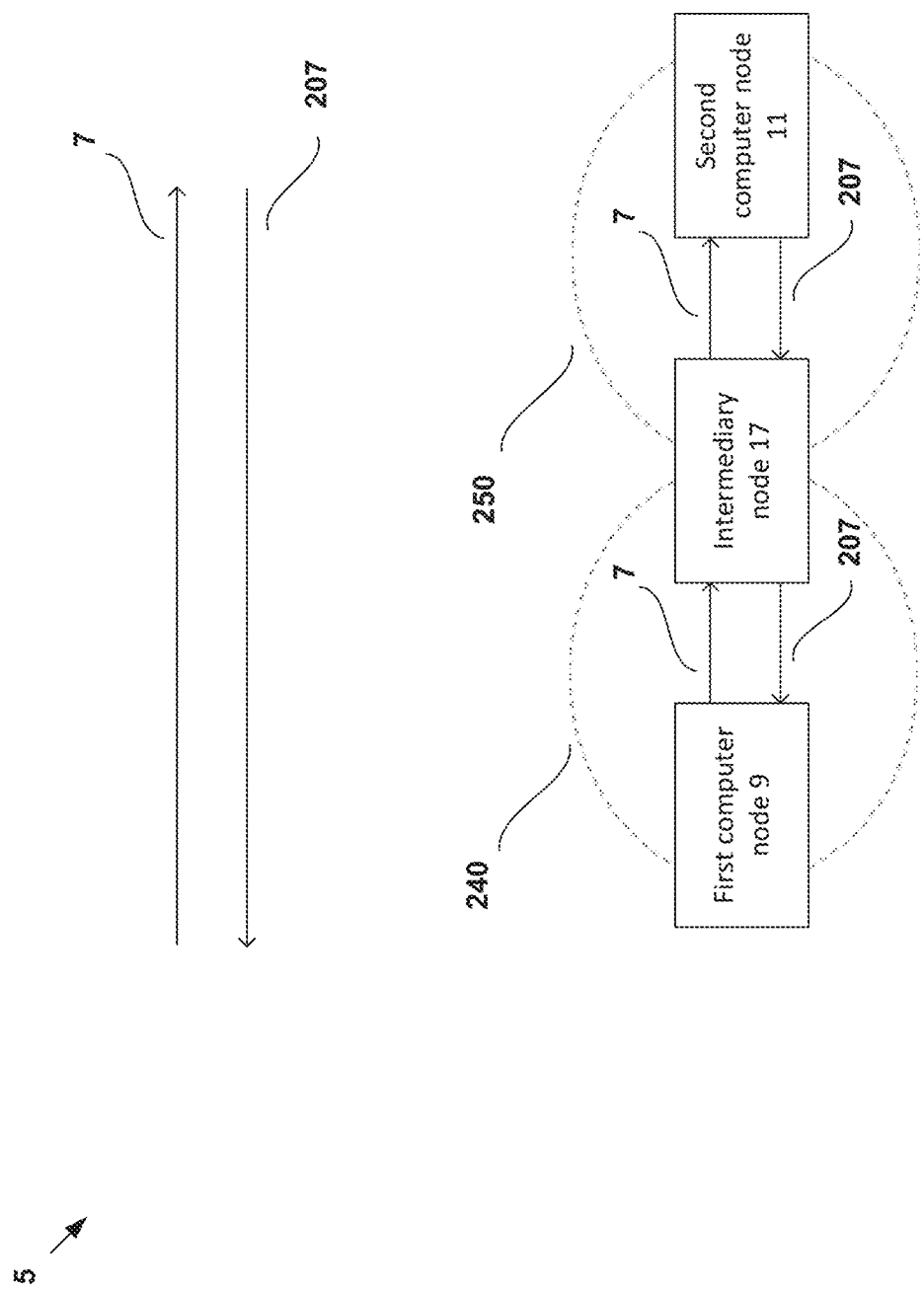
FIG. 2 illustrates an example transaction and proposed component transactions consistent with embodiments of the present disclosure.

FIG. 2 illustrates an example proposed transaction 5 between a first computer node 9 and a second computer node 11. In this example, the proposed transaction 5 involves a transfer of the digital asset 7 from the first computer node 9 to the second computer node 11, as well as a transfer of a digital asset 207 from the second computer node 11 to the first computer node 9. In some examples the first computer node 9 and second computer node 11 may comprise sports teams trading players, or a seller and buyer or a lender and borrower respectively. In this example the Computational Node 3 (not illustrated in FIG. 2) may determine the proposed component transactions by dividing the proposed transaction 5 into multiple proposed component transactions 240 and 250. As illustrated in FIG. 2, the first component transaction 240 comprises a transfer of the digital asset 7 from the first computer node 9 to the intermediary node 17, and a transfer of the digital asset 207 from the intermediary node 17 to the first computer node 9. The second component transaction 250 involves a transfer of the digital asset 7 from the intermediary node 17 to the second computer node 11, and a transfer of the asset digital 207 from the second computer node 11 to the intermediary node 17. In this way, the Computational Node 3 may determine the proposed transactions 240, 250 by considering the movement of the digital assets 7, 207 between the first computer node 9, second computer node 11 and intermediary note 17.

Digital Lock

As described above, the Computational Node 3 may be configured to determine at least one digital lock associated with the proposed transaction. In one example, the proposed transaction 5 may comprise at least one digital lock. In this way, the Computational Node 3 may determine the proposed digital lock from the proposed transaction 5. In other examples the Computational Node 3 may determine the digital lock by receiving the digital lock from a node, such as a transferring computer node or receiving computer node like the first computer node 9 or another node in the network 13.

In some examples the Computational Node 3 may determine the digital lock using the methods described in International PCT application PCT/US2018/044682, the disclosure of which is incorporated herein by reference in its entirety.

In one example, the Computational Node 3 determines the digital lock from the proposed transaction 5 from the first computer node 9. In this example, the first computer node 9 may cryptographically sign (e.g., using a private key, digital signature, etc.) the digital lock that is sent to the Computational Node 3 so that the Computational Node 3 may confirm the authenticity of the digital lock. Cryptographically signing a digital lock may comprise creating and applying a digital signature to a message containing the digital lock by way of a private key associated with the first computer node 9. Cryptographically signing the digital lock may permit the Computational Node 3 (or another node in the network 13) to verify that the digital lock came from the first computer node 9 of the proposed transaction 5.

The digital lock can, in one example, comprise instructions or code (e.g., in DAML as shown in FIG. 3) that, when executed, "commits" or digital locks the first computer node 9 and second computer node 11 to a transaction involving a digital asset 7 recorded to a distributed ledger 15. The distributed ledger 15 may be either of distributed ledgers 2007 or 2107 detailed above in the context of systems 2001 and 2101, respectively. In one example, the digital lock may comprise an inactive digital lock related to the digital asset 5, wherein when activated the digital lock may prevent transfer of any one of the plurality of digital assets 7 from the first computer node 9 to another node that is not the second computer node 11 or an intermediate node 17.

The Computational Node 3 may also be configured to receive acceptance of the digital lock from a transferring or receiving computer node such as the second computer node 11. This acceptance may indicate that the second computer node 11 (or other node in the network 13 that is party to the digital lock) agrees to the terms in the digital lock of the proposed transaction 5. In one example, after the Computational Node 3 receives the acceptance 7, the Computational Node 3 may activate the inactive digital lock to prevent transfer of the digital asset 7 except to settle the proposed transaction 5. The acceptance may comprise a notification or token that is sent from the second computer node 11 to the first computer node 9 or Computational Node 3. In some examples, the first computer node 9 may receive the acceptance from the second computer node 11 and send it to the Computational Node 3. In some examples the acceptance may provide an indication that parameters of the digital lock are accepted for the transaction by the second computer node 11. The second computer node 11 may cryptographically sign the acceptance in some embodiments.

Additionally or alternatively, the acceptance may take the form of the second computer node 11 simply activating the digital lock and messaging the first computer node 9 as to its acceptance of the digital lock, either privately and/or by recording its acceptance to the distributed ledger 15. Activating the digital lock may constitute the first computer node 9 or second computer node 11 executing program instructions (e.g., a code segment) that acts to: (i) submit a transaction that is recorded to the distributed ledger (e.g., ledger 15, 2007, or 2107) to update the state of the ledger and reflect that the digital asset is locked except for purposes of settling the digital asset transfer from the first node 9 to the second node 11, and/or (ii) deploy additional program instructions or code that specifies the details of the digital asset transfer (e.g., the particular digital asset, quantity, price, parties to the transfer, etc.) and includes a code segment(s) executable by the first computer node 9 or the second computer node 11 that transfers the digital asset from the first computer node 9 to the second computer node 11 according to the details of the agreed-upon transfer. The instructions of (ii), or a cryptographic representation (e.g., a hash) thereof, may be recorded to the distributed ledger (e.g., ledger 15, 2007, or 2107) as a transaction or series of transactions, in certain cases.

In other examples the first computer node 9 may activate the digital lock. In this way the code segment(s) of (ii) that transfers the digital asset 7 may, in one example, require a cryptographic signature (e.g., private key, digital signature, etc.) by the first computer node 9 to be executed. Likewise, in embodiments where the second computer node 11 activates the digital lock, the code segment(s) of (ii) that transfers the digital asset may, in one example, require a cryptographic signature (e.g., private key, digital signature, etc.) by the second computer node 11 to be executed. For example, the first computer node 9 may send a digital lock that includes a code segment that is executable by the second computer node 11 upon providing its cryptographic signature and, when executed, acts to lock the digital asset 7 that is the subject of the transaction for purposes of settling the transaction. By sending the digital lock with the code segment executable by the second computer node 11, the first computer node 9 may be considered to have implicitly agreed to activation of the digital lock according to the terms set forth in the proposed transaction 5 and associated digital lock. Thus, the second computer node 11 may be free to activate the digital lock that is associated with the proposed transaction 5 by executing the activation code segment provided by the first computer node 9 in the digital lock.

In some examples, the digital lock may also comprise instructions or code that, when executed, commits the first computer node 9 and the second computer node 11 to the same transaction also involving the digital asset 207. In this way, when the digital lock is activated the digital lock may also prevent transfer of the digital asset 207 from the second computer node 11 to another node that is not the first computer node 9 or an intermediary node 17.

In other examples the proposed transaction 5 may comprise a further digital lock to lock and/or commit the digital asset 207 for transfer from the second computer node 11 to the first computer node 9 or an intermediary node 17. The further digital lock may be in accordance with the embodiments of the digital lock described above.

In some examples, the distributed ledger may resolve and commit one or more digital locks that are locked and all unlocked within the a same atomic transaction by consolidating all locks and unlock into the lock and unlock of the two step commit of the distributed ledger transaction (e.g. GSL 2013).

For distributed ledger systems without a centralized Computational, Execution, or Write Nodes, the above processes can be performed by the Computational, Execution, or Write Components, as applicable, of each of the nodes involved in the transaction.

Digital Locks for the Plurality of Proposed Transactions

In some examples each of the plurality of proposed component atomic transactions may be associated with one or more digital locks. In this way, the Computational Node 3 may determine the one or more digital locks in accordance with the method described above.

The one or more digital locks may be activated to prevent transfer of any one of the plurality of digital assets in multiple proposed component transactions.

Verify that the Computer Nodes are Cryptographically Authorized

As described above, the Computational Node 3 may also be configured to verify that each of the first computer node 9 and second computer node 11 is cryptographically authorized to receive and/or transfer the digital asset(s) defined in the proposed transaction.

In one example, verifying that the nodes 9, 11 are cryptographically authorized may comprise determining whether each node 9, 11 has the digital asset(s) required for the proposed transaction 5 to occur. For example, referring to FIG. 2 the Computational Node 3 may verify that first computer node 9 has digital asset 7, and that second computer node 11 has digital asset 207. In addition, verifying that the nodes 9, 11 are cryptographically authorized to receive and/or transfer the digital asset(s) defined in the proposed transaction can involve determining whether the nodes 9, 11 have appropriate cryptographic authorization to execute one or more code segments (e.g., DAML contracts) recorded to the distributed ledger, which are required to effectuate the proposed transaction. This can involve determining whether the nodes 9, 11 have an appropriate cryptographic key to execute such one or more code segments (e.g., DAML contracts) recorded to the distributed ledger, as detailed below.

To perform verification, the Computational Node 3 may read a private data store associated with the first computer node 9 to confirm a digital asset 7 is unlocked and can be transferred from the first computer node 9 to another computer node in the network 13. The private data store associated with the first computer node 9 may be the PCS of the first computer node 9. In another example, the Computational Node 3 may read the distributed ledger 15 to confirm the digital asset 7 is unlocked.

Similarly, the Computational Node 3 may read a private data store associated with the second computer node 11 to confirm digital asset 207 is unlocked and can be transferred from the second computer node 11 to another computer node in the network 13. The private data store associated with the second computer node 11 may be the PCS of the second computer node 11. In another example, the Computational Node 3 may read the distributed ledger 15 to confirm the digital asset or asset 207 is unlocked.

In a further example, verifying that the nodes 9, 11 are cryptographically authorized may comprise determining whether each node 9, 11 has the digital asset(s) committed to the proposed transaction 5.

Verifying may also comprise validating that a node is properly permitted to execute a particular code segment. In one example, validating that a node is properly permitted to execute a particular code segment may be enforced using digital signatures and/or public/private key pairs associated with a node. For instance, in the above example, execution of the code segment by the second computer node 11 that activates the digital lock may be enforced using a public/private keypair associated with the second computer node 11. To demonstrate that the second computer node 11 is permitted to execute the code segment activating the digital lock that is associated with the proposed transaction 5, the second computer node 11 may cryptographically sign (e.g., using its private key, a digital signature, etc.) to confirm it is a node permitted to execute the code segment. Likewise, determining whether any node is properly permitted to execute a code segment described herein may use the same mechanism (i.e., require a cryptographic signature by such node for execution of the code segment). Accordingly, embodiments of the present disclosure may use a technical solution including cryptographic signatures to avoid trust problems that arise with conventional intermediaries.

Digital Lock in an Activated State to Prevent Transfer of the Digital Asset 7

As described above, when activated the digital lock may prevent transfer of the digital asset 7 to another computer node. In this way, the digital asset 7 may be "committed" to the proposed transaction 5. In one example, after activation of the digital lock associated with the proposed transaction 5, the Computational Node 3 may broadcast the activated digital lock for recordation in the distributed ledger 15, 2007, 2107. In other examples, the first computer node 9 or second computer node 11 or another node in the network may broadcast the activated digital lock for recordation. As described previously, the distributed ledger 15 may comprise a GSL 2013 shared between nodes of the system 2001, and separate PCS s 2015 of the first computer node 9 and second computer node 11 that are participants to the proposed transaction 5 including the digital asset 7. The first computer node 9 and/or second computer node 11 may also read the distributed ledger (e.g. ledger 15, 2007, or 2107) to confirm the distributed ledger contains the digital lock in an activated state. In some examples, the Computational Node 3 (or other nodes 9, 11) may transmit data to a central node (e.g. a central writer or a "committer" node) for recordation in the distributed ledger (e.g. ledger 15, 2007, or 2107). Accordingly, the central node may act as a writer node as described above to record evidence of the activated digital lock to the GSL 2013. The nodes 3, 9, 11 may also act in writer mode to record evidence of the activated digital lock on the GSL 2013 of the distributed ledger. In some examples, evidence of the activated digital lock may comprise a cryptographic representation of the activated digital lock, such as a hash, recorded in the GSL 2013.

With the activated digital lock recorded to the distributed ledger (e.g., ledger 15, 2007, or 2107), all participants to the transaction, such as the first computer node 9 and second computer node 11, may confirm that the digital asset 7 that is subject to the proposed transaction 5 is locked for purposes of the specific transaction 5 and that transaction only. Further, the distributed ledger 15 may serve as the prime source of truth between the parties that the digital asset 7 is locked for purposes of their transaction 5 and that transaction only.

Send an Authorization Notification to at Least One Execution Node 19

As described above, the Computational Node 3 may further be configured to send an authorization notification to at least one Execution Node 19 to cryptographically unlock the activated digital lock and transfer the digital asset 7 from the first computer node 9 to the second computer node 11 via the at least one intermediate node 17 to settle the proposed transaction 5. The Execution Node 19 may be associated with the Business Logic Engine ("BLE") of a node in the network 13. In some examples, there may be more than one Execution Node 19 so that the function of the Execution Node is shared between nodes.

As also described above, the sending of the authorization notification may be based on the verification that the first computer node 9 and second computer node 11 are cryptographically authorized to receive and/or transfer the digital asset 7 (and/or digital asset 207) defined in the proposed transaction 5. In this way, the authorization notification may indicate to the Execution Node that the proposed transaction 5 is ready for execution. In other words, this may mean that the digital asset 7 is ready for transfer from the first computer node 9 to the second computer node 11 via the at least one intermediate node 17.

Sending the authorization notification may comprise the Computational Node 3 sending a notification or token to the Execution Node 19. In other examples, the Computational Node 3 may send the authorization notification or token to the Execution Node 19 via another node such as the computer nodes 9, 11, 17. In further examples, another node may send the authorization notification or token to the Execution Node 19. The authorization notification may provide confirmation to the Execution Node 19 that the transaction is ready for settlement. In other examples, the Computational Node 3 may send the authorization notification to the Execution Node 19 via another node in the network 13.

The authorization notification may comprise details of the proposed transaction 5 and the proposed component atomic transactions, including details of the nodes 9, 11, 17.

The authorization notification may cryptographically unlock the activated digital lock. Cryptographically unlocking the activated digital lock may comprise deactivating the digital lock. In this way, the Execution Node 19 may be configured to deactivate the digital lock related to the digital asset 7. In some examples, deactivating the digital lock related to the digital asset may comprise executing program instructions (e.g., a DAML code segment) that updates the distributed ledger (e.g., ledger 15, 2007, or 2107) as part of a transaction or series of transactions to reflect that the digital asset may be transferred by the first computer node 9 to another node (such as second node 11 via one or more intermediate nodes 17) in the network (e.g., network 13, 2001 or 2101) without restriction. For example, this may include recording a code segment (e.g., a DAML code segment) and/or a cryptographic representation (e.g., a hash) thereof, to the distributed ledger (e.g., ledger 15, 2007, or 2107) that is executable by first computer node 9 or Execution Node (e.g., upon providing its cryptographic signature) and, when executed, transfers the digital asset 7 from the first computer node 9 to another node in the network 13 without restriction. A process for execution of shared code segments (e.g., DAML shared code segments) is described in detail in PCT/IB2018/058375, the disclosure of which is hereby incorporated by reference herein. The process described in the aforementioned application can be utilized to lock or unlock any digital lock of the present system, as detailed above and in subsequent sections of the disclosure.

As described, deactivating the digital lock may comprise sending a token of deactivation to another node in the network 13. Examples of other nodes include the second computer node 11 or a central node. The other node may then update the ledger (e.g. ledger 15, 2007, 2107) to deactivate the digital lock. Additionally or alternatively, the other node may deactivate the digital lock.

After the Execution Node 19 receives the authorization notification, the Execution Node 19 may pass the proposed transaction 5 to a Write Node. The Write Node may then record the proposed transaction 5, including the proposed component transactions, to a block on the ledger 15. In some examples, the Write Node records the proposed transaction 5 to a single GSL block of the GSL.

The Write Node can record each of the movements by the Execution Node. The Write Node can allow for the simultaneous transfer of the digital assets involved in the proposed component atomic transactions by recording each proposed component transaction in the same block, thus allowing each component transaction to occur with the same timestamp. In practice, this means that each proposed component atomic transaction can have the same timestamp for execution. This is an advantage of the present disclosure since the proposed component transactions will be executed with the same timestamp. This eliminates risk of non-performance and delay in exchange of the digital assets. In other examples, each proposed component atomic transaction can be submitted for inclusion in the distributed ledger as part of the same overall transaction, where the transaction is provided with a timestamp when recorded to the distributed ledger. In this way, if a proposed component atomic transaction fails, the overall transaction can fail and not be recorded to the distributed ledger. Additionally, since the overall transaction is provided a timestamp when recorded to the distributed ledger, each proposed component atomic transaction, for purposes of settling the exchange of digital assets, can be considered to be submitted and/or settled all at the same time, thereby reducing risk of non-performance or delay in the exchange of the digital assets.

In some examples, the transfer of the digital asset 7 may be executed by the Execution Node 19 at some set time. In practice, this may comprise the first computer node 9 transferring the digital asset 7 in accordance with the transaction and being permitted to execute program instructions (e.g., a DAML code segment) that transfers the digital asset 7 from the first computer node 9 to the second computer node 11 via the at least one intermediate node 17 for the purposes of settling the transaction. As previously mentioned, such DAML code segment, or a cryptographic representation (e.g., a hash) thereof, can be recorded to the ledger (e.g., ledger 13, 2007, or 2107) in advance of execution of the segment to ensure that proper evidence is in the ledger as to the content of the code segment and which node(s) is authorized to execute the segment. Subsequently, the computer node (e.g. node 9, 11 or 17) that executes the program instructions (e.g., code segment) transferring the digital asset 7 may record an update to the distributed ledger (e.g., ledger 15, 2007, or 2107) that lists the intermediary node(s) 17 or computer node 11 as the transient owner of the digital asset. Alternatively, the node (e.g., node 9, 11 or 17) that executes the transfer code segment may delegate recording to the distributed ledger to another node (e.g., a write node).

In this way, by unlocking the digital asset(s) of the proposed transaction 5, this can cause the proposed component transactions to be settled. That is, the Execution Node can execute the transaction 5, moving the digital asset 7 in accordance with each proposed component transaction.

For example, referring to FIG. 2, at the time of settlement the Execution Node 19 may move the digital asset 7 in accordance with the proposed component transactions 240, 250. In this way, the digital asset 207 can also move in accordance with the proposed component transactions 240, 250. That is, the digital asset 7 may transfer from the first computer node 9 to the intermediary node 17 and the digital asset 207 may transfer from the intermediary node 17 to the first computer node 9. The digital asset 7 may then transfer from the intermediary node 17 to the second computer node 11, and the digital asset 207 may transfer from the second computer node 11 to the intermediary node 17.

Method 400

Figure 4:
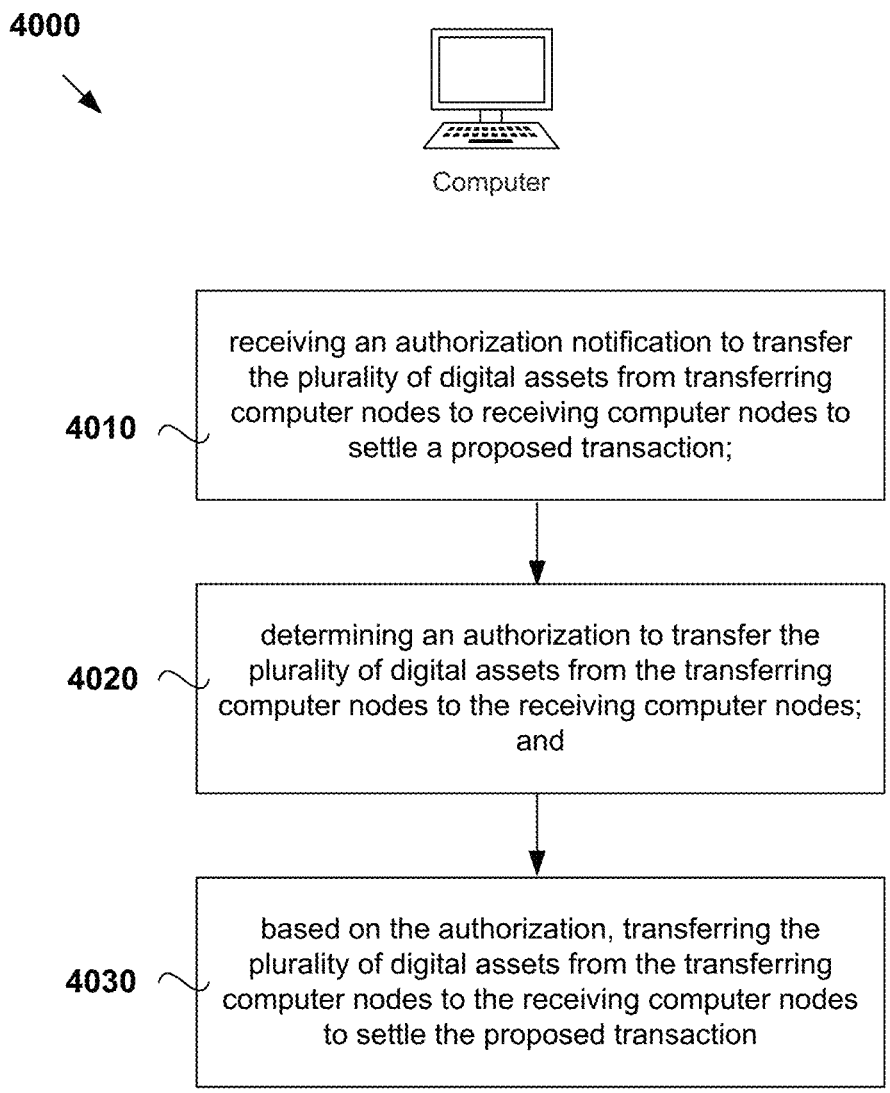
FIG. 4 illustrates an example method to facilitate settlement of a transaction consistent with embodiments of the present disclosure.

FIG. 4 illustrates a method 400 to facilitate settlement of a transaction involving a plurality of digital assets 7. In the method 400, the transaction may be based on a proposed transaction 5 as described above. That is, the proposed transaction 5 may comprise a plurality of proposed component atomic transactions that each atomically transfer at least some of the plurality of digital assets from one or more transferring computer nodes to one or more receiving computer nodes, wherein each of the transferring computer nodes and receiving computer nodes belong to a network 13 of nodes that maintain a distributed ledger 15.

In some examples, a transferring computer node may be a first computer node 9 and a receiving computer node may be a second computer node 11 as described above. In further examples an intermediate node 17 may act as a transferring and receiving computer node.

In some examples, a node such as the Computational Node 3 may determine the proposed component atomic transactions by dividing the proposed transaction 5 into one or more proposed component atomic transactions. For example the Computational Node 3 may determine the proposed component transactions based on the transferring and receiving computer nodes, such as the first computer node 9, second computer node 11 and the one or more intermediate nodes 17. This may performed as described above with respect to system 1.

The method 400 may comprise receiving 4010 an authorization notification to transfer the plurality of digital assets from the transferring computer nodes to the receiving computer nodes to settle a proposed transaction. As described above, a node such as the Computational Node 3 may be configured to send the authorization notification. As also described above the authorization notification may indicate to the receiving node, such as the Execution Node 19, that the proposed transaction 5 is ready for execution. The authorization notification may comprise a notification or token as described above.

The authorization notification may be based on a verification that each transferring and receiving computer node is cryptographically authorized to receive and/or transfer at least some of the plurality of digital assets. The authorization notification may further be based on a verification that each transferring and receiving computer node involved in the proposed transaction has a sufficient amount of the plurality of digital assets to fulfil all of the transferring or receiving computer node's obligations under each proposed component atomic transaction involving such node.

The method 400 may further comprise determining 4020 an authorization to transfer the plurality of digital assets 7 from the transferring computer nodes to the receiving computer nodes.

The method 400 may further comprise atomically transferring 4030, based on the authorization, the plurality of digital assets 7 from the transferring computer nodes to the receiving computer nodes to settle the proposed transaction 5.

Examples of the present disclosure further include a non-transitory computer-readable medium comprising program instructions that, when executed, cause a computer to perform the method 400 as illustrated in FIG. 4 and described above. The non-transitory computer-readable medium may also comprise program instructions that, when executed, cause a computer to perform the steps described above with respect to the examples of system 1.

Further Examples of Proposed Component Transactions

As a foreword to the following examples, it is important to note that the inefficiencies, risks, and potential failures of current operational systems as described below may be solved using embodiments of the present disclosure without the need to eliminate nodes or participants or their roles in current operational systems or otherwise change the structure of current operational systems.

Simple Exchange

Figure 5:
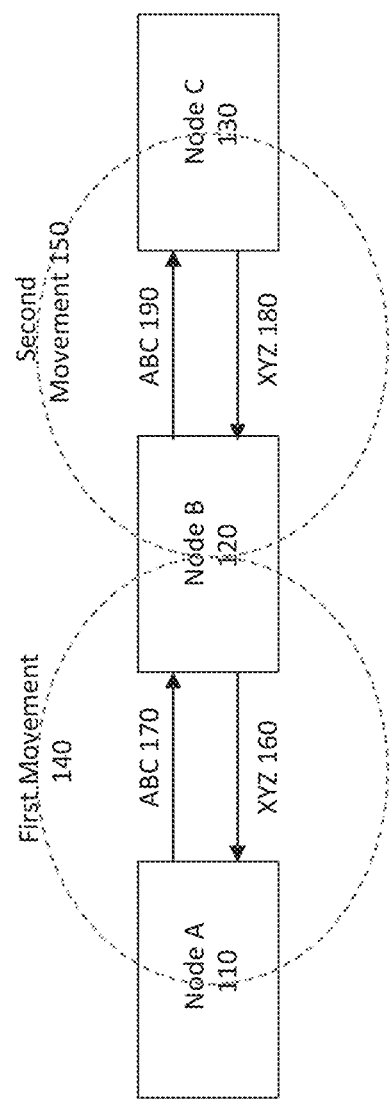
FIG. 5 illustrates an example flow and transfer of a digital asset between multiple nodes.

FIG. 5 shows the inefficiencies of current operational systems via a simple and typical transaction where Node A 110 exchanges token ABC to Node C 130 for token XYZ, where that transaction is settled through intermediary Node B 120. In this simplest scenario, Node A 110 and Node C 130 share a mutual intermediary, Node B 120, and the transfer of the token ABC from Node A to Node B is actually an exchange transaction where Node A 110 transfers token ABC to intermediary Node B 120 in exchange for token XYZ (First Movement 140) and a second exchange transaction where Node B 130 transfers token ABC to Node C 120 in exchange for token XYZ (Second Movement 150).

Note that prior to the execution of the transaction, Node B 120 lacks both token ABC for the Second Move 150 and token XYZ for the First Move 140. Thus, under a transfer regime where each party is must receive a token before delivering a token in exchange, intermediary Node B 120 is unable to begin the sequence of settlement unless Node B 120 itself obtains one of the tokens involved. Node B 120 is unable to obtain the needed token ABC from Node A 110 until it is able to transfer token XYZ, which it does not yet have. Node B 120 is similarly unable to obtain the needed token XYZ from Node C 130 until it is able to transfer token ABC, which it does not have.

In order to execute the First Move 140, Node B 120 must transfer token XYZ to Node A (leg 160). Node B 120 must, therefore, find a source for token XYZ in order to complete the other leg 170 of the First Move 140. Node B 120 must either utilize its own token XYZ 140A, in effect loaning its token XYZ to the transaction to Node C 130 before taking Node C's token XYZ 180, or, if Node B 120 does not have token XYZ, Node B 120 must utilize its own assets to buy token XYZ 140A in order to loan that token XYZ to the transaction.

After Intermediary Node B 120 transfers token XYZ to Node A, 160, the First Move 140 is completed by the delivery of token ABC to Node B 170. Node B 120 can now complete the overall transaction by affecting the Second Move 150 when it receives token XYZ from Node B 180 and delivers token ABC to Node C 190. Upon the receipt of token XYZ from Node C 180, Node B 120 can erase the token XYZ loan 140A it created to initiate the transaction. Depending on the timing differences between the initiation of the transaction 160 and the close of the transaction 190, Node B's loan of token XYZ 140A to the transaction could have been intra-day or overnight, and each of the nodes suffers settlement, counterparty, performance, and delivery risks during that time.

In the ordinary course where token ABC and token XYZ both represent fungible tokens, the First Move and the Second Move are interchangeable. However, if one token is an unit of exchange or is otherwise more easily obtainable, current convention processes the transfer of the more difficult-to-obtain token to the intermediary node first in exchange for the more easily-obtainable token second, because the intermediary node may more easily obtain that token to lend into the transaction.

A real world example of the inefficiencies of current operational systems is the DVP settlement of dematerialized securities for cash, where a seller, Node A 120, is selling a share of ABC (token ABC) to a buyer, Node C 130 in exchange for an amount of money (token XYZ). As dematerialized securities are recorded on the books and records of custodians, brokers, central securities depository participants (to the extent the custodian and/or broker are not themselves central securities depository participants), and the central securities depository (each a "settlement entity"), the single sell transaction between a seller and buyer actually comprises of a series of transactions forming a chain from the seller, each individual settlement entity that connects that seller and buyer, and the buyer. Node B represents an intermediary settlement entity. In order to facilitate the First Move 140, Node B 120 must pay Node A 110 an amount of money (token XYZ 160 in exchange for the share of ABC 170. However, as Node B has yet to complete the Second Move with Node C 150, Node B must advance that amount of money (XYZ Credit 140A) in order to initiate the First Move 140. The settlement entity, therefore, must extend clearing credit in the amount of XYZ in order to settle the overall purchase and sale. Therefore, the settlement entity may bear the risk of loss of the amount of the extension. For example the risk may be a risk that the node obligated to deliver the token may fail to deliver such token due to a host of factors. Example factors include unintentional (such as system or computer failures, electrical outages, communications disruptions, or human/operator error) to intentional (bankruptcy stays or a decision to renege on the delivery). Moreover, each node in the path may become a potential point of failure. Each node in the chain bears the risk of non-performance by every other node in the chain. Any failure, whether a technical computer outage or an intentional half to the transfer, at any node in the chain, may prevent another node from receiving the tokens.

In one example, in the event the buyer becomes bankrupt before the completion of the Second Move, the settlement entity risks the amount of the extension. Even if the settlement entity has a claim on the shares of ABC for which it bought in the First Move, it still suffers market risk, if the shares of ABC decline in value. Similarly, each of the seller (Node A), intermediary (Node B), and buyer (Node C) suffers counterparty, settlement, market, and performance risk due to the potential failure, bankruptcy, or renege of the other nodes. Therefore, it is common for the parties, especially the settlement entity, to impose economic inefficiencies on the other parties, ranging from margin requirements and collateral postings, to transaction and membership fees.

Figure 6:
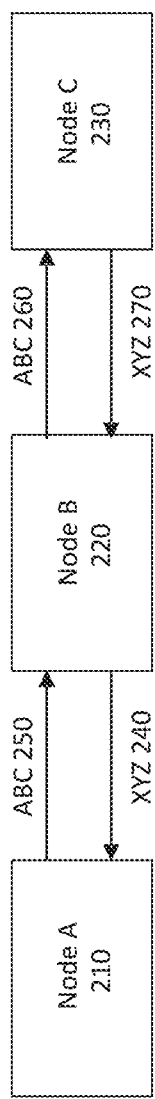
FIG. 6 illustrates the example flow and transfer of FIG. 5, in accordance with the present disclosure.

FIG. 6 shows exemplary efficiencies of embodiments of the present disclosure in processing the same exchange transaction of token ABC for token XYZ between Node A 210 and Node C 230 via their mutual intermediary Node C 220. Unlike current infrastructure, there is no separate first move transaction between Node A 210 and Bode C 220, nor a separate second move transaction between Node B 220 and Node B 230. Instead, there are four (4) atomic components to the overall transaction: (a) a transfer of token XYZ from Node B to Node A 240, (b) a transfer of token ABC from Node A to Node B 250, (c) a transfer of token XYZ from Node C to Node B 260, and (d) a transfer of token ABC from Node B to Node C 270. Once the Computational Node queries each of the nodes to determine that all necessary tokens or digital assets have been Locked, reserved, or are otherwise available to complete each of the component atomic transactions, it can pass notice of the acceptable transaction to the Execution Node. Upon receipt of the acceptable transaction, the Execution Node can process all component atomic transactions simultaneously, by recording each movement of each component atomic transaction to the ledger within the same block or overall transaction so that each component atomic transaction bears the same timestamp as all of the others.

The need to credit token XYZ (see 140A in FIG. 1) that is necessitated by the current infrastructure is no longer necessary, as intermediary Node B 220 effectively nets, or passes through, its obligation to deliver token XYZ to Node A 240 against the receipt of token XYZ from Node C 270 when those two (2) atomic transactions occur simultaneously. The technical result of simultaneous recording of the multiple component atomic transactions may include reducing (or eliminating) the time to complete multiple component transactions, which in turn improves security. Also eliminated are any settlement, counterparty, and delivery risk, as the digital asset management system either settles all atomic component transaction if all of the assets necessary for settlement have been locked and are available, or the digital asset management system declines to settle any atomic component transaction if any of the assets of any atomic component transaction is unavailable.

Unlike current infrastructure, there is no separate transaction between Node A 210 and Intermediary Node C 220 nor a separate transaction between Intermediary Node C 220 and Node B 230, and Node C is not required to source or borrow token XYZ in order to facilitate the first transaction with Node A. In this way methods of the present disclosure may mitigate the risks of non-performance as described above.

Chain Exchange

Figure 7:
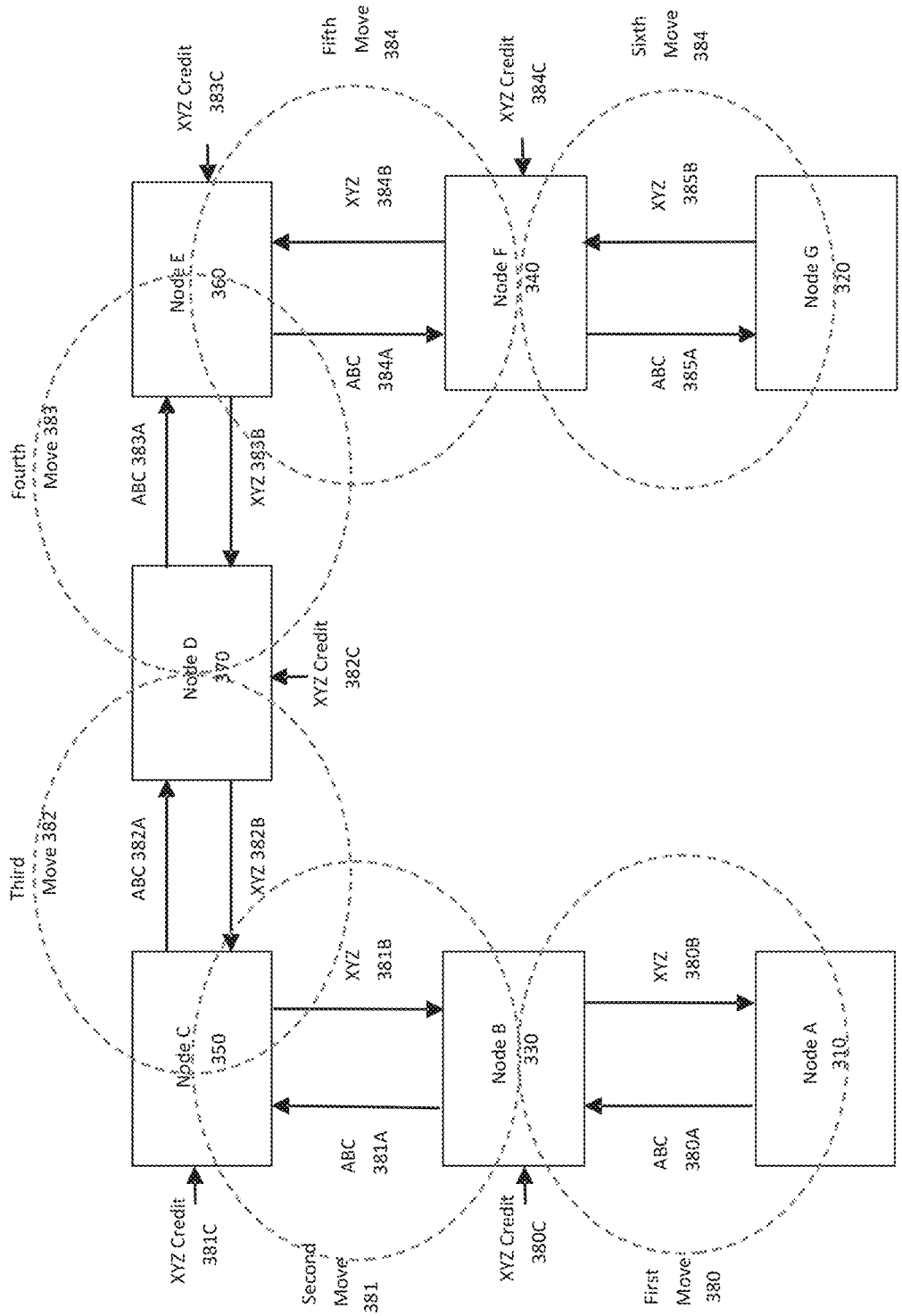
FIG. 7 illustrates an example transaction of a digital asset between multiple nodes.

FIG. 7 shows a more typical transaction under existing operating systems, where Node A 310, the ultimate originator of token ABC that wishes to exchange it for token XYZ, and Node G 320, the ultimate originator of token XYZ, do not share an intermediary node. Node A 310 has agreed to exchange token ABC to Node G 320 in exchange for token XYZ.

Current operating systems for transfers are often centralized via a central intermediary node, here represented by Node D 370, with the ultimate counterparties like Node A 310 and Node G 320 interacting with each other and the central intermediary node via one or more layers of other nodes. In FIG. 3, Node A interacts with Node D 370 via Node B 330 and Node C 350, while Node G interacts with Node D 370 via Node F 340 and Node E 360.

Thus, under existing operating structures, the transfer of token ABC from Node A 310 to Node G 320 is again broken up into stages, with sequential exchanges between Node A and Node B 380, Node B and Node C 381, Node C and Node D 382, Node D and Node E 383, Node E and Node F 384, and Node F and Node G 385. Each of the transactions 380, 381, 382, 383, 384, and 385 consists of a movement of token ABC along the chain in the direction from Node A towards Node G (in order, 380A, 381A, 382A, 383A, 384A, and 385A), against the movement of token XYZ in the opposite direction (in order, 380B, 381B, 382B, 383B, 384B, and 385B). Because Node G 320 originates token XYZ and because the transaction with Node G 320 occurs last in the sequence 385, each of Node B 330, Node C 350, Node D 370, Node E 360, and Node F 320 must source, borrow, or use their own token XYZ to order to initiate each of their respective purchase transactions. For instance, Node B 330 must source token XYZ 380C in order to transfer it to Node A 380B in exchange for token ABC as required for the First Move 380; Node C 350 must source token XYZ 381C in order to transfer it to Node B 381B in exchange for token ABC as required for the Second Move 381; although central intermediaries like Node D may have other means of settlement like end of day net settlement, in order for a central intermediary not to delay settlement, Node D 370 must also source token XYZ 382C in order to transfer it to Node C 382B in exchange for token ABC as required for the Third Move 382; Node E 360 must source token XYZ 383C in order to transfer it to Node D 383B in exchange for token ABC as required for the Fourth Move 383, and Node F 340 must source token XYZ 384C in order to transfer it to Node E 384B in exchange for token ABC as required for the Fifth Move 384. Each source of XYZ, whether borrowed from elsewhere, purchased on credit, or load from itself by each node described above cannot be extinguished until the completion of the next transaction in the chain.

Figure 8:
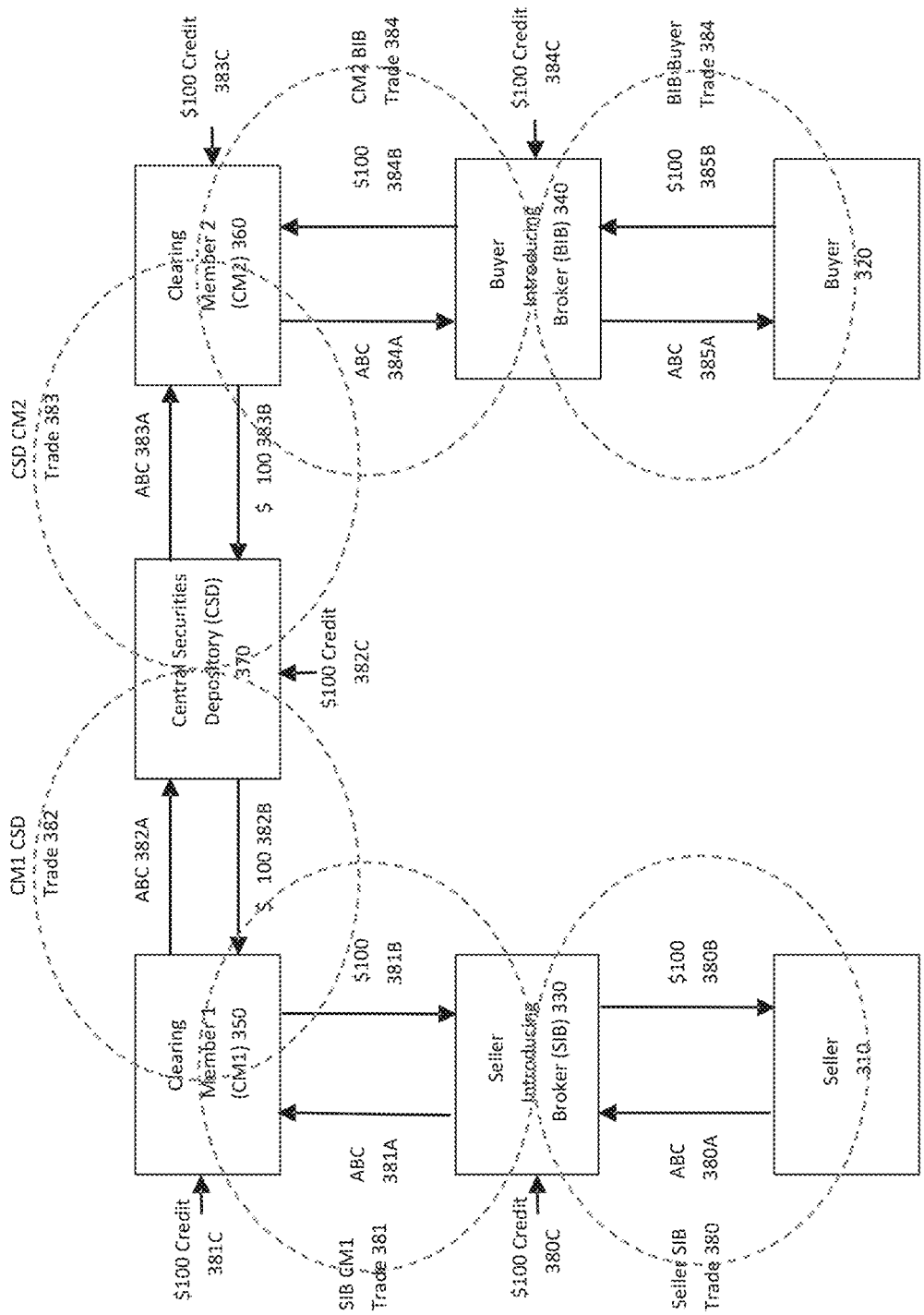
FIG. 8 illustrates a further example transaction of a digital asset between multiple nodes.

FIG. 8 shows the same structure as FIG. 7, but applied to the sale of a share of ABC, a dematerialized security traded on a central securities depository (CSD). Seller, Node A, 310 has agreed to sell a share of ABC to Buyer, Node G, 320 for $100, token XYZ. Seller trades through its introducing broker (SIB) 330, while Buyer trades through a different introducing broker (BIB) 340. SIB settles its trades through Clearing Member 1 (CM1) 350, while BIB settles its trades through Clearing Member 2 (CM2) 360. CM1 and CM2 are members of the Central Securities Depository (CSD) 370.

Using current financial infrastructure, the sale of token ABC from Seller 310 to Buyer 320 is again broken up into stages, with sequential transactions between Seller and SIB 380, SIB and CM1 381, CM1 and CSD 382, CSD and CM2 383, CM2 and BIB 384, and BIB and Buyer 385. Each of the transactions 380, 381, 382, 383, 384, and 385 consists of a movement of ABC along the chain in the direction from Seller towards Buyer (in order, 380A, 381A, 382A, 383A, 384A, and 385A), against the movement of the $100 cash purchase price in the opposite direction (in order, 380B, 381B, 382B, 383B, 384B, and 385B). Because the Buyer 320 originates the cash and because the transaction with the Buyer 320 occurs last in the sequence 385, each of SIB 330, CM1 350, CSD 370, CM2 360, and BIB 320 extends clearing credit to initiate each of their respective purchase transactions. For instance, SIB 330 must extend $100 clearing credit 380C in order to pay to Seller 310 the $100 380B and settle the Seller SIB Trade 380; CM1 350 must extend $100 clearing credit 381C in order pay to SIB 330 the $100 381B in order to settle the SIB CM1 Trade 381; although CSDs may have other means of settlement like end of day net settlement, in order for a CSD not to delay settlement the CSD 370 must extend $100 clearing credit 382C in order to pay CM1 350 the $100 382B in order to settle the CM1 CSD Trade 382; CM2 360 must extend $100 clearing credit 383C in order to pay the CSD 370 the $100 383B in order to settle the CSD CM2 Trade 383, and BIB 320 must extend $100 clearing credit 384C in order to pay CM2 360 the $100 384B in order to settle the CM2 BIB Trade 384. Each extension of clearing credit cannot be extinguished until the completion of the next transaction in the chain.

It is important to note the significant inefficiencies created by the current market infrastructure that are magnified, simply due to the sequencing of each DVP transaction and the inability for the current market infrastructure to operate as a whole. The number of sequential transactions can also lead to delay in completion of the process and pose a security risk. This may be compounded if sequential transactions follow a predictable pattern whereby the predictable pattern may be exploited by unscrupulous nodes. Furthermore, as demonstrated in this example, extensions of credit in the marketplace is multiples (totaling $500 to settle a $100 trade) of the actual trade, tying up liquidity that could be used for other purposes. As each of the entities extending credit faces settlement, counterparty, and delivery risks, each entity, in turn, charges margin to mitigate these risks, creating additional liquidity drains in the form of margin postings. These risks are magnified for SIB 330, BIB 340, CM1 350, CM2 360, and CSD 370, the settlement entities, as they become committed to the trade upon the date the transaction is agreed (T) even though the settlement doesn't occur for another two days (T+2). The result is that the settlement entities require margin from their customers and participants not just for the credit extensions during the settlement cycle, but for the added counterparty and delivery risks. The margin requirements further magnify the multiples of inefficiencies in the system. Although SIB 330, BIB 340, CM1 350, CM2 360, and CSD 370 typically would net their obligations to deliver shares of ABC across their trading book (FIG. 8 shows the transaction as if only one share of ABC was available for trade), the risks borne by and the credit extensions made by each entity remains, and each entity imposes margin on its customer and/or posts margin for these reasons.

Figure 9:
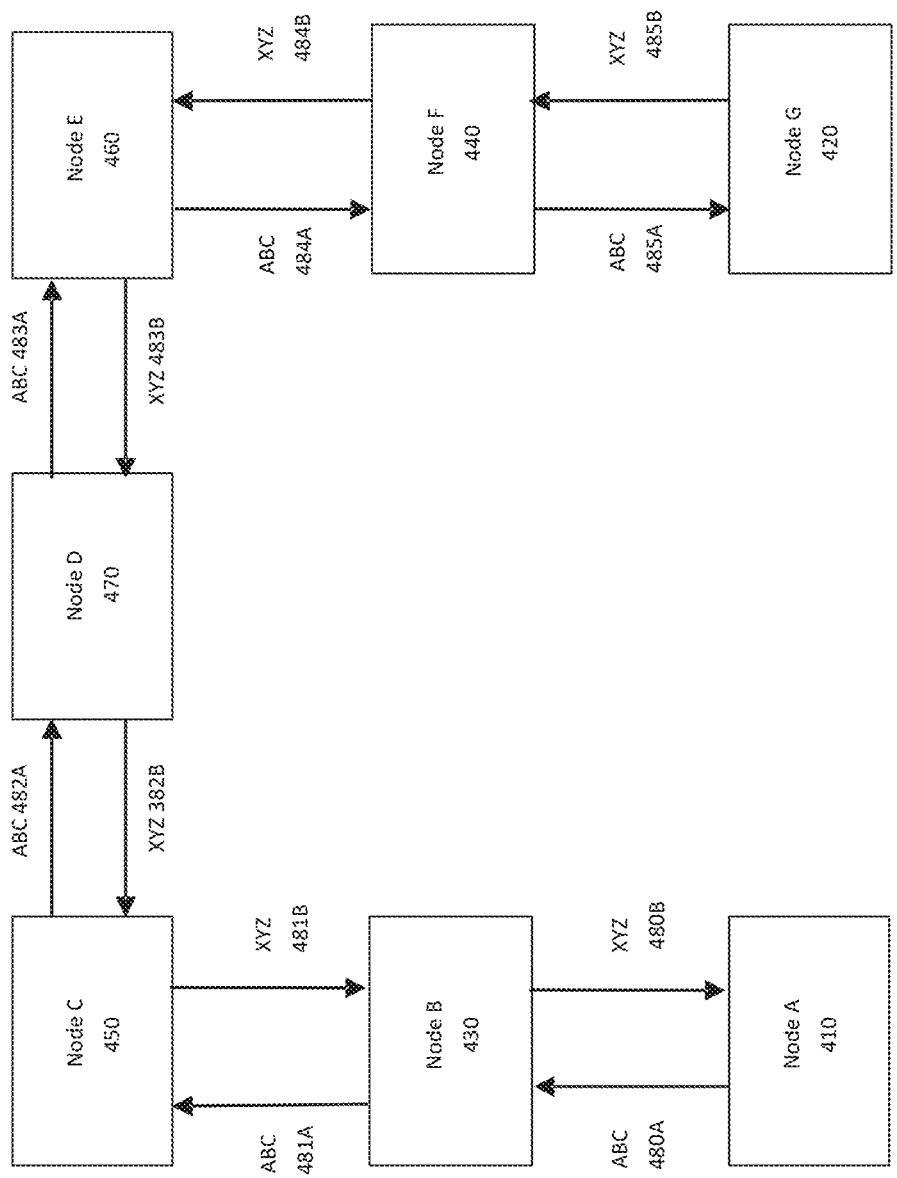
FIG. 9 illustrates the example transaction of FIG. 7, in accordance with the present disclosure.

FIG. 9 shows the same transaction as FIG. 7, only performed on the embodiment where all nodes operate as part of the platform. Just as in FIG. 7, Node A 410 is exchanging token ABC with Node G 420 for token XYZ, but the transaction takes place via a chain of intermediary nodes comprising of Node B 430, Node C 450, Node D 470, Node E 460, and Node F 440. Unlike FIG. 7, however, the transfers of token ABC and token XYZ between the nodes are not sequential. There are no first, second, third, fourth, fifth, and sixth moves. Instead, token ABC moves through the chain from Node A 410 to Node G 420 via the component atomic movements of 480A, 481A, 482A, 483A, 484A, and 485A while token XYZ moves through the chain of nodes from Node G 420 to Node A 410 via the component atomic movements of 480B, 481B, 482B, 483B, 484B, and 485B.

Unlike current system infrastructure, however, the atomic movements are not sequential. Rather, once the Computational Node determines that token ABC and token XYZ are available for the transaction or have been Locked or reserved to the transaction, or are otherwise available. Once the Computational Node determines that each of the nodes has or will have the assets necessary to complete its atomic transaction assuming the completion of all atomic transactions 480A, 480B, 481A, 481B, 482A, 482B, 483A, 483B, 484A 484B, 485A, and 485B, effectively allowing each participant to net its obligations, the Computational Node can alert that Execution Node that the transaction is ready for settlement. The Execution Node can complete all component atomic transactions simultaneously recording all movements to the distributed ledger in the same block or overall transaction with the same time stamp. This simultaneous recording of the component atomic transactions may reduce security risks compared with a series of sequentially related exchanges executed over a period of time.

Figure 10:
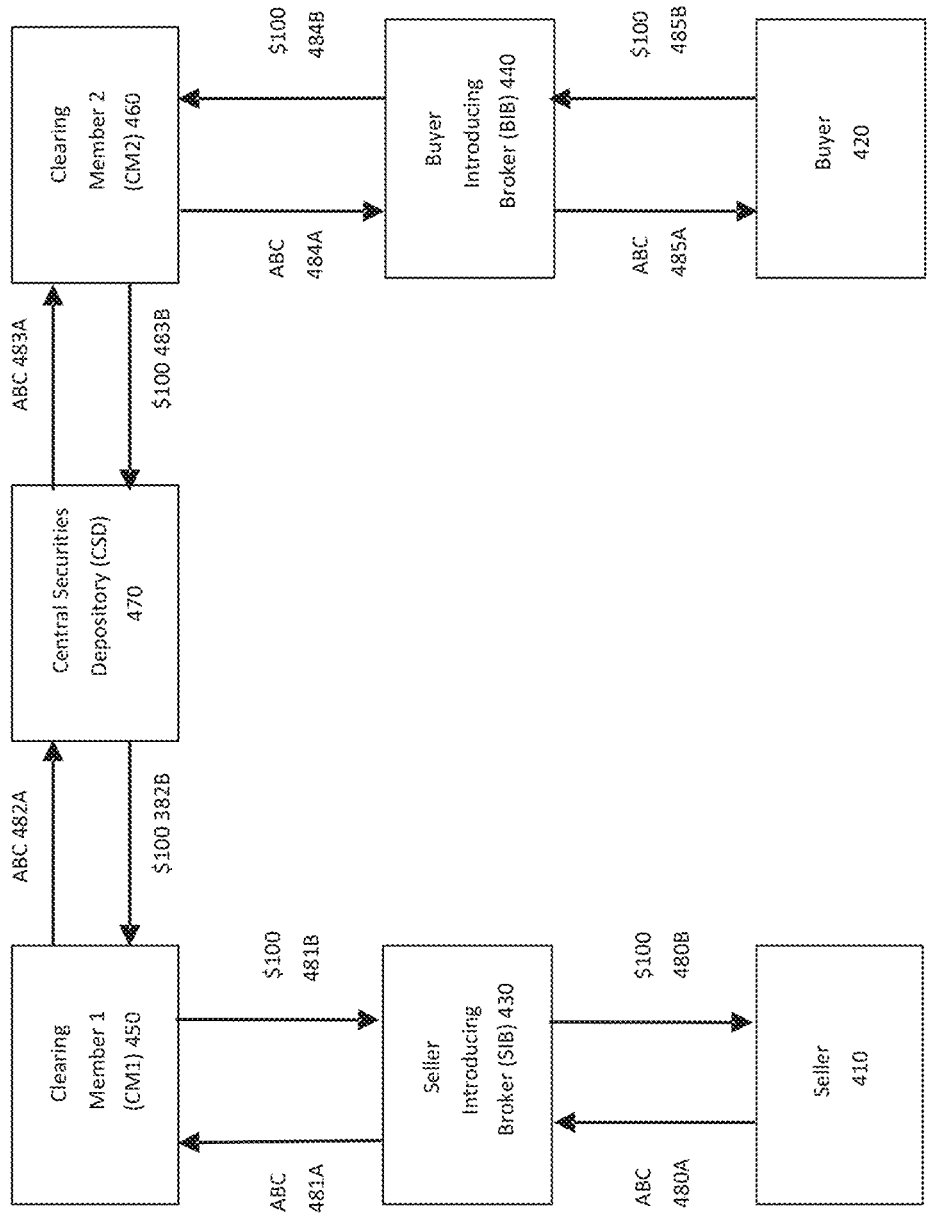
FIG. 10 illustrates an example flow and transfer in accordance with the present disclosure.

FIG. 10 shows the benefits of the present system applied to the current market infrastructure of dematerialized securities settled through a central securities depository. Again, Seller 410 has agreed to sell a share of ABC to Buyer 420 for $100 (token XYZ). Seller trades through its introducing broker (SIB) 430, while Buyer trades through a different introducing broker (BIB) 440. SIB settles its trades through Clearing Member 1 (CM1) 450, while BIB settles its trades through Clearing Member 2 (CM2) 460. CM1 and CM2 are members of the Central Securities Depository (CSD) 470. Again, the share of ABC moves through the chain from Seller 410 to Buyer 420 via the component atomic movements of 480A, 481A, 482A, 483A, 484A, and 485A while the $100 moves through the chain from Buyer 420 to Seller 410 via the component atomic movements of 480B, 481B, 482B, 483B, 484B, and 485B.

Unlike current market inefficiencies show in FIG. 8, the present system eliminates the sequential settlement necessitated by DVP, allowing each intermediary participant to net their obligations. The lack of sequential settlement of six (6) component transactions and netting allows each intermediary participant to not extend credit, as none of them need to source the payment of cash from their own liquidity. Further, as the entire transaction is settled all at once, there is no longer any bankruptcy, delivery, counterparty, or performance risk, as there is no longer any chance that one or more of the participants may declare bankruptcy or otherwise fail to perform during the processing of the six (6) sequential transactions. As the assets are committed to the transaction, and as the timing of each movement component atomic transaction coincides with each other component atomic transaction, there are no extensions of clearing credit, no counterparty risks, no delivery risks, no buy-in risks, and no settlement risks during the settlement cycle.

Therefore, the present system may mitigate the risk of non-performance of nodes in the transaction. Example risks may include risks that the node obligated to deliver a token may fail to deliver such token due to factors such as system/computer failures, electrical outages, communications disruptions or human/operator error.

Settlement Facility

The efficiencies of some embodiments of the present disclosure may only extend to the entities that are part of the same distributed ledger system or have their transactions monitored and calculated by the Computational Node. In practicality, there can be many entities who may not have such access to the system. Thus, the present disclosure contemplates a settlement facility to allow participation without having to adopt the distributed ledger system or subject an entity's transaction processes to monitoring and calculation by the Computational Node.

Figure 11:
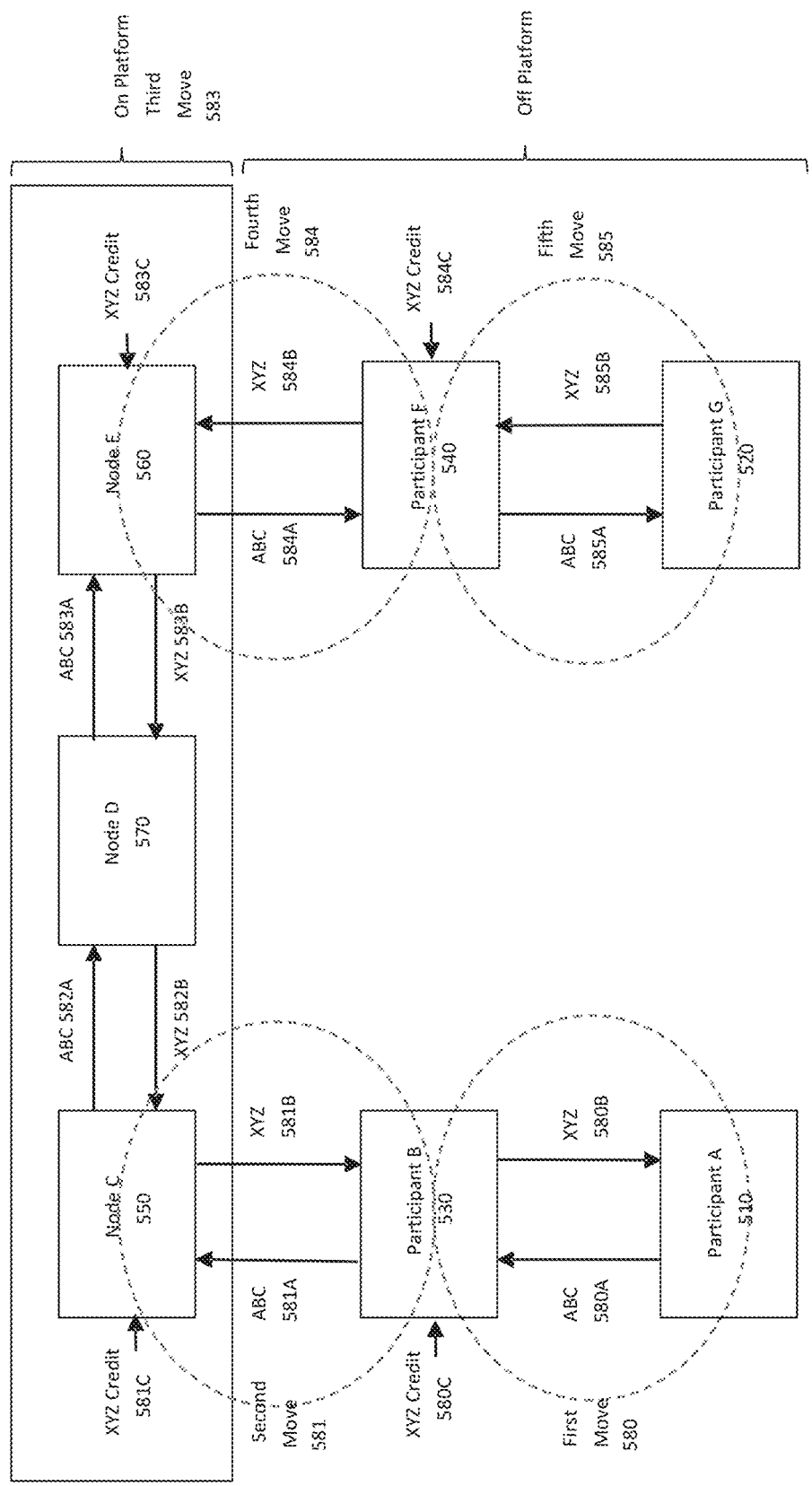
FIG. 11 illustrates a further example transaction of FIG. 9, in accordance with the present disclosure.

FIG. 11 shows a hybrid settlement of the same transaction described in FIG. 9 where only the entities operating Node C 550, Node E 560, and Node D 570 participate in the system. Participant A 510, Participant B 530, Participant F 540, and Participant G 520 either use existing technology or another system without the benefit of atomic settlement.

This hybrid settlement shows the benefits of atomic transactions and the inefficiencies of current market infrastructure all in a single scenario. The start of the settlement arc, from Participant A 510 to Participant B 530 and from Participant B 530 to Node C 550 still consists of two (2) separate transactions, First Move 580 and Second Move 581. Both Participant B 530 and Node C 550 may extend or lend their own token XYZ, source, or otherwise extend their own liquidity to purchase token XYZ in order to fulfil their obligations to settle the First and Second Moves 580C and 581C, respectively, in order to settle their obligations in these two (2) trades. As all parties bear counterparty risk, performance risk, and system failure risk for Participant B 530 and Node C 550, Participant B 530 can impose margin or collateral requirements on Participant A 510 for the transaction, just as Node C 550 can impose margin or collateral requirements on Participant B 530. Just as before, neither Participant B 530 or Node C 550 can extinguish their loan of token XYZ until the completion of the subsequent transaction. Similarly, at the end of the settlement arc, the Fourth Move 584 between Node E 560 and Participant F 540 might require the extension of credit 584C by Participant F 540, creating counterparty risk for all parties and buy-in risks for Node E 560 and Participant F 540, resulting in margin requirements for Participant G 520 and Participant F 540.

In contrast, the middle of the settlement arc, Third Move 583 between Node C 550 and Node D 570 and between Node D 570 and Node E 560, when broken up into atomic transactions performed via the present system, requires no extensions of credit by Node D 570, although Node E 560 may extend lend their own token XYZ, source, or otherwise extend their own liquidity to purchase token XYZ 583C in order to fulfil their obligations to settle the Third Move. This loan of token XYZ can only be extinguished upon the completion of Fourth Move 584. However, for the exchange of token ABC from Node C 550 through to Node E 560 against the exchange of token XYZ from Node E 560 through to Node C 550, none of Node C 550, Node D 560, and Node E 570 have counterparty risk, settlement risk, delivery risk, performance risk, or risk of system failure. In order to initiate the Third Move 583, Node C 550 may have token ABC and Node E 560 may have token XYZ. If either token is not available or is not Locked and committed to the move, the Computational Node can see insufficient assets to settle the move and refuse to perform the move. However, once the Computational Node determines that token ABC and token XYZ are available or have been Locked and committed to the move, and once the Computation Node determines that each of the Node C 550, Node D 560, and Node E 570 has or will have the assets necessary to complete its atomic transaction assuming the completion of all atomic transactions, effectively allowing each participant to net its obligations, the Computational Node can alert that Execution Node that the transaction is ready for settlement. The Execution Node can complete all component atomic transactions simultaneously, recording all movements to the distributed ledger in the same block or overall transaction with the same time stamp.

In order to eliminate the inefficiencies present in a hybrid settlement scenario where only a portion of the trading entities are participants to the distributed ledger system, the present system can contain a settlement facility that allows the participants the benefits of the system without having to fully adopt the system or become members of the of the distributed ledger network directly.

Figure 12:
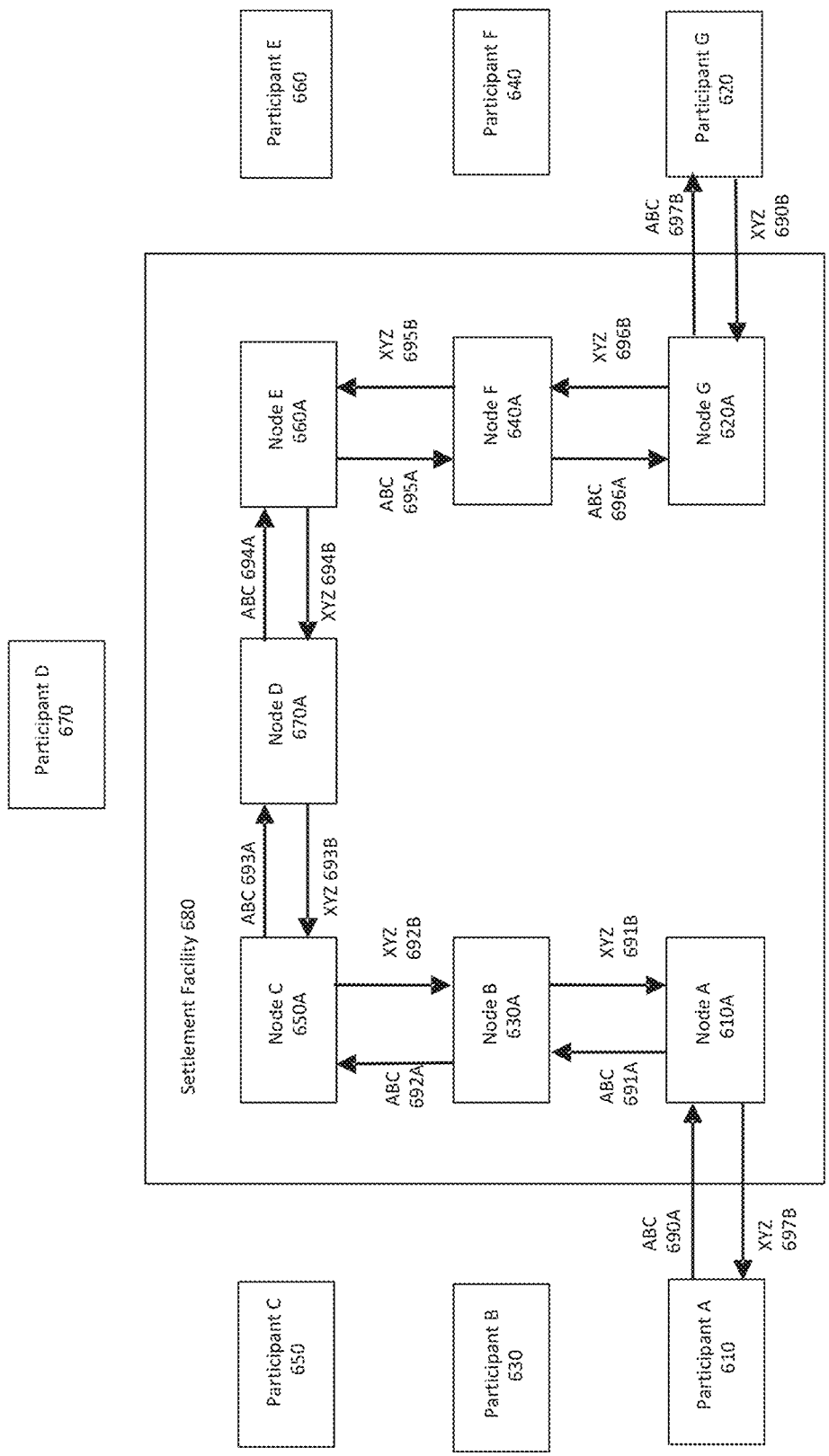
FIG. 12 illustrates a further example transaction using a settlement facility in accordance with the present disclosure.

FIG. 12 shows the same exchange arc of token ABC from Participant A 610 to Participant G 620 for token XYZ from Participant G 620 to Participant A 610. Each of the participants, Participant A 610, Participant B 630, Participant C 650, Participant D 670, Participant E 660, Participant F 640, and Participant G 620 are represented on the Settlement Facility 680 by their respective Nodes: Participant A 610 has Node A 610A, Participant B 630 has Node B 630A, Participant C 650 has Node C 650A, Participant D 670 has Node D 670A, Participant E 660 has Node E 660A, Participant F 640 has Node F 640A, and Participant G 620 has Node G 620A.

In this scenario, there is no need for each of the participants to fully utilize or adopt the system for all transfers and settlements of their tokens. Instead, FIG. 12 shows that each participant can remain separate from their nodes, only utilizing the Settlement Facility 680 for certain transfers, like the exchange of token ABC for token XYZ in this example.

The exchange arc is initiated by the transfer of token ABC 690A by Participant A 610 to Node 610A within the Settlement Facility 680 and by the transfer of token XYZ 690B by the Participant G 620 to Node G 620A within the Settlement Facility 680. Upon the receipt of either matching instructions to initiate the exchange from Participant A 610 and Participant G 620, or matching instructions from all participants involved (Participant A 610, Participant B 630, Participant C 650, Participant D 670, Participant E 660, Participant F 640), depending on the configuration of the Settlement Facility, the Execution Node can Lock token ABC in Node A 610A and commit it towards the ultimate delivery to the Node G 620A and Lock token XYZ in Node G 620A and commit it towards the ultimate delivery to Node A 610A. At the time of settlement, the Execution Node can process the exchange in a manner similar to the scenario described in FIG. 9. Once the Computational Node determines that sufficient assets have been Locked to complete the transaction, the Execution Node can move token ABC through the chain from Node A 610A to Node G 620A via the component atomic movements of 691A, 692A, 693A, 694A, 695A, and 696A and token XYZ through the chain from Node G 620A to Node A 610A via the component atomic movements of 691B, 692B, 693B, 484B, 696B and 696B.

Again, the atomic movements need not be sequential. Rather, once the Computational Node, using the Settlement Logic, determines that token ABC and token XYZ have been Locked and committed to the trade and once the Computational Node, using the Settlement Logic determines that each of the parties has or will have the assets necessary to complete its atomic transaction assuming the completion of all atomic transactions, the Computational Node can alert that Execution Node that the transaction is ready for settlement. The Execution Node can complete all component atomic transactions simultaneously, effectively allowing each participant to net its obligations. As the tokens necessary for the exchange are either present or are committed to the transaction, and as the timing of each movement component atomic transaction coincides with each other component atomic transaction, there are no extensions of clearing credit, no counterparty risks, no delivery risks, no buy-in risks, and no settlement risks during the settlement cycle. This holds true as none of the intermediary participants, Participant B 630, Participant C 650, Participant D 670, Participant E 660, or their corresponding nodes (Node B 630A, Node C 650A, Node D 670A, Node E 660A, Node F 640A) need to source or locate any token or lend any token in order to fulfil their obligations in the overall exchange.

Upon completion of the exchange arc on the Settlement Facility 680, the Participant A 610 can withdraw token XYZ 697A from Node A 610A at the Settlement Facility 680, and Participant G 620 can withdraw token ABC 697B from Node G 620A at the Settlement Facility 680. Note that unlike the First Move 580 between Participant A 510 and Participant B 530 in FIG. 5, there is no extension of credit and no settlement risk between Participant A 610 and its own Node A 610A, as token ABC is transferred by Participant A 610 to its own Node A 610A, and as token ABC is removed from Node A 610A only upon the simultaneous exchange for token XYZ. Thus, Participant A 610 via its control over Node A 610A has either token ABC or token XYZ during the entire time of this exchange arc. The same holds true on the other side of the exchange arc for Participant G 620 and its Node G 620A.

Figure 13:
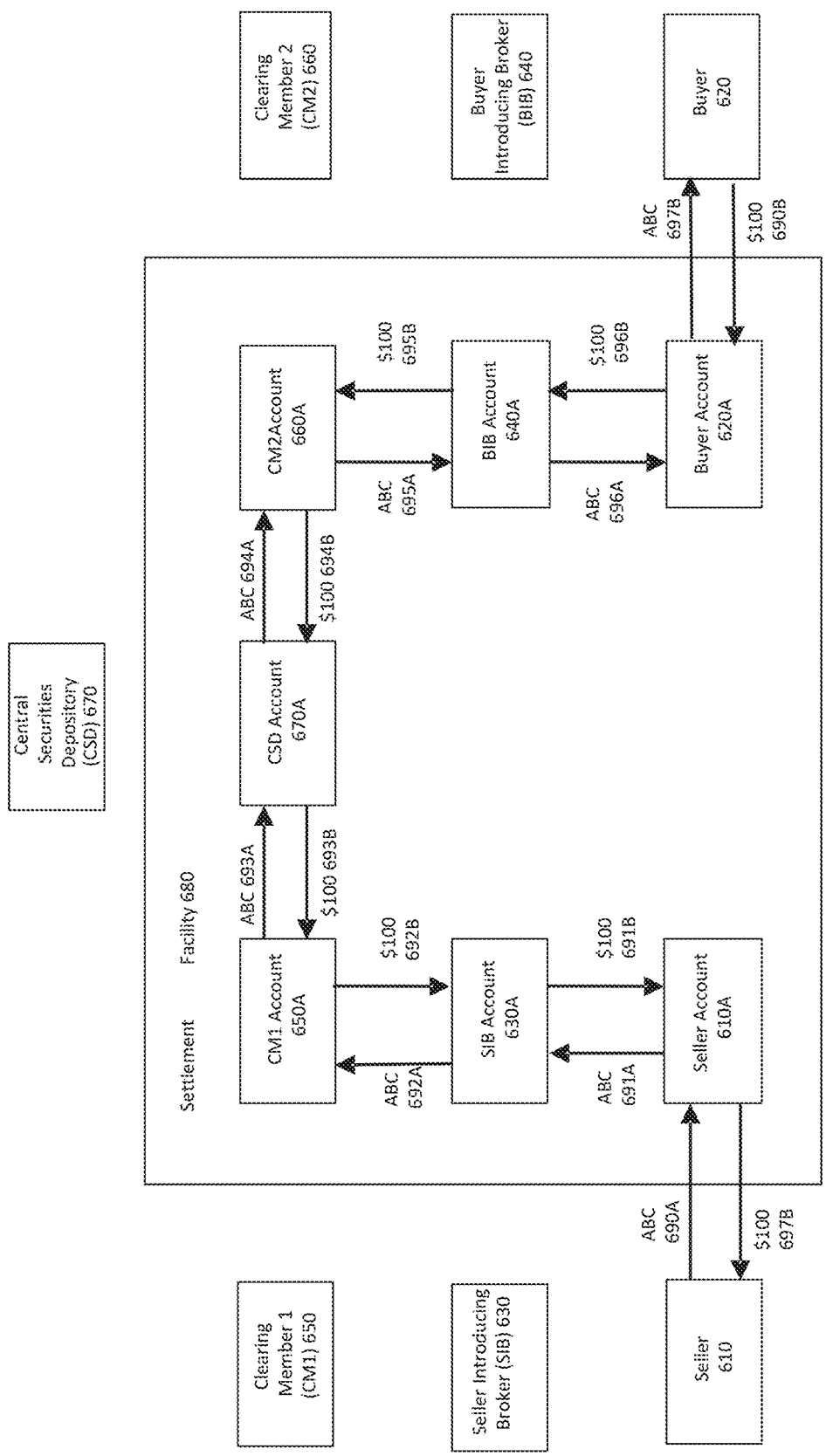
FIG. 13 illustrates a further schematic of the example transaction of FIG. 12.

The key difference provided by the Settlement Facility 680, however, is that none of the entities participating in the transaction must change their operating systems to the embodiment system. Instead, each participant entity can be represented in the Settlement Facility by nodes or accounts opened on the Settlement Facility 680, thus allowing the system (the Locking, the Computational Node, the Settlement Logic, the Execution Node) to work via the Settlement Facility 680. This is more clearly illustrated the Settlement Facility as a route to adoption of the present system by the financial industry as shown in FIG. 13.

Just as described above, Seller 610 is selling a share of ABC, a dematerialized security cleared on a Central Securities Depository 670 to Buyer 620 for the purchase price of $100. Each of the participants, Seller 610, Buyer 620, Seller Introducing Broker (SIB) 630, Buyer Introducing Broker (BIB) 640, Clearing Member 1 (CM1) 650, Clearing Member 2 (CM2) 660, and CSD 670 are represented on the Settlement Facility 680 by their respective accounts opened and maintained on the books and records of the Settlement Facility 680A: Seller Account 610A, Buyer Account 620A, SIB Account 630A, BIB Account 640A, CM1 Account 650A, CM2 Account 660A, and CSD Account 670A.

In this scenario, none of the participants have adopted the present system to replace their current books and records or their method of transaction, but each wish to utilize the present system to settle the sale of ABC share in order to avoid the current market inefficiencies relating to settlement. Thus, the settlement arc is initiated by the transfer of the share of ABC 690A by Seller 610 to the Seller Account 610A at the Settlement Facility 680 and by the transfer of $100 690B by the Buyer 620 to the Buyer Account 620A at the Settlement Facility 680. Upon the receipt of either matching instructions to initiate the transaction from Seller 610 and Buyer 620 or matching instructions from all participants, Seller 610, SIB 630, CM1 650, CSD 670, CM2 660, BIB 640, and Buyer 620, depending upon the configuration and permissioning of the Settlement Facility 680, the Execution Node can Lock token ABC in the Seller Account 610A and commit it towards the ultimate delivery to the Buyer Account 620A and Lock the $100 in the Buyer Account 620A and commit it towards the ultimate delivery to the Seller Account 610A. At the time of settlement, the Execution Node can process the transaction in a manner similar to the scenario described in Diagram 4. Once the Computational Node determines that sufficient assets are present or have been Locked to complete the transaction, the Execution Node can move the share of ABC through the chain from Seller Account 610A to Buyer Account 620A via the component atomic movements of 691A, 692A, 693A, 694A, 695A, and 696A and the $100 through the chain from Buyer Account 620A to Seller Account 610A via the component atomic movements of 691B, 692B, 693B, 484B, 696B and 696B.

Upon completion of the settlement arc on the Settlement Facility, the Seller 610 can withdraw the $100 697A from the Seller Account 610A at the Settlement Facility 670 and the Buyer 620 can withdraw the share of ABC 697B from the Buyer Account 680A at the Settlement Facility 680. Note that unlike the Seller SIB Trade 580 between Seller 510 and SIB 530 in FIG. 11, there is no extension of credit and no settlement risk between Seller 610 and Seller Account 610A, as the share of ABC is deposited by the Seller in its own account, and as the share of ABC is removed only upon the simultaneous exchange for the purchase price of $100. The same holds true on the other side of the settlement arc for Buyer 620 and the Buyer Account 620A.

Again, the atomic movements need not be sequential. Rather, once the Computational Node, using the Settlement Logic, determines that the share of ABC and the $100 have been Locked and committed to the trade and once the Computational Node, using the Settlement Logic determines that each of the parties has or will have the assets necessary to complete its atomic transaction assuming the completion of all atomic transactions, the Computational Node can alert the Execution Node that the transaction is ready for settlement. The Execution Node can complete all component atomic transactions simultaneously, effectively allowing each participant to net its obligations. The Writing Node can record all movements to the distributed ledger in the same block or overall transaction with the same time stamp. As the assets are committed to the transaction, and as the timing of each movement component atomic transaction coincides with each other component atomic transaction, there are no extensions of clearing credit, no counterparty risks, no delivery risks, no buy-in risks, and no settlement risks during the settlement cycle.

The key difference provided by the Settlement Facility 680, however, is that none of the entities participating in the transaction must change their operating systems to become part of the distributed ledger network. Instead, each participant entity can be represented in the Settlement Facility by accounts opened on the Settlement Facility 680, thus allowing the present system (the Locking, the Computational Node, the Settlement Logic, the Execution Node, and the Write Node) all to work via the Settlement Facility 680.

Figure 14:
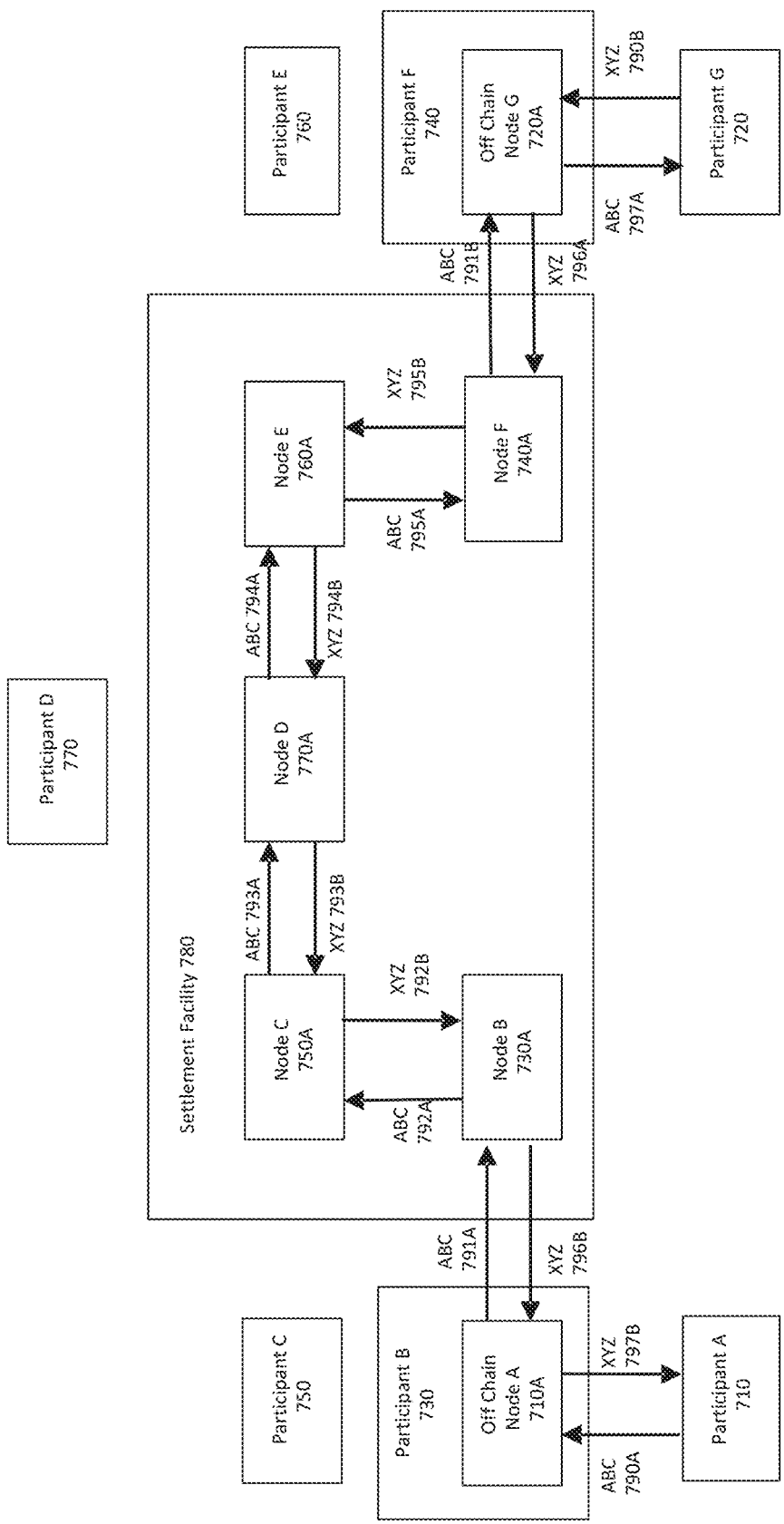
FIG. 14 illustrates a further example transaction using a settlement facility in accordance with the present disclosure.

FIG. 14 shows that the efficiencies of the Settlement Facility may also hold true in scenarios where Participant A 710 or Participant B 720 are not part of the same distributed ledger as the Settlement Facility 780. Instead, as Participant B 730 either operates a node for Participant A on a different distributed ledger, maintains accounts for Participant A, or otherwise holds tokens on behalf of Participant A 710A. Similarly, Participant F 740 maintains the same 720A for Participant G 720.

To initiate the settlement arc, Participant A 710 deposits token ABC 790A in Off Chain Node A 710A at Participant B 730, and Participant G 720 deposits token XYZ 790B in Off Chain Node B 720A at Participant F 740. Participant B 730 then deposits token ABC 791A into Node B 730A maintained at the Settlement Facility 780 where the share is Locked for settlement, while Participant F 740 deposits token XYZ 791B into Node F 740B maintained at the Settlement Facility 780 where token XYZ is Locked for settlement. It is important to note that none of the movements thus far, 790A, 790B, 791A, and 791B, involve the need to borrow tokens, extend or loan tokens, and thus, none of the movements create any delivery, settlement, counterparty, or system failure risks. Participant A 710 has deposited token ABC into its Off Chain Node 710A maintained by Participant B 730 for Participant A 710, while Participant B 730 has recorded that token ABC belongs to Participant A 710 while depositing token ABC to Node B 730A at the Settlement Facility 780. The same has happened on the other side of the settlement arc with Participant B 720, the Off Chain Node G 720A, BIB 740 and Node F 740A.

Once token ABC has been Locked and/or is available in Node B 730A and token XYZ has been Locked and/or is available in Node G 740A, the Computational Node, using the Settlement Logic, can recognize that all of the parties to the transaction, Node B 730A, Node G 740A, the Node C 750A, the Node E 760A, and Node D 770A have, or will have upon the completion of each component transaction, sufficient assets necessary to complete the transaction. Effectively, the Settlement Logic can allow Node C 750A, Node E 760A, and Node E 770A to net their obligations in the settlement arc, without Participant C 750, Participant E 760 or Participant D 770 having to contribute anything to their respective nodes or borrow or loan any tokens in order to facilitate settlement. The Computational Node can then signal the Execution Node that the transaction is ready for settlement. The Execution Node can move token ABC from Node B 730A to Node C 750A, from the Node C 750A to Node D 770A, from Node D 770A to Node E 760A, from the Node E 760A to Node F 740A, fulfilling component atomic transactions 792A, 793A, 794A, and 795A, respectively. Concurrently, the Execution Node can move token XYZ from Node F 740A to Node E 760A, from Node E to Node D 770A, from Node D 770A to Node C 750A, and from Node C 750A to Node B 730A, fulfilling component atomic transactions 795B, 794B, 793B, and 792B, respectively. The Execution Node can record all of these atomic transactions as having occurred simultaneously onto the same block or overall transaction onto the system of record, and the atomic transactions can finish.

Upon completion of the atomic transactions, Participant B 730 may withdraw token XYZ 796B from Node B 730A on the Settlement Facility 780 and place token XYZ on the Off Chain Node A 710 maintained by Participant B 730 for the benefit of Participant A 710, whereupon Participant A 710 may withdraw token XYZ 797B from Node A 710A. The same happens at the other end of the chain with token ABC moving from Node F to Off Chain Node G 791B and finally to Participant G 797A. Unlike the current processes, the present system allows all of these movements to be made without the need for any of the parties to borrow or loan tokens in order to facilitate these movements, and allows each of the parties to make these transactions free from settlement, counterparty, system, market, or other risks, including risk of failures to perform.

Figure 15:
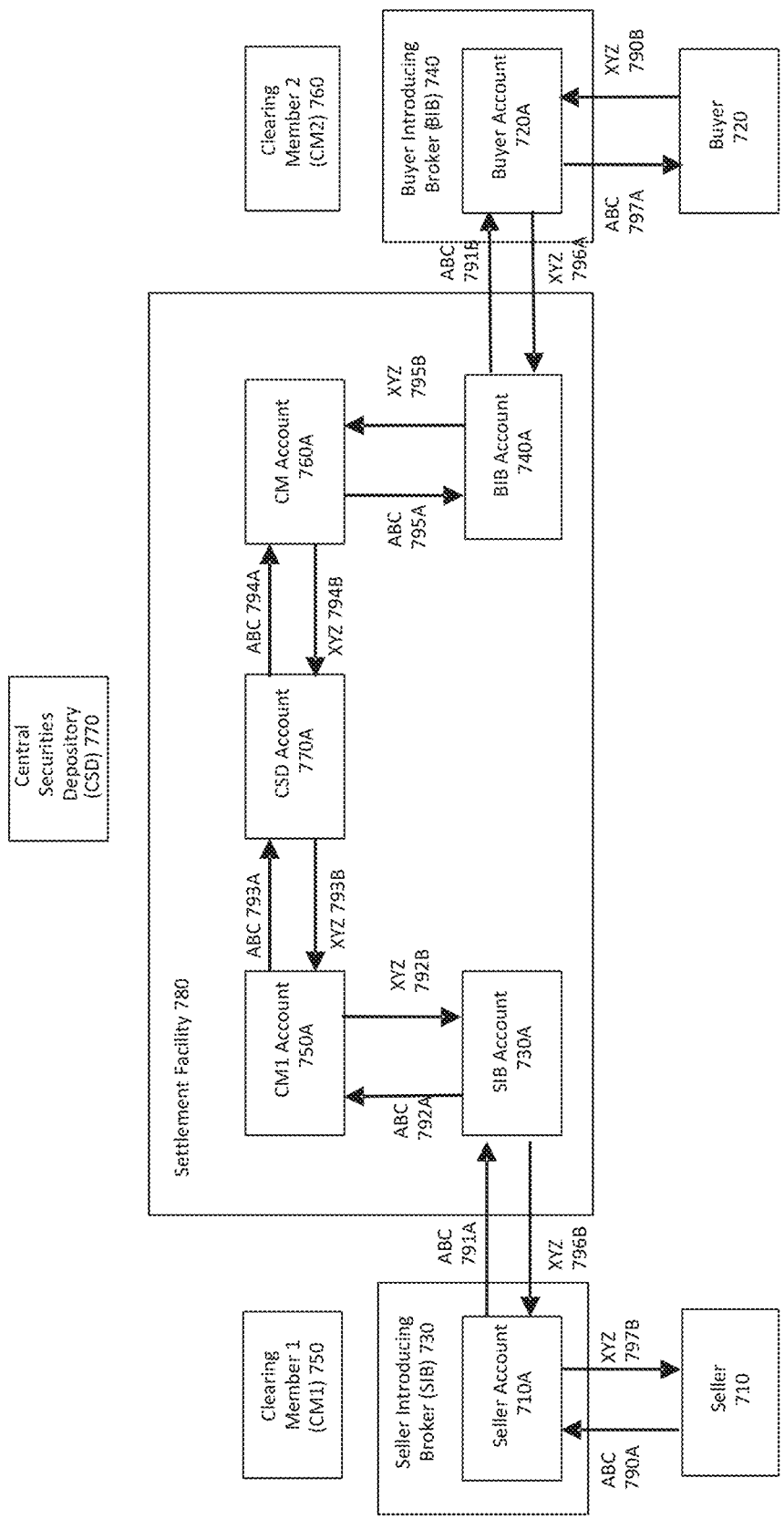
FIG. 15 illustrates a further example transaction using a settlement facility in accordance with the present disclosure.

The benefits of such hybrid embodiments may more clearly be seen when applied to a same purchase and sale from a Seller 710 to a Buyer 720 of a dematerialized share of ABC that is registered with a central securities depository (CSD) 770 for the purchase price of $100. FIG. 15 shows the same Settlement Facility 780 where the Buyer 720 and the Seller 710 are not part of the distributed ledger or the Settlement Facility. Instead, the Seller 710 maintains an account 710A at the Seller Introducing Broker (SIB) 730, while the Buyer 720 maintains an account 720A at the Buyer Introducing Broker (BIB) 740.

To initiate the settlement arc, Seller 710 deposits share ABC 790A in the Seller Account 710A at SIB 730, and Buyer 720 deposits $100 790B in the Buyer Account 720A at BIB 740. SIB 730 then deposits token ABC 791A into the SIB Account 730A maintained at the Settlement Facility 780 where the share is Locked for settlement, while BIB 740 deposits the $100 791B into the BIB Account 740B maintained at the Settlement Facility 780 where the $100 is Locked for settlement. It is important to note there that none of the transactions thus far, 790A, 790B, 791A, and 791B, involve the extension of credit, or create any delivery or settlement risk: all are free deliveries. Further, it is important to note that ownership of the share of ABC and of the $100 has not changed. Thus, none of the parties thus far have extended any credit or are subject to any counterparty risk. Seller 710 has deposited token ABC into its own account 710A at SIB 730, while SIB 730 has recorded that ABC share to Seller 710 on its books and records and deposited that share into its fbo customer account 730A at the Settlement Facility 780. The same has happened on the other side of the settlement arc with Buyer 720, the Buyer Account 720A, BIB 740, and the BIB Account 740A.

Once token ABC has been Locked and/or is available in the SIB Account 730A and the $100 has been Locked and/or is available in the BIB Account 740A, the Computational Node, using the Settlement Logic, can recognize that all of the parties to the transaction, the SIB Account 730A, the BIB Account 740A, the CM1 Account 750A, the CM2 Account 760A, and the CSD Account 770A have, or will have upon the completion of each component transaction, sufficient assets necessary to complete the transaction. Effectively, the Settlement Logic can allow the CM1 Account 750A, the CM2 Account 760A, and the CSD Account 770A to net their obligations in the settlement arc, without CM1 750, CM2 760 or CSD 770 having to contribute anything to their respective accounts or to extend any credit towards settlement. The Computational Node can then signal the Execution Node that the transaction is ready for settlement. The Execution Node can move the share of ABC from the SIB Account 730A to the CM1 Account 750A, from the CM1 Account 750A to the CSD Account 770A, from the CSD Account 770A to the CM2 Account 760A, from the CM2 Account 760A to the BIB Account 740A, fulfilling component atomic transactions 792A, 793A, 794A, and 795A, respectively. Concurrently, the Execution Node can move $100 from the BIB Account 740A to the CM2 Account 760A, from the CM2 Account to the CSD Account 770A, from the CSD Account 770A to the CM1 Account 750A, and from the CM1 Account 750A to the SIB Account 730A, fulfilling component atomic transactions 795B, 794B, 793B, and 792B, respectively. The Write Node can record all of these atomic transactions as having occurred simultaneously onto the same block or overall transaction onto the system of record, and the atomic transactions can finish.

As with the beginning of the settlement arc, the end of the settlement arc also does not involve any extensions of credit or counterparty risk. Upon the completion of the atomic transactions, $100 resides in the SIB's fbo customer account 730A at the Settlement Facility 780, where that $100 is reflected in the Seller's Account 710A maintained at the SIB 730 for the Seller 710. The Seller may withdraw that $100 797B, which will result in a withdrawal of $100 from the SIB's fbo customer account 796B. As the $100 belongs to the Seller at the end of the atomic transactions, these withdrawals are made without any extension of credit, counterparty, market, or other risks, including risk of failures to perform. The same is true at the other end of the settlement arc, where the atomic transactions have concluded with Buyer having ownership of the share of ABC. The share of ABC resides in the BIB fbo customer account 740A at the Settlement Facility 780, and is reflected on the books and records of the BIB 740 as belonging to the Buyer 720 with a credit to the Buyer's Account maintained for the Buyer by the BIB 720A. Should the Buyer 720 wish to transfer that share of ABC elsewhere, the Buyer 720 may withdraw that share of ABC 797A, which necessitates a withdrawal of that share of ABC from the BIB fbo customer account 740A. Again, as the share of ABC belongs to the Buyer at the end of the atomic transactions, these withdraws are made without any extension of credit, counterparty, market, or other risks, including risk of failures to perform.

Securities Lending

Figure 16:
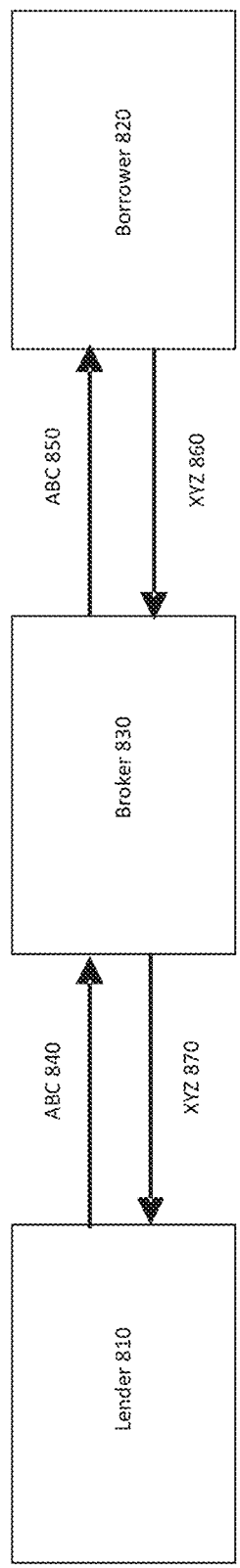
FIG. 16 illustrates an example securities lending transaction.

Further advantages of the present disclosure can be appreciated in an example of a securities transaction where cash is not part of the proposed transaction 5. FIG. 16 illustrates an example securities lending transaction where a borrower 820 wishes to borrow a digital asset/token, such as a share of ABC, from a lender 810. In this example, the borrower 820 may collateralize its borrowing with a digital asset/token, such as a share of XYZ. The borrower 820 may wish to use the digital asset (token ABC) for some purpose and for some limited time, but does not wish to purchase that digital asset, while the lender 810, who owns token ABC, is willing to "lend" the share in order to receive a return on the loan.

Conceptually, this is the exact same transaction as shown in FIG. 6 (the lender 810 operates Node A 210, the broker 830 operates Node B 220, and the borrower 820 operates Node C 230), but the difficulty in processing this transaction in the real world illustrates the need for the present system.

While the purpose of the delivery of token XYZ (870 and 860) from the borrower 820 to the lender 810 is to offset the delivery risk that the digital asset (token ABC, 840 and 850) will not be returned and to offset the bankruptcy risk that the borrower cannot fulfil its obligations to return token ABC, the delivery of token XYZ (860 and 870) does not necessarily coincide with the delivery of token ABC (840 and 850). These deliveries are each made free of payment, are not contingent upon each other, not simultaneous, not sequential and, from a purely operational perspective, unrelated. One may happen without the other, leaving one party or node with both the borrowed security and the collateral, and until both legs of the transactions are settled, there is no mitigation of any system failure or of the delivery, settlement, bankruptcy, and other risks the delivery of token XYZ as collateral was supposed to provide. In the event the borrower 820 becomes bankrupt after it receives token ABC but before delivering token XYZ, the lender 810 does not have any collateral to offset its risk and losses.

The reason for this risk is the lack of a widespread mechanism for the simultaneous exchange of securities for securities. The main mechanism for simultaneous exchange only applies to binary transactions between two (2) parties and only as an exchange of securities for cash payment, commonly called "delivery versus payment" or "DVP" or "receive versus payment" or "RVP." The current systems do not support securities versus securities or cash versus cash. As the present system can transfer tokens and other digital assets that may represent securities, cash, and other items, the present system may be utilized to address this lack in the current systems.

Figure 17:
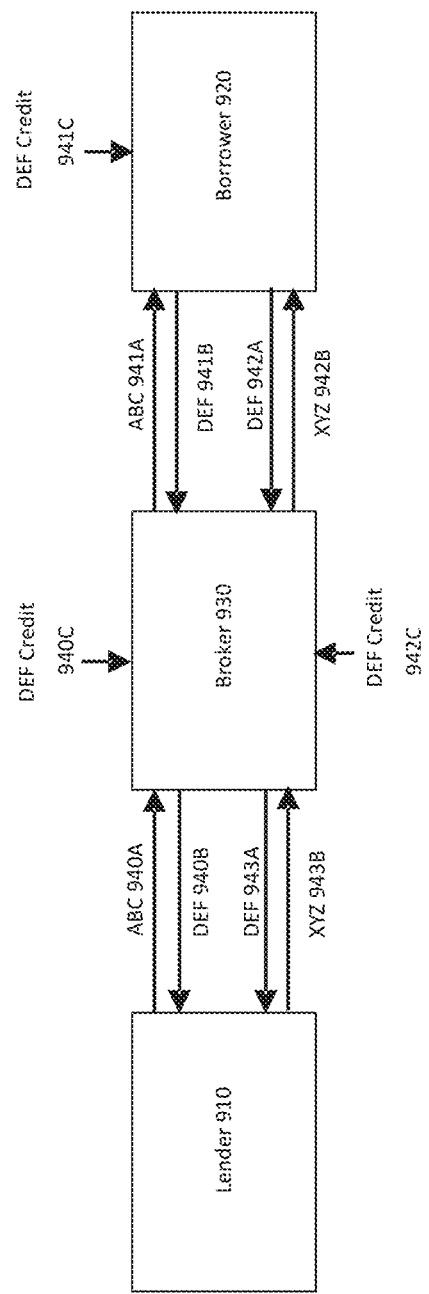
FIG. 17 illustrates a further example transaction of FIG. 16.

Without the present system, to address such risks described above, the prior art has attempted to use DVP/RVP functionality as a mitigant. As shown in FIG. 17, the lender 910 and the borrower 920 have turned the delivery of token ABC 940A and 941A and the delivery of token XYZ 942A and 943A into two (2) DVP/RVP transactions by adding offsetting cash legs, represented by token DEF, 940B and 941B to offset 940A and 941A, and 942B and 943B to offset 942A and 943A. When the lender 910 delivers token ABC 940A and 941A to the borrower 920, the borrower 920 transfers market value of token ABC, $100 940B and 9041B to the lender 910, and when the borrower delivers token XYZ 942A and 943A to the lender 910, the lender delivers token DEF 942B and 943B to the borrower. These intervening cash legs 940B, 941B, 942B, and 943B offset the bankruptcy, delivery, and settlement risks in the original securities lending scenario. In the event the borrower 920 becomes bankrupt before it can deliver token XYZ 942B and 943B, at the very least the lender 910 will have the cash (token DEF) that was the market approximation of the value of the ABC share it delivered.

While these cash legs mitigate the risk that one party or the other is bankrupt, the end result is essentially two (2) sale transactions, with all of the attendant risks and market inefficiencies, but doubled for a single securities lending transaction. In order to initiate the first DVP transaction for token ABC 940A, the broker 930 must extend $100 credit to purchase token ABC from the lender 940B. This extension of credit is only extinguished by the settlement of the sale of token ABC to the borrower 941A, where the borrower has to inject $100 of its liquidity 9041C in order to pay the broker 930 for token ABC 9041A. The borrower's liquidity drain is only extinguished when the broker 930 pays the borrower 942B in exchange for token XYZ 942A, and the broker must yet again extend its credit 942C to finance this transaction. This extension of credit by the broker 942C is only extinguished by the settlement of token XYZ 943A with the lender 910, when the lender 910 pays $100 for token XYZ 943B.

Note that the same cash essentially makes a round trip among the parties 941B, 940B, 943B, and 942B, but because the sequential nature of the DVP/RVP settlement followed the order necessary to move the securities instead of the flow of the cash, there were three (3) extensions of credit/injections of liquidity for cash movements that would otherwise net to zero. Additionally, in comparison to a purchase/sale transaction, the borrower must have twice the resources to settle this securities lending transaction, even though cash was not contemplated in the original securities lending transaction and even though the cash will eventually be returned. Each such extension of credit/injection of liquidity brings with it, capital and liquidity charges, counterparty risks, settlement risks, and market risks.

The efficiencies of embodiments of the present disclosure in processing the same securities lending transaction as compared with existing systems may be evident to one of ordinary skill. First, the Computational Node can recognize that the securities lending transaction shown in FIG. 16 comprises four (4) proposed component transactions: 840, 850, 860, and 870. Once the Computational Node 3 has determined that the necessary assets have been locked and/or committed and are available to complete each of proposed component atomic transactions, it can pass notice of the acceptable transaction to the Execution Node. Upon receipt of the acceptable transaction, the Execution Node can process all proposed component transactions simultaneously, by recording each movement of each proposed component transactions to the distributed ledger within the same block or overall transaction so that each proposed component transaction bears the same timestamp. Because all proposed component transactions are executed within the same block or overall transaction, there is never a time where any entity lender (operating Node A 810), borrower (operating Node C) 820, or broker (operating Node B) 830 have both token ABC or token XYZ, eliminating the settlement, bankruptcy, counterparty and other risks in the present settlement of securities lending transactions. As these risks have been eliminated, there is no need to add the cash legs to convert the securities lending transaction into DVP/RVP segments, and some (or even all) of the market inefficiencies associated with such cash conversion shown in FIG. 19 can be avoided.

The benefits of the present system are more clearly demonstrated in a more typical securities lending transaction in the far more realistic and far more likely event that the lender 1010 and the borrower 2020 do not share the same broker. In a more realistic scenario shown in FIG. 18, lender, node A 1010 is lending token ABC to borrower, Node G, 2020 who will pledge token XYZ to lender 1010 as collateral. Lender 1030 trades through its introducing broker (LIB) 1030, while borrower trades through a different introducing broker (BIB) 1040. SIB settles its trades through Clearing Member 1 (CM1) 1050, while BIB settles its trades through Clearing Member 2 (CM2) 1060. CM1 and CM2 are members of the Central Securities Depository (CSD) 1070.

As shown in FIG. 17, because the movement of token ABC from lender 1010 along the settlement arc to borrower 2020 is independent of the movement of token XYZ from borrower 2020 to lender 1010, the lender 1010 and the borrower 2020 are subject to the risk of failure by the system, each other, and all other entities involved in the settlement arc. To mitigate such risk, the lender 1010 and the borrower 2020 may require the exchange for cash (shown on FIG. 18 as DEF) for tokens ABC and XYZ. The net result is two (2) settlement arcs that resemble the sale transaction depicted in FIG. 8, for the sale of token ABC from lender 1010 to buyer 2020 and the sale token XYZ from buyer 2020 to lender 1010.

As shown previously in FIG. 7, the transfer of token ABC from lender 1010 to borrower 2020 is again broken up into stages, with sequential transactions between lender and LIB 1080, LIB and CM1 1081, CM1 and CSD 1082, CSD and CM2 1083, CM2 and BIB 1084, and BIB and borrower 1085. Each of the transactions 1080, 1081, 1082, 1083, 1084, and 1085 includes movement of token ABC along the chain in the direction from lender towards borrower (in order, 1080A, 1081A, 1082A, 1083A, 1084A, and 1085A) against the movement of the cash price, depicted as DEF in the opposite direction (in order, 380B, 381B, 382B, 383B, 384B, and 385B). Because the borrower 2020 originates the cash and because the transaction with the borrower 2020 occurs last in the sequence 1085, each of LIB 1030, CM1 1050, CSD 1070, CM2 1060, and BIB 2020 extends clearing credit to initiate each of their respective transactions: LIB 1030 must extend $100 clearing credit 1080C in order to pay to lender 1010 the $100 1080B and settle the lender LIB trade 1080; CM1 1050 must extend $100 clearing credit 1081C in order pay to LIB 1030 the $100 1081B in order to settle the LIB CM1 trade 1081; although CSDs may have other means of settlement like end of day net settlement, in order for a CSD not to delay settlement the CSD 1070 must extend $100 clearing credit 1082C in order to pay CM1 1050 the $100 1082B in order to settle the CM1 CSD trade 1082; CM2 1060 must extend $100 clearing credit 1083C in order to pay the CSD 1070 the $100 1083B in order to settle the CSD CM2 trade 1083, and BIB 2020 must extend $100 clearing credit 1084C in order to pay CM2 1060 the $100 1084B in order to settle the CM2 BIB trade 1084. Each extension of clearing credit cannot be extinguished until the completion of the next transaction in the chain.

Unlike FIG. 7, however, the securities lending transaction doubles the inefficiencies by turning the transfer of token XYZ from borrower 2020 to lender 1010 into DVP transfer of token XYZ from borrower 2020 to lender 1010. The same inefficiencies described above for token ABC are enacted in reverse, with each of the transactions 1090, 1091, 1092, 1093, 1094, 1095 moving token XYZ in stages between each bilateral pair of borrower 2020 and BIB 1040 (trade 1090), with the BIB extending clearing credit, BIB 1040 and CM2 1060 (trade 1091), with CM2 1060 extending clearing credit, with CM2 1060 and CSD 1070 (trade 1092) with the CSD 1070 extending clearing credit to avoid end of day net processing, with CSD 1070 and CM2 1050 (trade 1093) with CM2 extending clearing credit, with CM2 1050 and LIB 1030 (trade 1094) with LIB extending clearing credit, and finally with lender 1010 and LIB 1030 (trade 1095).

As stated previously, it is important to note the significant inefficiencies created by current market infrastructure that are magnified, simply due to the sequencing of each DVP transaction and the inability for current market infrastructure to operate as a whole. These inefficiencies are doubled simply because current infrastructure has no mechanism for securities for securities transactions as DVP supports only cash for securities. The number of sequential transactions can also lead to delay in completion of the process and pose a security risk. This may be compounded if the sequential transactions follow a predictable pattern whereby the predictable pattern may be exploited by unscrupulous nodes. Furthermore, as demonstrated in this example, extensions of credit in the marketplace is multiples (totaling $1000 to settle a $100 trade) of the actual trade, tying up liquidity that could be used for other purposes. As each of the entities extending credit faces settlement, counterparty, and delivery risks, each entity, in turn, charges margin to mitigate these risks, creating additional liquidity drains in the form of margin postings. These risks are magnified for LIB 1030, BIB 1040, CM1 1050, CM2 1060, and CSD 1070, the settlement entities, as they become committed to the trade upon the date the transaction is agreed (T) even though the settlement doesn't occur for another two (2) days (T+2). The result is that the settlement entities require margin from their customers and participants not just for the credit extensions during the settlement cycle, but for the added counterparty and delivery risks. The margin requirements further magnify the multiples of inefficiencies in the system. Although LIB 1030, BIB 1040, CM1 1050, CM2 1060, and CSD 1070 typically would net their obligations to deliver token ABC and token XYZ across their trading book (FIG. 8 shows the transaction as if only one token ABC and XYZ was available for trade), the risks borne by and the credit extensions made by each entity remains, and each entity imposes margin on its customer and/or posts margin for these reasons.

Given the magnified inefficiencies in securities lending, some market participants have attempted to streamline the process by utilizing a triparty securities loan custodian 1180 to facilitate the transfer of collateral. FIG. 19 illustrates this attempt at a solution where token ABC is transferred via the open market settlement chain from lender 1110 to borrower 1120 via the LIB 1130, CM1 1150, CSD 1170, CM2 1160, BIB 1140 with all of the attendant issues and inefficiencies described previously. The collateral for token ABC, token XYZ, however, is transferred via the triparty securities loan custodian 1180. This structure results in the combination of the inefficiencies shown in FIG. 5 and FIG. 7, but such combination is still an improvement over the inefficiencies in FIG. 18. Note that token ABC cannot be transferred via the triparty securities loan custodian as the borrower 1120 needs to utilize token ABC and needs to receive it in a true open market transaction: token XYZ remains on the books and records of the triparty securities loan custodian 1180 even if it is ledgered to lender 1110.

Figure 18:
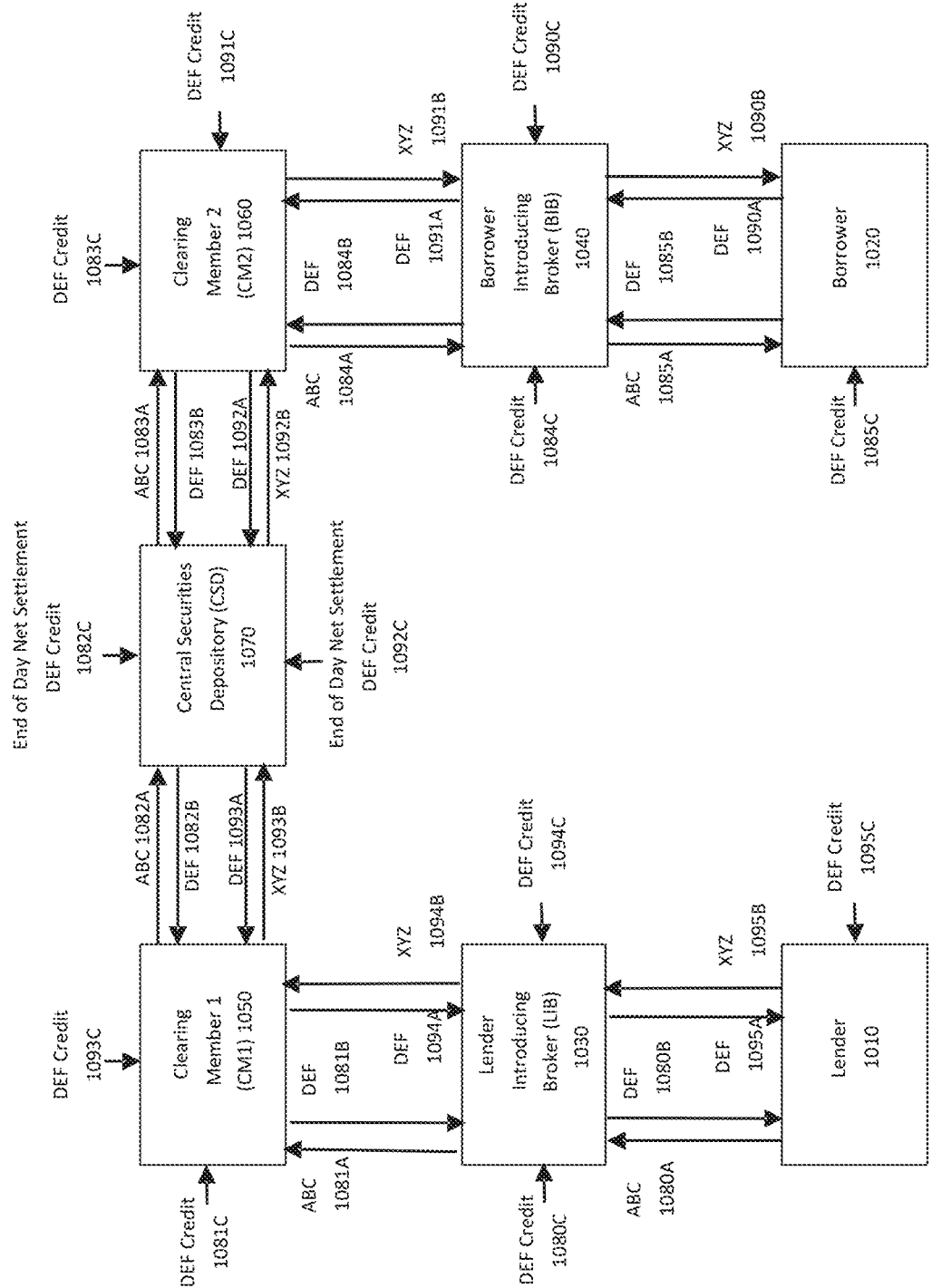
FIG. 18 illustrates a further example securities lending transaction.
Figure 19:
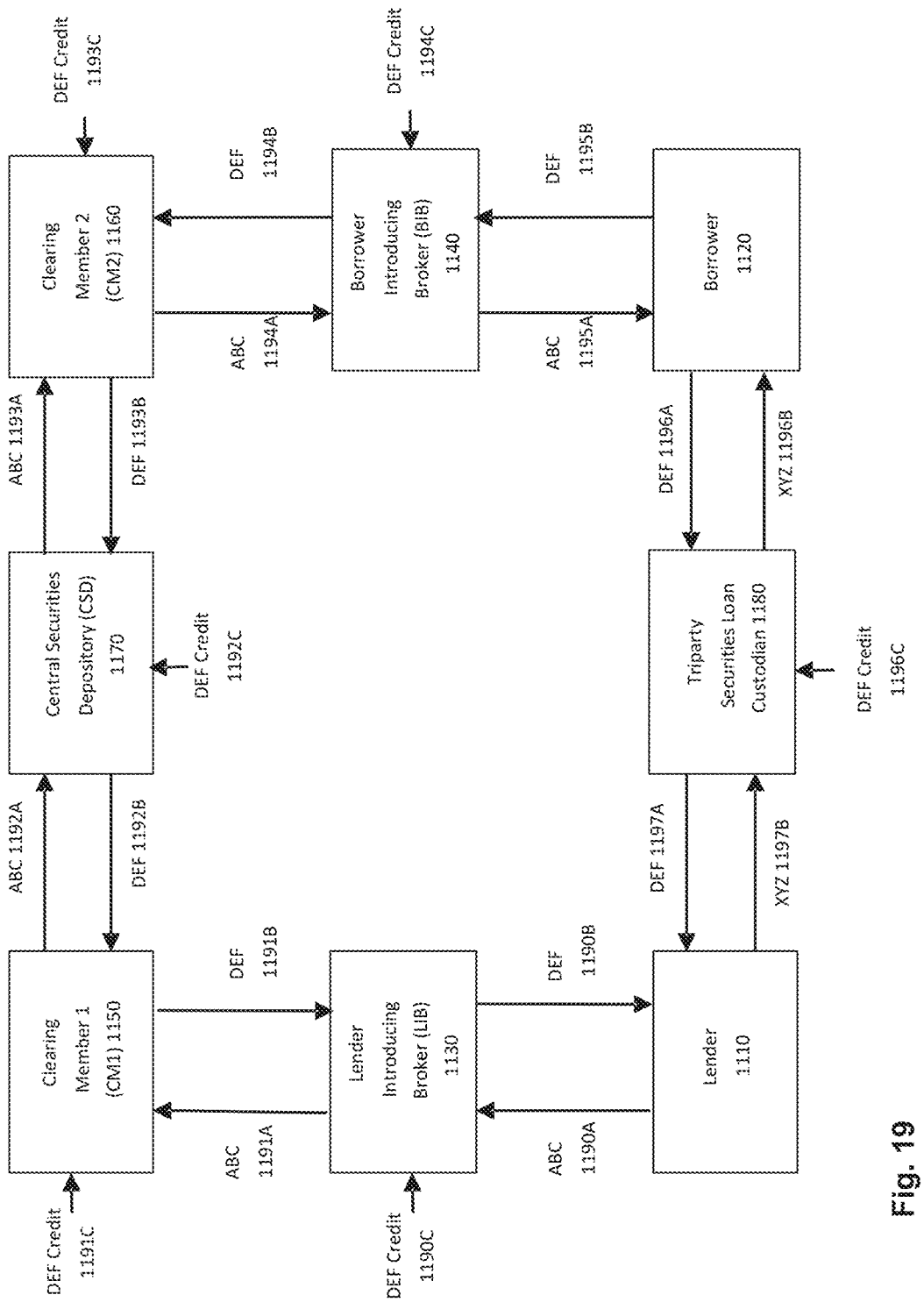
FIG. 19 illustrates a further example securities lending transaction.
Figure 20:
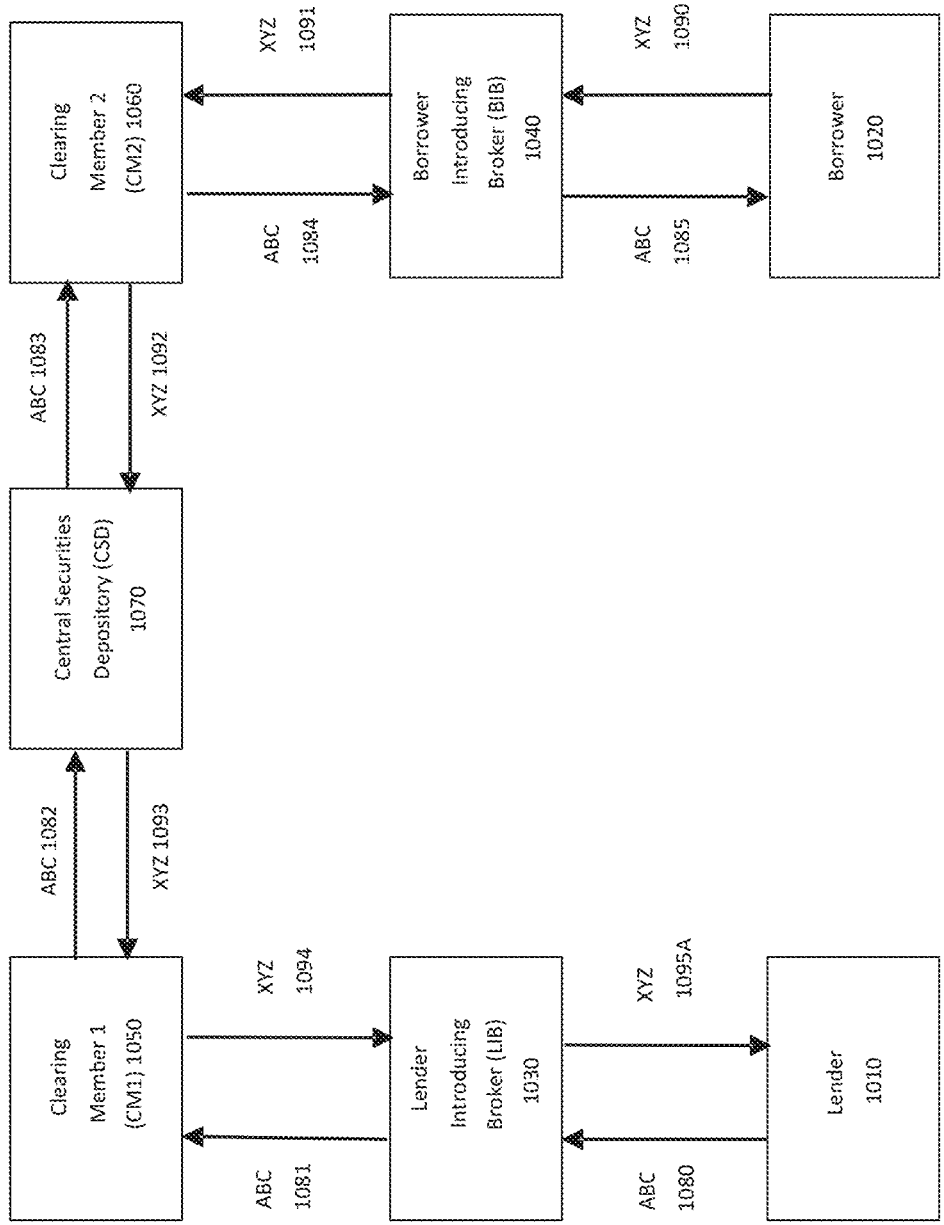
FIG. 20 illustrates the example securities lending transaction of FIGS. 18 and 19 in accordance with the present disclosure.

The issues illustrated in FIG. 18 and in the current industry's attempt to solve such problems in FIG. 19 reveal the need for the present system. FIG. 20 shows how embodiments of the present disclosure may reduce, or even eliminate, these inefficiencies. After lender 1010 and borrower 2020 agree upon the securities lending transaction of token ABC for token XYZ, the Computational Node can calculate the individual component atomic transactions that comprise the movement of token ABC from lender 1010 to borrower 2020 (1080, 1081, 1082, 1083, 1084, and 1085) and of token XYZ from borrower 2020 to lender 1010 (1090, 1091, 1092, 1093, 1094, and 1095). Applying the Settlement Logic, the Computational Node can examine each node (lender 1010, LIB 1030, CM1 1050, CDS 1070, CM2 1060, BIB 1040, and borrower 2020) to see if each node has sufficient tokens or digital assets to fulfil its obligations to all component atomic transactions involving it. Each of LIB 1030, CM1 1050, CDS 1070, CM2 1060, and BIB 1040 can receive and transfer the exact same tokens and digital assets, leaving a net obligation of zero, and unlike current infrastructure, none of them will have to extend any credit or bear any risk to settle this transaction. Once the Computational Node has determined that lender 1010 has token ABC and that borrower 2020 has token XYZ, the Computational Node can mark the transaction as passing its individual components. At the time of execution, the Execution Node can execute the trade, and can write, or cause the Write Node, as applicable, to write all component atomic transactions onto a single block or the same overall transaction, all with the same timestamp.

Embodiments of the present disclosure may thus solve the securities loan transactions with fewer (even zero) risks of default, fewer (even zero) credit extensions, and fewer (even none) of the resulting inefficiencies associated with those risks.

Multi Originator and Multi Receiver Transactions

Existing infrastructure has no solution to protect against systemic failures in non-binary transactions where the node providing a token to a second node receives a token in return from a third node. All current infrastructure has provided for the simultaneous exchange of a single step transaction where a pair of nodes exchange tokens as a means ensuring that neither node has possession of none or both tokens, meaning that both nodes are protected in the event of a system or other failure to complete the exchange of tokens. This current protection, however, does not cover events involving more than one ultimate provider of tokens, more than one ultimate receiver of tokens, more than two tokens being exchanged, or combinations of any of the foregoing.

Figure 21:
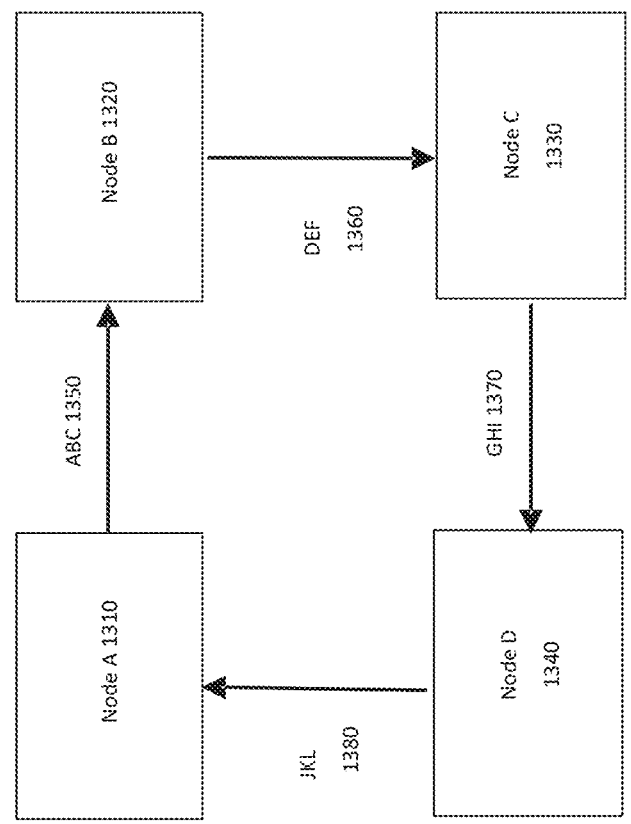
FIG. 21 illustrates a further example transaction with multiple originator nodes and multiple receiver nodes.

FIG. 21 illustrates an example where Node A 1301 delivers token ABC 1350 to Node B 1320. In exchange for token ABC, Node A 1301 can receive token JKL 1380 from Node D 1340. This is a shift from current infrastructure, as Node A 1310 bears the risk of performance of Node D 1340, even though Node A's 1310 obligation is to perform for Node B 1320. Similarly, Node B 1320 is obligated to deliver token DEF to Node C 1330 in exchange for receiving token ABC 1350 from Node A 1310. Node C 1330 is obligated to deliver token GHI 1370 to Node E 1340 in exchange for the receiving token DEF 1360 from Node B 1320. Finally, Node D 1340 is obligated to deliver token JKL 1380 to Node A 1310 in exchange for receiving GHI 1370 from Node C.

In this transaction, any node that transfers its token first bears the risk of nonperformance or system failure until the node in the circle behind it performs. Current market infrastructure may attempt to solve this issue by creating an artificial exchange of a common and otherwise unnecessary token in the opposite direction of the transaction, e.g. token ABC for token XYZ between Node A 1310 and Node B 1320, token DEF for token XYZ between Node B 1320 and Node C 1330, token GHI for token XYZ between Node C 1330 and Node D 1340, and token JKL for token XYZ between Node D 1340 and Node A 1310. Introducing token XYZ effectively converts the transaction into four (4) separate binary transactions that may be protected under current infrastructure. However, in doing so, the conversion also creates the inefficiencies attendant to current infrastructure, forcing each of Node A 1310, Node B 1320, Node C 1330, and Node D 1340 to source and lend token XYZ, a token unnecessary to the original transaction but for the need to protect each participating node from the failure of the other nodes or of the system.

The present system may solve this transaction without the need for an extraneous token and without any of the risks, potential failures, or inefficiencies required by current infrastructure. Once the transaction has been agreed upon, the Computational Node can break the transaction into its component atomic transactions, 1350, 1360, 1370, and 1380. The Computational Node can then query each of the nodes to ascertain that they have sufficient tokens or digital assets to meet the requirements of each component atomic transaction affecting such node. In this example, Node A 1310 may have token ABC, Node B 1320 may have token DEF, Node C 1330 may have token GHI, and Node D 1340 may have token JKL. Once verified, the Computational Node can mark each node as successful. At the time of execution, the Execution Node can make each movement of the tokens, and write, or have the Write Node write, as applicable, each of the component atomic transactions to the same block or overall transaction, all with the same timestamp. None of the nodes bear risk of failure or must source and/or lend any additional tokens to the transaction.

Figure 22:
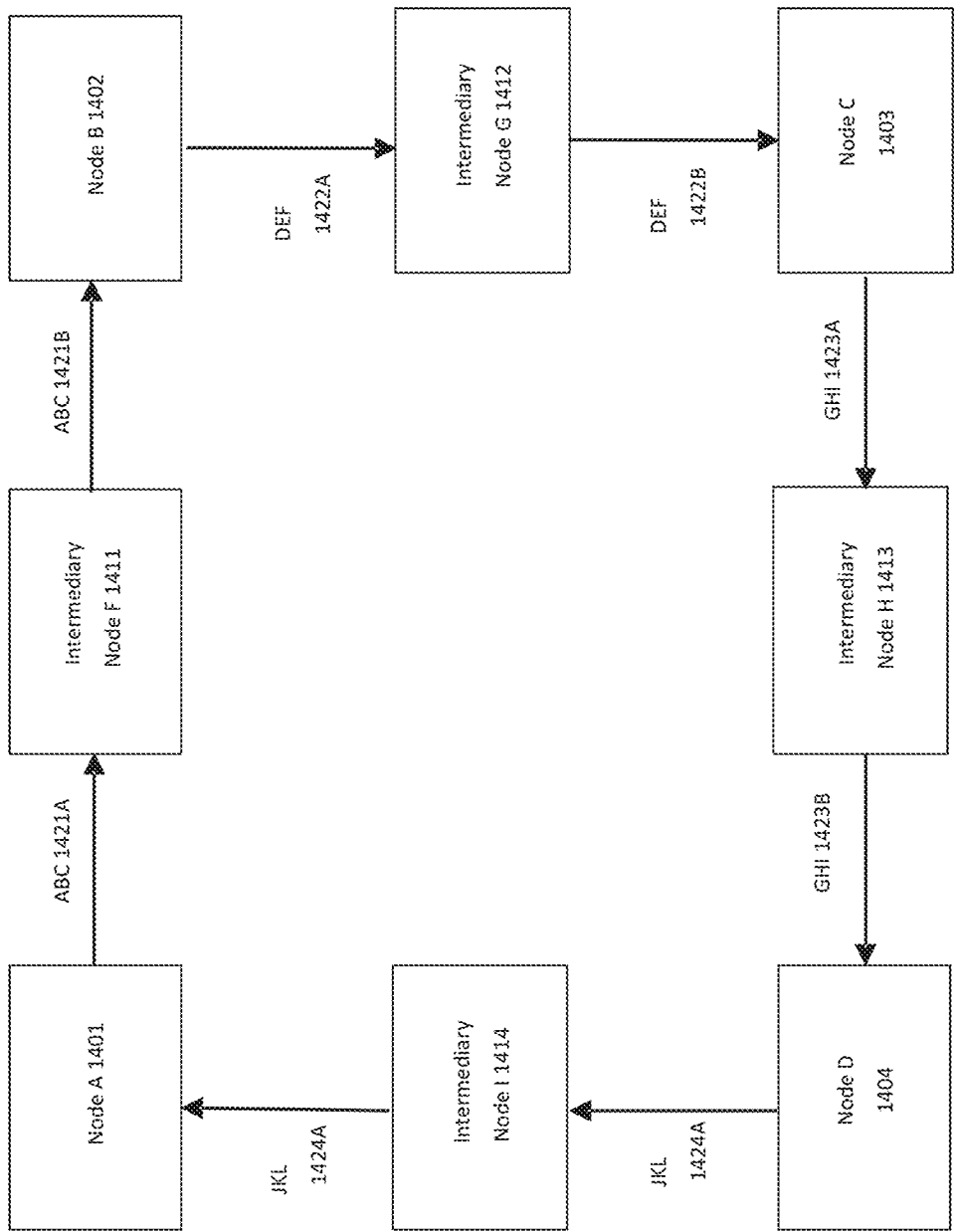
FIG. 22 illustrates the example transaction of FIG. 21, in accordance with the present disclosure.

FIG. 22 shows the same transaction as FIG. 21 with the same four (4) nodes, Node A 1401, Node B 1402, Node C 1403, and Node D 1404 transferring tokens ABC, DEF, GHI, JKL in the same exact pattern, with the difference that Node A 1401 may transfer token ABC to Node B 1402 via Intermediary Node F 1411, Node B may transfer token DEF to Node C via Intermediary Node G 1412, Node C may transfer token GHI to Node D via Intermediary Node H 1413, and Node D 1404 may transfer token JLK to Node A 1401 via Intermediary Node I 1414. As before, each of the ultimate token providers, Node A 1401, Node B 1402, Node C 1403, and Node D 1404, can take risks of non-performance of the prior node that is delivering tokens to it. The additional complexity of FIG. 22 stems from the intermediary nodes, representing a system where the ultimate provider nodes are unable to directly transfer their tokens to the ultimate receiver nodes, and instead utilize one or more intermediary nodes in order to do so.

Under current infrastructure, entities can either accept the risk of non-performance, system failure, or loss or they would again attempt to solve this issue by creating an artificial exchange of a common and otherwise unnecessary token in the opposite direction of the transaction. Thus, the movement of token ABC 1421A from Node A 1401 to Intermediary Node F 1411 would be made in exchange for token XYZ from Intermediary Node F 1411 to Node A 1401, forcing Intermediary Node F 1411 to source, loan, and extend token XYZ as credit. The subsequent movement of token ABC 1421B from Intermediary Node F 1411 to Node B 1402 would also be made in exchange for token XYZ from Node B 1402 to Intermediary Node F 1411, forcing Node B 1402 to source, loan, and extend token XYZ as credit. Intermediary Node F's 1141 extension of token XYZ credit is only extinguished upon the completion of the delivery of token ABC 1421B to Node B 1402 in exchange for token XYZ. The same sequential transactions occurs for token DEF, GHI, and JKL, breaking the one transaction exchanging four (4) securities between four (4) parties into eight (8) exchanges, forcing each of the eight (8) nodes to source, loan, and extend XYZ as credit in order to ensure that any one node is not left with nothing should there be a failure of one or more of the other seven (7) nodes or of the system itself. The attenuating inefficiencies of the system is made clear that except for its role as collateral against system or node failure, token XYZ is not part of the original transaction and completely nets out upon the completion of the transaction.

As demonstrated previously, the present system may solve this transaction without the need for an extraneous token and without any of the risks, potential failures, or inefficiencies required by the current infrastructure. For example, the present system may mitigate the risk of non-performance of nodes due to factors such as system or computer failures, electrical outages, communication disruptions or human/operator error.

Once the transaction has been agreed upon, the Computational Node can break the transaction into its component atomic transactions: 1421A, 1421B, 1422A, 1422B, 1423A, 1423B, 1424A, and 1424B. The Computational Node can then query each of the nodes to ascertain that they have sufficient tokens or digital assets to meet the requirements of each component atomic transaction affecting such node. In this example, Node A 1310 may have token ABC, Node B 1320 may have token DEF, Node C 1330 may have token GHI, and Node D 1340 may have token JKL. Intermediary Node F 1411, Intermediary Node G 1412, Intermediary Node H 1413, and intermediary Node I 1414 all have the matching inflows and outflows of tokens and digital assets, resulting in a net requirement of zero, passing the query made by the Computational Node. Once verified, the Computational Node can mark each node as successful. At the time of execution, the Execution Node can make each movement of the tokens, and write, or have the Write Node write, as applicable, each of the component atomic transactions to the same block or overall transaction, all with the same timestamp. None of the nodes bear risk of failure or must source and/or lend any additional tokens to the transaction.

Exemplary Node

Figure 23:
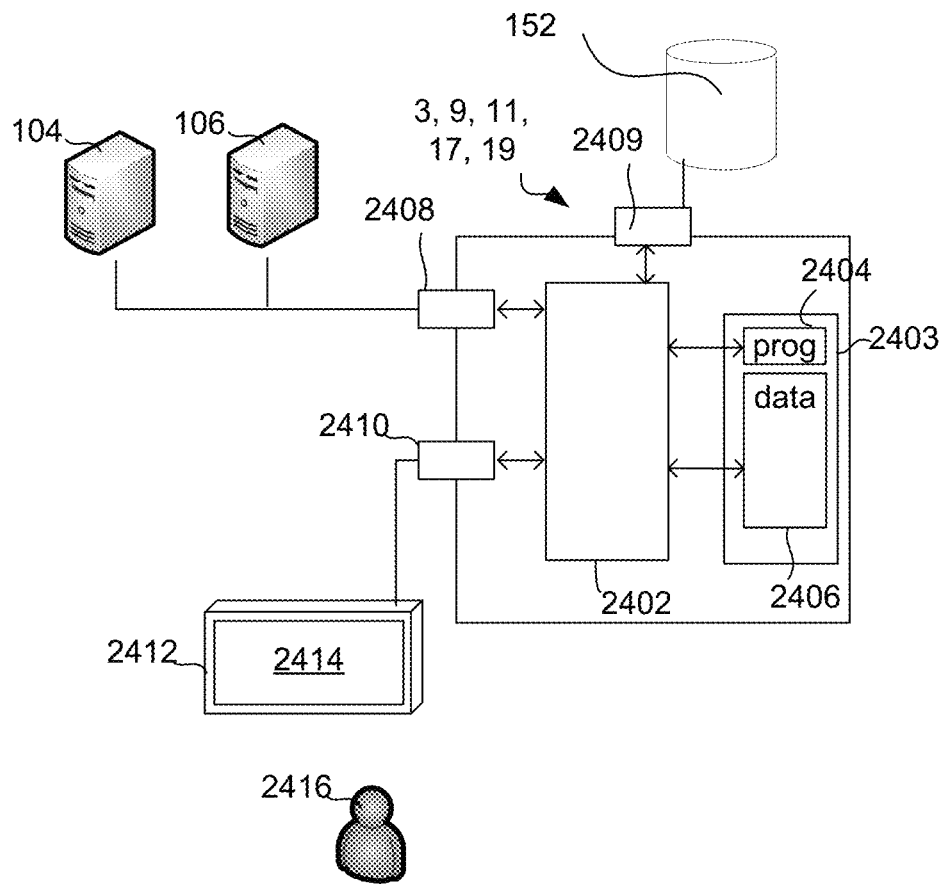
FIG. 23 illustrates an exemplary computer node that may be used in examples of the disclosure.

FIG. 23 illustrates an example computer node 102. The node 102 may be any node in any of the systems disclosed herein, including any of nodes 3, 9, 11, 17, 19. As shown in FIG. 23, the node 102 can include a processor 2402, a memory 2403, a network interface device 2408, a distributed ledger interface device 2409 that interfaces with the distributed ledger and a user interface 2410. The memory can store instructions 2404 and data 2406, and the processor 2402 can perform the instructions from the memory to implement any of the processes described herein.

The embodiments can include computer-executable instructions, such as routines executed by a general or special-purpose data processing device (e.g., a server or client computer). The instructions can be stored in a non-transient manner or distributed on tangible computer-readable media, including magnetically or optically readable computer discs, hard-wired or pre-programmed chips (e.g., EEPROM semiconductor chips), nanotechnology memory, biological memory, or other data storage media.

The data may be provided on any analog or digital network (e.g., packet-switched, circuit switched, or the like). The embodiments can be practiced in distributed computing environment where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. The embodiments can be implemented as software as a service (SaaS) in a cloud computing environment. Those skilled in the relevant art will recognize that portions of the described technology may reside on a server computer, while corresponding portions reside on a client computer (e.g., PC, mobile computer, tablet, or smartphone).

The information described herein can be transmitted and stored as data structures. Various messaging protocols can be used and each transaction can include a transaction message that includes the sender's digital signature, a recipient address (e.g., a hash value based on the receiver's public key). Transaction messages can be digitally signed by the sender's private key to create a digital signature for verifying the sender. The messages can be decrypted using the digital signature via the sender's public key to verify authenticity in a known manner.

The computing devices can include a personal computer, workstation, phone, or tablet, having one or more processors coupled to one or more memories storing computer-readable instructions. The various devices can be communicatively coupled in a known manner as via a network. For example, network hubs, switches, routers, or other hardware network components within the network connection can be used.

In general, the description of embodiments of the software and/or hardware facilities is not intended to be exhaustive or to limit the technology to the precise form disclosed above. While specific embodiments of, and examples for, the technology are described above for illustrative purposes, various equivalent modifications are possible within the scope of the software and/or hardware facilities, as those skilled in the relevant art will recognize. The teachings of the software and/or hardware facilities provided herein can be applied to other systems, not necessarily the system described herein. The elements and acts of the various embodiments described herein can be combined to provide further embodiments.

Examples not Exclusive

It will be appreciated by persons skilled in the art that numerous variations, combinations, and/or modifications may be made to the above-described embodiments, without departing from the broad general scope of the present disclosure. The present embodiments are, therefore, to be considered in all respects as illustrative and not restrictive. In addition, it is to be appreciated that features from any of the embodiments or examples can be shared or combined with features from any other embodiment or example in ways that would be appreciated by a person of skill in the art.

Specifically, although the examples showed the application of the present system to settlement chains of two (2), three (3), and seven (7) nodes, the present system may settle transactions atomically for chains containing any positive numbers of nodes with any positive number of intermediary nodes in the same manner as described. Additionally, although the examples show the application of the present system to transactions with two (2) and four (4) nodes as ultimate token providers and with two (2) and four (4) nodes ultimate token receivers over zero (0) and four (4) intermediary nodes, the present system may settle transactions atomically for any positive number of nodes as ultimate token providers, ultimate token receivers, and intermediaries in the manner as described. Finally, although the examples showed the nodes serving as ultimate token providers also receiving tokens as ultimate token receivers, the present system applies equally to scenarios where nodes that are ultimate token providers are not also ultimate token receivers, nodes that are ultimate token receivers do not provide nodes, and intermediary nodes for some tokens in the transactions may also be ultimate token providers and/or ultimate token receivers for other nodes in the transaction.

The invention claimed is:

1. An apparatus for executing an exchange operation between a beginning node and a terminating node, wherein the exchange operation comprises a series of sub-exchanges between adjacent nodes of a plurality of nodes including the beginning node, the terminating node and one or more intermediate nodes, the series of sub-exchanges including at least a first sub-exchange and a second-sub-exchange, the apparatus comprising:
  one or more processors of a first intermediate node, wherein the first intermediate node is a receiving node of the first sub-exchange and a transferring node of the second sub-exchange, and wherein at least one asset included in the first sub-exchange is included in the second sub-exchange; and
  memory having instructions programmed thereon, the instructions are configured to cause the one or more processors to:
    receive a communication including instructions for the exchange operation;
    prior to execution of the first sub-exchange:
      (a) determine, based on the instructions for the exchange operation, the second sub-exchange of the series of sub-exchanges between the first intermediate node and a first sub-exchange partner node that is either (i) a second intermediate node or (ii) the terminating node,
      (b) encrypt a first digital lock associated with the second sub-exchange using a private key of a public/private key pair of the first intermediate node, wherein authorization of the first intermediate node to execute the second sub-exchange is verifiable using a public key of the public/private key pair of the first intermediate node, and wherein authorization is based at least in part on private data stored in a first portion of a log, wherein the first portion of the log is configured to store private data associated with the first intermediate node and is accessible via a first communication channel;
      (c) provide the public key of the public/private key pair to one or more other nodes of a node network for verification that the first intermediate node is authorized to execute the second sub-exchange;
      (d) transmit evidence of activation of the encrypted first digital lock via a second communication channel to a second portion of the log, wherein the second portion of the log is configured to store public data associated with each of the plurality of nodes and is segregated from the first portion of the log; and
      (e) determine from the first portion of the log that each sub-exchange of the exchange operation includes a respective encrypted activated digital lock, wherein for each sub-exchange, the encrypted activated digital lock included in the sub-exchange is encrypted using the private key of the public/private key pair of the respective transferring node of the sub-exchange and is verifiable using the public key of the public/private key pair of the respective transferring node of the sub-exchange; and
    in response to the first portion of the log including the activated digital locks for each sub-exchange of the exchange operation:
      transmit a first notification to unlock the first digital lock; and
      execute the second sub-exchange.

2. The apparatus of claim 1, wherein the instructions are configured to cause the one or more processors to:
  verify that the private data stored in the first portion of the log is consistent with the public data stored in the second portion of the log; and
  verify authorization of the first intermediate node to execute the second sub-exchange based in part on the verification that the private data stored in the first portion of the log is consistent with the public data stored in the second portion of the log.

3. The apparatus of claim 1, wherein the first communication channel is a private encrypted channel, wherein the second portion of the log is a permissioned ledger.

4. The apparatus of claim 1, wherein the instructions are configured to cause the one or more processors to:
  determine, based on the instructions for the exchange operation, a third sub-exchange of the plurality of sub-exchanges between the first intermediate node and a second sub-exchange partner node that is either (i) the beginning node or (ii) a third intermediate node, and a second digital lock associated with the third sub-exchange, wherein the first intermediate node is the transferring node of the third sub-exchange;
  prior to execution of the first sub-exchange and the second sub-exchange:
    verify authorization of the first intermediate node to execute the third sub-exchange based on the private data stored in the first portion of the log;
    transmit evidence of activation of the second digital lock via the second communication channel to the second portion of the log; and
  in response to the first portion of the log including the activated digital locks for each sub-exchange of the exchange operation:
    transmit a second notification to unlock the second digital lock; and
    execute the third sub-exchange.

5. The apparatus of claim 1, wherein the second sub-exchange involves transfer of a first digital asset from the first intermediate node to the first sub-exchange partner node, and wherein the instructions are configured to cause the one or more processors to verify control of the first digital asset by a first party corresponding to the first intermediate computer node.

6. The apparatus of claim 5, wherein the instructions are configured to cause the one or more processors to:
  construct an historical record of the first digital asset based on a combination of the private data stored in the first portion of the log and the public data stored in the second portion of the log;
  verify control of the first digital asset by the first party based on the constructed historical record.

7. The apparatus of claim 6, wherein the instructions are configured to cause the one or more processors to, in response to execution the second sub-exchange, transmit a record of the second sub-exchange to the first portion of the log via the first communication channel.

8. The apparatus of claim 7, wherein the instructions are configured to cause the one or more processors to, in response to execution the first sub-exchange, transmit a cryptographic representation of the record of the second sub-exchange to a transaction buffer configured to append blocks of records to the second portion of the log.

9. The apparatus of claim 1, wherein the communication including the instructions for the exchange operation is received from the node network, and wherein the instructions are configured to cause the one or more processors to determine the second sub-exchange based on the node network.

10. The apparatus of claim 1, wherein the instructions are configured to cause the one or more processors to:
receive a test query from a first sub-exchange partner node that is either (i) a third intermediate node or (ii) the beginning node, wherein the test query includes a proposed exchange between the beginning node and the terminating node;
propose a candidate second sub-exchange based on the test query, the candidate second sub-exchange identifying a candidate first sub-exchange partner node;
forward the test query to the candidate first sub-exchange partner node; and
in response to receiving confirmation of success of the proposed candidate second sub-exchange, select the candidate second sub-exchange as the second sub-exchange.

11. The apparatus of claim 1, wherein the evidence of activation of the first digital lock includes a cryptographic representation of the first digital lock, wherein the cryptographic representation of the first digital lock is cryptographically signed by the first intermediate node, and wherein the first notification to unlock the first digital lock includes a key of the first intermediate node to cryptographically unlock the first digital lock.

12. A method for executing an exchange operation between a beginning node and a terminating node, wherein the exchange operation comprises a series of sub-exchanges between adjacent nodes of a plurality of nodes including the beginning node, the terminating node and one or more intermediate nodes, the series of sub-exchanges including at least a first sub-exchange and a second-sub-exchange, the method comprising:
receiving, by one or more processors, a communication including instructions for the exchange operation;
determining, by the one or more processors, based on the instructions for the exchange operation, the second sub-exchange of the series of sub-exchanges between a first intermediate node and a first sub-exchange partner node that is either (i) a second intermediate node or (ii) the terminating node,
encrypting a first digital lock associated with the second sub-exchange using a private key of a public/private key pair of the first intermediate node, wherein authorization to execute the second sub-exchange is verifiable using a public key of the public/private key pair of the first intermediate node, wherein the first intermediate node is a receiving node of the first sub-exchange and a transferring node of the second sub-exchange, and wherein at least one asset included in the first sub-exchange is included in the second sub-exchange;
providing the public key of the public/private key pair to one or more other nodes of a node network for verification of authenticity of the first digital lock;
prior to execution of the first sub-exchange:
verifying, by the one or more processors, authorization of the first intermediate node to execute the second sub-exchange based at least in part on private data stored in a first portion of a log, wherein the first portion of the log is configured to store private data associated with the first intermediate node and is accessible via a first communication channel;
transmitting, by the one or more processors, evidence of activation of the encrypted first digital lock via a second communication channel to a second portion of the log, wherein the second portion of the log is configured to store public data associated with each of the plurality of nodes and is segregated from the first portion of the log; and
determining, by the one or more processors, from the first portion of the log that each sub-exchange of the exchange operation includes a respective encrypted activated digital lock, wherein for each sub-exchange, the encrypted activated digital lock included in the sub-exchange is encrypted using the private key of the public/private key pair of the respective transferring node of the sub-exchange and is verifiable using the public key of the public/private key pair of the respective transferring node of the sub-exchange; and
in response to the first portion of the log including the activated digital locks for each sub-exchange of the exchange operation:
transmitting, by the one or more processors, a first notification to unlock the first digital lock; and
executing, by the one or more processors, the second sub-exchange.

13. The method of claim 12, wherein verifying authorization of the first intermediate node comprises:
verifying, by the one or more processors, that the private data stored in the first portion of the log is consistent with the public data stored in the second portion of the log; and
verifying, by the one or more processors, authorization of the first intermediate node to execute the second sub-exchange based in part on the verification that the private data stored in the first portion of the log is consistent with the public data stored in the second portion of the log.

14. The method of claim 12, wherein the first communication channel is a private encrypted channel, wherein the second portion of the log is a permissioned ledger.

15. The method of claim 12, further comprising:
determining, by the one or more processors, based on the instructions for the exchange operation, a third sub-exchange of the plurality of sub-exchanges between the first intermediate node and a second sub-exchange partner node that is either (i) the beginning node or (ii) a third intermediate node, and a second digital lock associated with the third sub-exchange, wherein the first intermediate node is the transferring node of the third sub-exchange;
prior to execution of the first sub-exchange and the second sub-exchange:
verifying, by the one or more processors, authorization of the first intermediate node to execute the third sub-exchange based on the private data stored in the first portion of the log;

transmitting, by the one or more processors, evidence of activation of the second digital lock via the second communication channel to the second portion of the log; and in response to the first portion of the log including the activated digital locks for each sub-exchange of the exchange operation:

transmitting, by the one or more processors, a second notification to unlock the second digital lock; and executing, by the one or more processors, the third sub-exchange.

16. The method of claim 12, wherein executing the second sub-exchange comprises transferring a first digital asset from the first intermediate node to the first sub-exchange partner node, and wherein verifying authorization of the first intermediate node to execute the first sub-exchange comprises verifying, by the one or more processors, control of the first digital asset by a first party corresponding to the first intermediate computer node.

17. The method of claim 16, wherein verifying authorization of the first intermediate node to execute the first sub-exchange comprises:

constructing, by the one or more processors, an historical record of the first digital asset based on a combination of the private data stored in the first portion of the log and the public data stored in the second portion of the log;

verifying, by the one or more processors, control of the first digital asset by the first party based on the constructed historical record.

18. The method of claim 17, further comprising, in response to execution the second sub-exchange, transmitting, by the one or more processors, a record of the second sub-exchange to the first portion of the log via the first communication channel.

19. The method of claim 18, wherein transmitting the record of the first sub-exchange comprises transmitting, by the one or more processors, a cryptographic representation of the record of the second sub-exchange to a transaction buffer configured to append blocks of records to the second portion of the log.

20. The method of claim 12, wherein the communication including the instructions for the exchange operation is received from the node network, and wherein determining the second sub-exchange is based on the node network.

21. The method of claim 12, wherein determining the first sub-exchange comprises:

receiving, by the one or more processors, a test query from a first sub-exchange partner node that is either (i) a third intermediate node or (ii) the beginning node, wherein the test query includes a proposed exchange between the beginning node and the terminating node;

proposing, by the one or more processors, a candidate second sub-exchange based on the test query, the candidate second sub-exchange identifying a candidate first sub-exchange partner node;

forwarding, by the one or more processors, the test query to the candidate first sub-exchange partner node; and in response to receiving confirmation of success of the proposed candidate second sub-exchange, selecting, by the one or more processors, the candidate second sub-exchange as the second sub-exchange.

22. The method of claim 12, wherein the evidence of activation of the first digital lock includes a cryptographic representation of the first digital lock, wherein the cryptographic representation of the first digital lock is cryptographically signed by the first intermediate node, and wherein the first notification to unlock the first digital lock includes a key of the first intermediate node to cryptographically unlock the first digital lock.

\* \* \* \* \*